US008040567B2

(12) United States Patent
Hosaka et al.

(10) Patent No.: US 8,040,567 B2

(45) Date of Patent: Oct. 18, 2011

(54) IMAGE PROCESSING METHOD, PROGRAM, RECORDING MEDIUM, IMAGE PROCESSING DEVICE, AND IMAGE FORMING APPARATUS

(75) Inventors: Shigetoshi Hosaka, Kanagawa (JP); Masakazu Yoshida, Kanagawa (JP); Taku Satoh, Kanagawa (JP); Takashi Kimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 897 days.

(21) Appl. No.: 11/940,800

(22) Filed: Nov. 15, 2007

(65) Prior Publication Data

US 2008/0117467 A1 May 22, 2008

(30) Foreign Application Priority Data

Nov. 17, 2006 (JP) ................................ 2006-312147

(51) Int. Cl.
*G06K 15/00* (2006.01)

(52) U.S. Cl. ............. 358/3.06; 358/1.1; 358/1.8; 347/5; 347/9

(58) Field of Classification Search ................... 358/1.1, 358/1.8, 1.9, 3.01, 3.03, 3.06, 3.13; 347/5, 347/9, 10, 11
See application file for complete search history.

(56) References Cited

U.S. PATENT DOCUMENTS

| | | | | |
|---|---|---|---|---|
| 6,040,927 | A * | 3/2000 | Winter et al. | 358/534 |
| 6,215,557 | B1 | 4/2001 | Owens | |
| 6,714,320 | B1 | 3/2004 | Nakahara et al. | |
| 6,923,520 | B2 | 8/2005 | Oikawa et al. | |
| 7,083,247 | B2 | 8/2006 | Yoshida et al. | |
| 7,130,083 | B1 * | 10/2006 | Konno et al. | 358/3.06 |
| 2006/0044616 | A1 | 3/2006 | Satoh et al. | |
| 2007/0008356 | A1 | 1/2007 | Katoh | |

FOREIGN PATENT DOCUMENTS

| | | | |
|---|---|---|---|
| JP | 2001-139849 | | 5/2001 |
| JP | 2001-146004 | | 5/2001 |
| JP | 2002-254613 | | 9/2002 |
| JP | 2003-259118 | | 9/2003 |
| JP | 2004-112089 | | 4/2004 |
| JP | 2004-284279 | | 10/2004 |
| JP | 2005-138494 | | 6/2005 |
| JP | 2005-175949 | | 6/2005 |
| JP | 2006-81000 | | 3/2006 |
| JP | 2006-224483 | | 8/2006 |
| WO | WO01/02971 | A1 | 1/2001 |
| WO | WO2004/096552 | A1 | 11/2004 |

OTHER PUBLICATIONS

Mar. 5, 2009 European search report in connection with a counterpart European patent Application No. 07 25 4475.

Jul. 2, 2010 European search report in connection with counterpart European patent application No. 07254475.

* cited by examiner

*Primary Examiner* — Thomas D Lee

(74) *Attorney, Agent, or Firm* — Cooper & Dunham LLP

(57) ABSTRACT

An image processing method configured to produce image data output from an image forming apparatus configured to form an image by using a recording head composed of a liquid ejecting head having plural arranged nozzles configured to eject a liquid drop and an energy generating device configured to generate ejection energy corresponding to each nozzle while conducting a halftone processing configured to covert input image data to an N value which is less than a tone (M value) thereof (N value: $M>N\geqq 2$) is provided, wherein a halftone processing configured to substantially reduce a driving frequency of a driving wave pattern applied to the energy generating device is conducted when a liquid drop with a drop size causing ejection irregularity or a liquid drop from a nozzle causing ejection irregularity is ejected.

21 Claims, 45 Drawing Sheets

| | | | | | | | | | | | | | | | | | | | |
|---|---|---|---|---|---|---|---|---|---|---|---|---|---|---|---|---|---|---|---|
| 341 | 301 | 261 | 221 | 181 | 351 | 361 | 371 | 295 | 135 | 45 | 85 | 125 | 195 | 220 | 60 | 10 | 30 | 120 | 280 |
| 171 | 141 | 101 | 61 | 151 | 311 | 381 | 391 | 335 | 165 | 205 | 245 | 285 | 325 | 260 | 100 | 20 | 40 | 80 | 240 |
| 211 | 51 | 1 | 21 | 111 | 271 | 346 | 306 | 266 | 226 | 186 | 356 | 366 | 376 | 300 | 140 | 50 | 90 | 130 | 200 |
| 251 | 91 | 11 | 31 | 71 | 231 | 176 | 146 | 106 | 66 | 156 | 316 | 386 | 396 | 340 | 170 | 210 | 250 | 290 | 330 |
| 291 | 131 | 41 | 81 | 121 | 191 | 216 | 56 | 6 | 26 | 116 | 276 | 342 | 302 | 262 | 222 | 182 | 352 | 362 | 372 |
| 331 | 161 | 201 | 241 | 281 | 321 | 256 | 96 | 16 | 36 | 76 | 236 | 172 | 142 | 102 | 62 | 152 | 312 | 382 | 392 |
| 267 | 227 | 187 | 357 | 367 | 377 | 296 | 136 | 46 | 86 | 126 | 196 | 212 | 52 | 2 | 22 | 112 | 272 | 347 | 307 |
| 107 | 67 | 157 | 317 | 387 | 397 | 336 | 166 | 206 | 246 | 286 | 326 | 252 | 92 | 12 | 32 | 72 | 232 | 177 | 147 |
| 7 | 27 | 117 | 277 | 343 | 303 | 263 | 223 | 183 | 353 | 363 | 373 | 292 | 132 | 42 | 82 | 122 | 192 | 217 | 57 |
| 17 | 37 | 77 | 237 | 173 | 143 | 103 | 63 | 153 | 313 | 383 | 393 | 332 | 162 | 202 | 242 | 282 | 322 | 257 | 97 |
| 47 | 87 | 127 | 197 | 213 | 53 | 3 | 23 | 113 | 273 | 348 | 308 | 268 | 228 | 188 | 358 | 368 | 378 | 297 | 137 |
| 207 | 247 | 287 | 327 | 253 | 93 | 13 | 33 | 73 | 233 | 178 | 148 | 108 | 68 | 158 | 318 | 388 | 398 | 337 | 167 |
| 184 | 354 | 364 | 374 | 293 | 133 | 43 | 83 | 123 | 193 | 218 | 58 | 8 | 28 | 118 | 278 | 344 | 304 | 264 | 224 |
| 154 | 314 | 384 | 394 | 333 | 163 | 203 | 243 | 283 | 323 | 258 | 98 | 18 | 38 | 78 | 238 | 174 | 144 | 104 | 64 |
| 114 | 274 | 349 | 309 | 269 | 229 | 189 | 359 | 369 | 379 | 298 | 138 | 48 | 88 | 128 | 198 | 214 | 54 | 4 | 24 |
| 74 | 234 | 179 | 149 | 109 | 69 | 159 | 319 | 389 | 399 | 338 | 168 | 208 | 248 | 288 | 328 | 254 | 94 | 14 | 34 |
| 124 | 194 | 219 | 59 | 9 | 29 | 119 | 279 | 345 | 305 | 265 | 225 | 185 | 355 | 365 | 375 | 294 | 134 | 44 | 84 |
| 284 | 324 | 259 | 99 | 19 | 39 | 79 | 239 | 175 | 145 | 105 | 65 | 155 | 315 | 385 | 395 | 334 | 164 | 204 | 244 |
| 370 | 380 | 299 | 139 | 49 | 89 | 129 | 199 | 215 | 55 | 5 | 25 | 115 | 275 | 350 | 310 | 270 | 230 | 190 | 360 |
| 390 | 400 | 339 | 169 | 209 | 249 | 289 | 329 | 255 | 95 | 15 | 35 | 75 | 235 | 180 | 150 | 110 | 70 | 160 | 320 |

721

702

| | | | | | | | | | | | | | | | | | | | |
|---|---|---|---|---|---|---|---|---|---|---|---|---|---|---|---|---|---|---|---|
| 741 | 701 | 661 | 621 | 581 | 751 | 761 | 771 | 695 | 535 | 445 | 485 | 525 | 595 | 620 | 460 | 410 | 430 | 520 | 680 |
| 571 | 541 | 501 | 461 | 551 | 711 | 781 | 791 | 735 | 565 | 605 | 645 | 685 | 725 | 660 | 500 | 420 | 440 | 480 | 640 |
| 611 | 451 | 401 | 421 | 511 | 671 | 746 | 706 | 666 | 626 | 586 | 756 | 766 | 776 | 700 | 540 | 450 | 490 | 530 | 600 |
| 651 | 491 | 411 | 431 | 471 | 631 | 576 | 546 | 506 | 466 | 556 | 716 | 786 | 796 | 740 | 570 | 610 | 650 | 690 | 730 |
| 691 | 531 | 441 | 481 | 521 | 591 | 616 | 456 | 406 | 426 | 516 | 676 | 742 | 702 | 662 | 622 | 582 | 752 | 762 | 772 |
| 731 | 561 | 601 | 641 | 681 | 721 | 656 | 496 | 416 | 436 | 476 | 636 | 572 | 542 | 502 | 462 | 552 | 712 | 782 | 792 |
| 667 | 627 | 587 | 757 | 767 | 777 | 696 | 536 | 446 | 486 | 526 | 596 | 612 | 452 | 402 | 422 | 512 | 672 | 747 | 707 |
| 507 | 467 | 557 | 717 | 787 | 797 | 736 | 566 | 606 | 646 | 686 | 726 | 652 | 492 | 412 | 432 | 472 | 632 | 577 | 547 |
| 407 | 427 | 517 | 677 | 743 | 703 | 663 | 623 | 583 | 753 | 763 | 773 | 692 | 532 | 442 | 482 | 522 | 592 | 617 | 457 |
| 417 | 437 | 477 | 637 | 573 | 543 | 503 | 463 | 553 | 713 | 783 | 793 | 732 | 562 | 602 | 642 | 682 | 722 | 657 | 497 |
| 447 | 487 | 527 | 597 | 613 | 453 | 403 | 423 | 513 | 673 | 748 | 708 | 668 | 628 | 588 | 758 | 768 | 778 | 697 | 537 |
| 607 | 647 | 687 | 727 | 653 | 493 | 413 | 433 | 473 | 633 | 578 | 548 | 508 | 468 | 558 | 718 | 788 | 798 | 737 | 567 |
| 584 | 754 | 764 | 774 | 693 | 533 | 443 | 483 | 523 | 593 | 618 | 458 | 408 | 428 | 518 | 678 | 744 | 704 | 664 | 624 |
| 554 | 714 | 784 | 794 | 733 | 563 | 603 | 643 | 683 | 723 | 658 | 498 | 418 | 438 | 478 | 638 | 574 | 544 | 504 | 464 |
| 514 | 674 | 749 | 709 | 669 | 629 | 589 | 759 | 769 | 779 | 698 | 538 | 448 | 488 | 528 | 598 | 614 | 454 | 404 | 424 |
| 474 | 634 | 579 | 549 | 509 | 469 | 559 | 719 | 789 | 799 | 738 | 568 | 608 | 648 | 688 | 728 | 654 | 494 | 414 | 434 |
| 524 | 594 | 619 | 459 | 409 | 429 | 519 | 679 | 745 | 705 | 665 | 625 | 585 | 755 | 765 | 775 | 694 | 534 | 444 | 484 |
| 684 | 724 | 659 | 499 | 419 | 439 | 479 | 639 | 575 | 545 | 505 | 465 | 555 | 715 | 785 | 795 | 734 | 564 | 604 | 644 |
| 770 | 780 | 699 | 539 | 449 | 489 | 529 | 599 | 615 | 455 | 405 | 425 | 515 | 675 | 750 | 710 | 670 | 630 | 590 | 760 |
| 790 | 800 | 739 | 569 | 609 | 649 | 689 | 729 | 655 | 495 | 415 | 435 | 475 | 635 | 580 | 550 | 510 | 470 | 560 | 8 |

731

703

| | | | | | | | | | | | | | | | | | | | |
|---|---|---|---|---|---|---|---|---|---|---|---|---|---|---|---|---|---|---|---|
| 801 | 1001 | 851 | 1051 | 831 | 1031 | 891 | 1091 | 825 | 1025 | 875 | 1075 | 815 | 1015 | 890 | 1090 | 850 | 1050 | 870 | 1070 |
| 1101 | 901 | 1151 | 951 | 1131 | 931 | 1191 | 991 | 1125 | 925 | 1175 | 975 | 1115 | 915 | 1190 | 990 | 1150 | 950 | 1170 | 970 |
| 881 | 1081 | 841 | 1041 | 861 | 1061 | 806 | 1006 | 856 | 1056 | 836 | 1036 | 896 | 1096 | 830 | 1030 | 880 | 1080 | 820 | 1020 |
| 1181 | 981 | 1141 | 941 | 1161 | 961 | 1106 | 906 | 1156 | 956 | 1136 | 936 | 1196 | 996 | 1130 | 930 | 1180 | 980 | 1120 | 920 |
| 821 | 1021 | 871 | 1071 | 811 | 1011 | 886 | 1086 | 846 | 1046 | 866 | 1066 | 802 | 1002 | 852 | 1052 | 832 | 1032 | 892 | 1092 |
| 1121 | 921 | 1171 | 971 | 1111 | 911 | 1186 | 986 | 1146 | 946 | 1166 | 966 | 1102 | 902 | 1152 | 952 | 1132 | 932 | 1192 | 992 |
| 857 | 1057 | 837 | 1037 | 897 | 1097 | 826 | 1026 | 876 | 1076 | 816 | 1016 | 882 | 1082 | 842 | 1042 | 862 | 1062 | 807 | 1007 |
| 1157 | 957 | 1137 | 937 | 1197 | 997 | 1126 | 926 | 1176 | 976 | 1116 | 916 | 1182 | 982 | 1142 | 942 | 1162 | 962 | 1107 | 907 |
| 847 | 1047 | 867 | 1067 | 803 | 1003 | 853 | 1053 | 833 | 1033 | 893 | 1093 | 822 | 1022 | 872 | 1072 | 812 | 1012 | 887 | 1087 |
| 1147 | 947 | 1167 | 967 | 1103 | 903 | 1153 | 953 | 1133 | 933 | 1193 | 993 | 1122 | 922 | 1172 | 972 | 1112 | 912 | 1187 | 987 |
| 877 | 1077 | 817 | 1017 | 883 | 1083 | 843 | 1043 | 863 | 1063 | 808 | 1008 | 858 | 1058 | 838 | 1038 | 898 | 1098 | 827 | 1027 |
| 1177 | 977 | 1117 | 917 | 1183 | 983 | 1143 | 943 | 1163 | 963 | 1108 | 908 | 1158 | 958 | 1138 | 938 | 1198 | 998 | 1127 | 927 |
| 834 | 1034 | 894 | 1094 | 823 | 1023 | 873 | 1073 | 813 | 1013 | 888 | 1088 | 848 | 1048 | 868 | 1068 | 804 | 1004 | 854 | 1054 |
| 1134 | 934 | 1194 | 994 | 1123 | 923 | 1173 | 973 | 1113 | 913 | 1188 | 988 | 1148 | 948 | 1168 | 968 | 1104 | 904 | 1154 | 954 |
| 864 | 1064 | 809 | 1009 | 859 | 1059 | 839 | 1039 | 899 | 1099 | 828 | 1028 | 878 | 1078 | 818 | 1018 | 884 | 1084 | 844 | 1044 |
| 1164 | 964 | 1109 | 909 | 1159 | 959 | 1139 | 939 | 1199 | 999 | 1128 | 928 | 1178 | 978 | 1118 | 918 | 1184 | 984 | 1144 | 944 |
| 814 | 1014 | 889 | 1089 | 849 | 1049 | 869 | 1069 | 805 | 1005 | 855 | 1055 | 835 | 1035 | 895 | 1095 | 824 | 1024 | 874 | 1074 |
| 1114 | 914 | 1189 | 989 | 1149 | 949 | 1169 | 969 | 1105 | 905 | 1155 | 955 | 1135 | 935 | 1195 | 995 | 1124 | 924 | 1174 | 974 |
| 900 | 1100 | 829 | 1029 | 879 | 1079 | 819 | 1019 | 885 | 1085 | 845 | 1045 | 865 | 1065 | 810 | 1010 | 860 | 1060 | 840 | 1040 |
| 1200 | 1000 | 1129 | 929 | 1179 | 979 | 1119 | 919 | 1185 | 985 | 1145 | 945 | 1165 | 965 | 1110 | 910 | 1160 | 960 | 1140 | 940 |

FIG.27

DITHER MATRIX 701

SUB-MATRIX 711

| | | | | | | | | | | | | | | | | | | | |
|---|---|---|---|---|---|---|---|---|---|---|---|---|---|---|---|---|---|---|---|
| 341 | 301 | 261 | 221 | 181 | 351 | 361 | 371 | 295 | 135 | 45 | 85 | 125 | 195 | 220 | 60 | 10 | 30 | 120 | 280 |
| 171 | 141 | 101 | 61 | 151 | 311 | 381 | 391 | 335 | 165 | 205 | 245 | 285 | 325 | 260 | 100 | 20 | 40 | 80 | 240 |
| 211 | 51 | 1 | 21 | 111 | 271 | 346 | 306 | 266 | 226 | 186 | 356 | 366 | 376 | 300 | 140 | 50 | 90 | 130 | 200 |
| 251 | 91 | 11 | 31 | 71 | 231 | 176 | 146 | 106 | 66 | 156 | 316 | 386 | 396 | 340 | 170 | 210 | 250 | 290 | 330 |
| 291 | 131 | 41 | 81 | 121 | 191 | 216 | 56 | 6 | 26 | 116 | 276 | 342 | 302 | 262 | 222 | 182 | 352 | 362 | 372 |
| 331 | 161 | 201 | 241 | 281 | 321 | 256 | 96 | 16 | 36 | 76 | 236 | 172 | 142 | 102 | 62 | 152 | 312 | 382 | 392 |
| 267 | 227 | 187 | 357 | 367 | 377 | 296 | 136 | 46 | 86 | 126 | 196 | 212 | 52 | 2 | 22 | 112 | 272 | 347 | 307 |
| 107 | 67 | 157 | 317 | 387 | 397 | 336 | 166 | 206 | 246 | 286 | 326 | 252 | 92 | 12 | 32 | 72 | 232 | 177 | 147 |
| 7 | 27 | 117 | 277 | 343 | 303 | 263 | 223 | 183 | 353 | 363 | 373 | 292 | 132 | 42 | 82 | 122 | 192 | 217 | 57 |
| 17 | 37 | 77 | 237 | 173 | 143 | 103 | 63 | 153 | 313 | 383 | 393 | 332 | 162 | 202 | 242 | 282 | 322 | 257 | 97 |
| 47 | 87 | 127 | 197 | 213 | 53 | 3 | 23 | 113 | 273 | 348 | 308 | 268 | 228 | 188 | 358 | 368 | 378 | 297 | 137 |
| 207 | 247 | 287 | 327 | 253 | 93 | 13 | 33 | 73 | 233 | 178 | 148 | 108 | 68 | 158 | 318 | 388 | 398 | 337 | 167 |
| 184 | 354 | 364 | 374 | 293 | 133 | 43 | 83 | 123 | 193 | 218 | 58 | 8 | 28 | 118 | 278 | 344 | 304 | 264 | 224 |
| 154 | 314 | 384 | 394 | 333 | 163 | 203 | 243 | 283 | 323 | 258 | 98 | 18 | 38 | 78 | 238 | 174 | 144 | 104 | 64 |
| 114 | 274 | 349 | 309 | 269 | 229 | 189 | 359 | 369 | 379 | 298 | 138 | 48 | 88 | 128 | 198 | 214 | 54 | 4 | 24 |
| 74 | 234 | 179 | 149 | 109 | 69 | 159 | 319 | 389 | 399 | 338 | 168 | 208 | 248 | 288 | 328 | 254 | 94 | 14 | 34 |
| 124 | 194 | 219 | 59 | 9 | 29 | 119 | 279 | 345 | 305 | 265 | 225 | 185 | 355 | 365 | 375 | 294 | 134 | 44 | 84 |
| 284 | 324 | 259 | 99 | 19 | 39 | 79 | 239 | 175 | 145 | 105 | 65 | 155 | 315 | 385 | 395 | 334 | 164 | 204 | 244 |
| 370 | 380 | 299 | 139 | 49 | 89 | 129 | 199 | 215 | 55 | 5 | 25 | 115 | 275 | 350 | 310 | 270 | 230 | 190 | 360 |
| 390 | 400 | 339 | 169 | 209 | 249 | 289 | 329 | 255 | 95 | 15 | 35 | 75 | 235 | 180 | 150 | 110 | 70 | 160 | 320 |

| | (a) CONCENTRATING + DRIVING FREQUENCY REGULATING TYPE | (b) DISTRIBUTING + DRIVING FREQUENCY REGULATING TYPE |
|---|---|---|
| 1 | 17 - 13 - 9 - 18 -<br>- 7 - 3 - 15 - 19<br>10 - 0 - 5 -<br>- 4 - 1 - 11<br>14 - 2 - 6 -<br>- 8 - 12 - 16 | 0 - 5 - 3 - 9 -<br>- 10 - 15 - 12 - 19<br>8 - 4 - 6 -<br>- 18 - 14 - 16<br>2 - 7 - 1 -<br>- 13 - 17 - 11 |
| 2 | 17 - 13 - 9 - 18 -<br>- 7 - 3 - 15 - 19<br>10 - 0 - 5 -<br>- 4 - 1 - 11<br>14 - 2 - 6 -<br>- 8 - 12 - 16 | 0 - 5 - 3 - 9 -<br>- 10 - 15 - 12 - 19<br>8 - 4 - 6 -<br>- 18 - 14 - 16<br>2 - 7 - 1 -<br>- 13 - 17 - 11 |
| 3 | 17 - 13 - 9 - 18 -<br>- 7 - 3 - 15 - 19<br>10 - 0 - 5 -<br>- 4 - 1 - 11<br>14 - 2 - 6 -<br>- 8 - 12 - 16 | 0 - 5 - 3 - 9 -<br>- 10 - 15 - 12 - 19<br>8 - 4 - 6 -<br>- 18 - 14 - 16<br>2 - 7 - 1 -<br>- 13 - 17 - 11 |
| 4 | 17 - 13 - 9 - 18 -<br>- 7 - 3 - 15 - 19<br>10 - 0 - 5 -<br>- 4 - 1 - 11<br>14 - 2 - 6 -<br>- 8 - 12 - 16 | 0 - 5 - 3 - 9 -<br>- 10 - 15 - 12 - 19<br>8 - 4 - 6 -<br>- 18 - 14 - 16<br>2 - 7 - 1 -<br>- 13 - 17 - 11 |
| ⋮ | (A PATTERN IS OMITTED.) | (A PATTERN IS OMITTED.) |
| 20 | 17 - 13 - 9 - 18 -<br>- 7 - 3 - 15 - 19<br>10 - 0 - 5 -<br>- 4 - 1 - 11<br>14 - 2 - 6 -<br>- 8 - 12 - 16 | 0 - 5 - 3 - 9 -<br>- 10 - 15 - 12 - 19<br>8 - 4 - 6 -<br>- 18 - 14 - 16<br>2 - 7 - 1 -<br>- 13 - 17 - 11 |

IMAGE PROCESSING METHOD, PROGRAM, RECORDING MEDIUM, IMAGE PROCESSING DEVICE, AND IMAGE FORMING APPARATUS

BACKGROUND OF THE INVENTION

1. Technical Field

This disclosure relates to an image processing method, a program, a recording medium, an image processing device, and an image forming apparatus.

2. Description of the Related Art

As an image forming apparatus such as a printer, a facsimile, a copying machine, and a composite machine thereof, for example, a liquid ejection type image forming apparatus using a liquid ejecting head (liquid drop ejecting head) as a recording head, for example, an ink jet recording apparatus, is known. The ink jet recording apparatus conducts image formation (wherein recording, character printing, photography printing, and printing may be used as synonyms) by ejecting ink as recording liquid from an ink recording head onto a paper sheet (which is not limited to paper but includes an OHP, means an object to which an ink drop, other liquids, or the like is allowed to adhere, and may be referred to as a medium to be recorded, a recording medium, a recording paper, a recording paper sheet, a recording material, a medium, or the like).

In such an image forming apparatus, recording liquid drops with only about four kinds of sizes (four tones), for example, no dot, a small dot, a middle dot, and a large dot, may be ejected separately, and therefore, a representation with multi-tone is hardly conducted with the dot sizes of the recording liquid drops. Accordingly, a dither method and an error diffusion method are generally known as a method for reproducing halftone by means of a combination of a density tone (intensity tone) and surface area tone (surface area modulation) whose level numbers are less than those of an original one.

The dither method (binary dither method) is a method for determining '1' (image printing or light emission) or "0" (no image printing or no light emission) in comparison with the density of a picture element at a corresponding address point to conduct binary coding while the value of each of dither matrices is a threshold value, and has an advantage such that binary-coded data for a surface area tone may be obtained by only an operation of comparison of original image data with a threshold value and a high speed operation is allowed. Also, the error diffusion method is for diffusing errors provided when tone image data are converted into data with a less level number (for example, binary) onto nearby picture elements so as to reduce the tone representation errors together with the surrounding or nearby picture elements.

In both the dither method and the error diffusion method, the number of levels is three or greater. For example, a multilevel error diffusion method is disclosed in Japanese Patent Application Publication No. 2004-112089.

Also, as a dither matrix used in the dither method, there are known a dispersing type one such as a bayer dither, a random dither and a blue noise dither and a concentration type one in which a sub-matrix is arranged in a dither matrix so as to have a screen angle, as disclosed in Japanese Patent Application Publication No. 2003-259118.

Meanwhile, particularly, in an image forming apparatus with a low precision of ink drop (liquid drop) landing, there is a problem of causing "ejection irregularity" such that an ejected liquid drop is hardly landed on a target landing position thereof by an external disturbance or mechanical factor such as variation of the viscosity of ink (liquid), irregularity of the speed of a carriage mounting a recording head, an error in the precision of manufacture of a nozzle and the like, disturbance of a driving wave pattern supplied to an energy generating device of the head, and the like, whereby a target image or tone characteristic is hardly obtained.

Then, Japanese Patent Application Publication 2005-138494 discloses that timing for supplying a driving frequency to plural recording elements is adjusted to control a landing error caused by ejection irregularity.

However, when timing for supplying a driving frequency to plural recording elements is adjusted to address the liquid drop ejection irregularity caused by the external disturbance or mechanical factor described above, as disclosed in Japanese Patent Application Publication 2005-138494, it is required to modify a processing for each recording element or set the order of liquid drop landing and further to determine a processing depending on an ejection pattern, and therefore, there is a problem such that only an addressing with a particular pattern is allowed.

In particular, since the driving frequency of a deriving wave pattern supplied to a liquid ejecting head tends to increase (attainment of a higher clock frequency) in order to increase a printing speed (decrease a printing time period), the influence of the external disturbance or mechanical factor described above increases so that ejection irregularity of liquid drops is easily caused. The smaller the drop size is, the more the ejection irregularity is easily caused, and it is easily caused in the case where a liquid drop is ejected from a nozzle with a low nozzle precision.

BRIEF SUMMARY

According to an aspect of this disclosure, there is provided an image processing method configured to produce image data output from an image forming apparatus configured to form an image by using a recording head composed of a liquid ejecting head having plural arranged nozzles configured to eject a liquid drop and an energy generating device configured to generate ejection energy corresponding to each nozzle while conducting a halftone processing configured to convert input image data to an N value which is less than a tone (M value) thereof (N value: $M>N\geqq 2$), wherein a halftone processing configured to substantially reduce a driving frequency of a driving wave pattern applied to the energy generating device is conducted when a liquid drop with a drop size causing ejection irregularity or a liquid drop from a nozzle causing ejection irregularity is ejected.

According to another aspect, there is provided a program product configured to make a computer execute a processing configured to produce image data sent to an image forming apparatus, characterized by making a computer execute the image processing method as described above.

Herein, the term "program product" means to include, but not to be limited to, a program and a recording medium in which a program is stored.

According to another aspect of this disclosure, there is provided an image processing device configured to produce image data output from an image forming apparatus configured to form an image by using a recording head composed of a liquid ejecting head having plural arranged nozzles configured to eject a liquid drop and an energy generating device configured to generate ejection energy corresponding to each nozzle while conducting a halftone processing configured to convert input image data to an N value which is less than a tone (M value) thereof (N value: $M>N\geqq 2$), characterized by comprising a device configured to execute the image processing method as described above.

BRIEF DESCRIPTION OF THE DRAWINGS

FIG. 26 is an illustration diagram showing a specific example of threshold values of the dither matrices in FIG. 25.

FIG. 27 is an illustration diagram contributing to an explanation of one dither matrix.

DETAILED DESCRIPTION OF THE PREFERRED EMBODIMENTS

Next, some embodiments of the present invention are described with reference to accompanying drawings.

Figure 1:
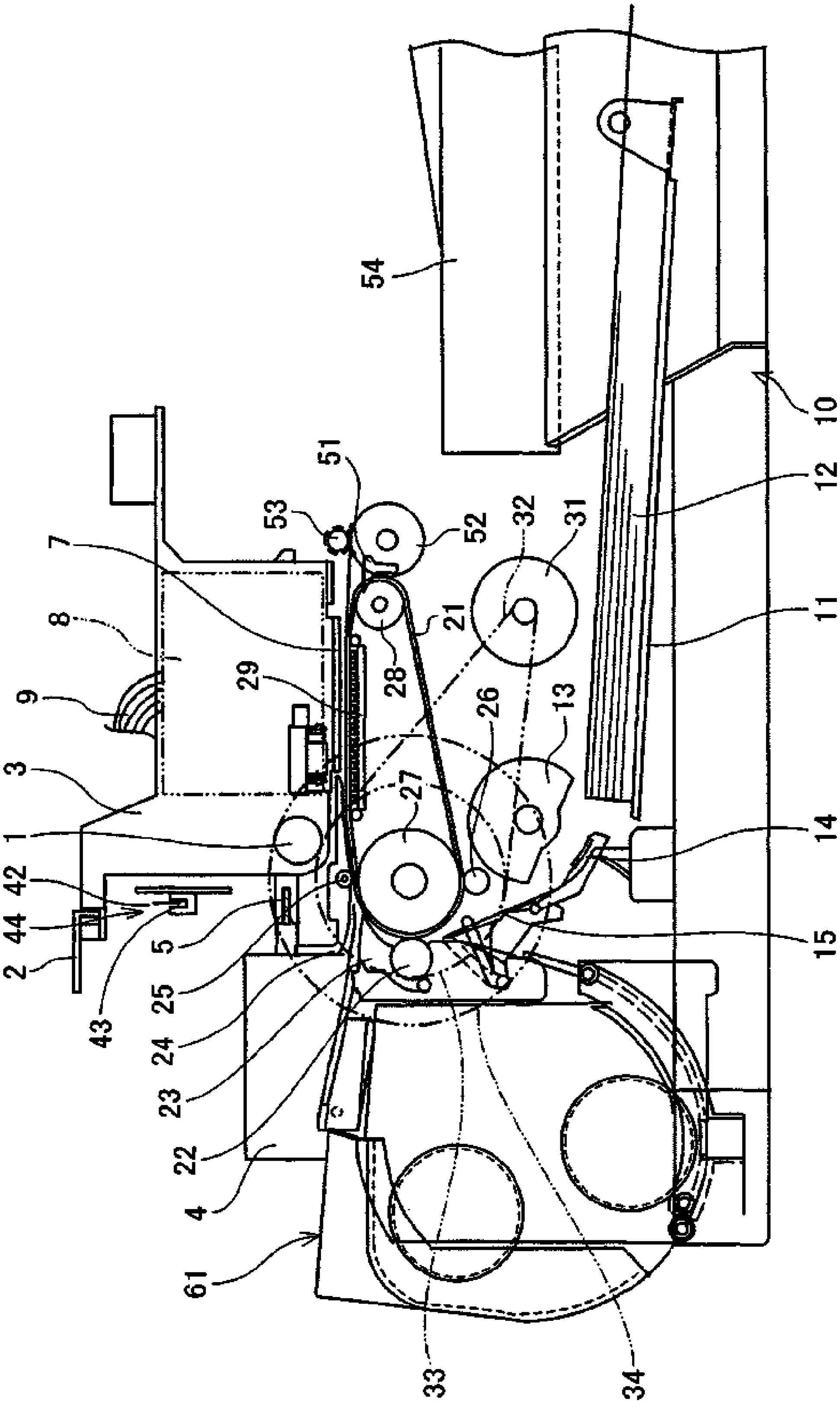
FIG. 1 is a side view illustrating the entire structure of a mechanical part of an image forming apparatus for outputting image data produced by an image processing method according to an embodiment of the present invention.

First, one example of an image forming apparatus for outputting image data produced by an image processing method according to an embodiment of the present invention is described with reference to FIG. 1 and FIG. 2. Additionally, FIG. 1 is a side view illustrating the entire structure of a mechanical part of the image forming apparatus and FIG. 2 is a plan view illustrating the mechanical part.

Figure 2:
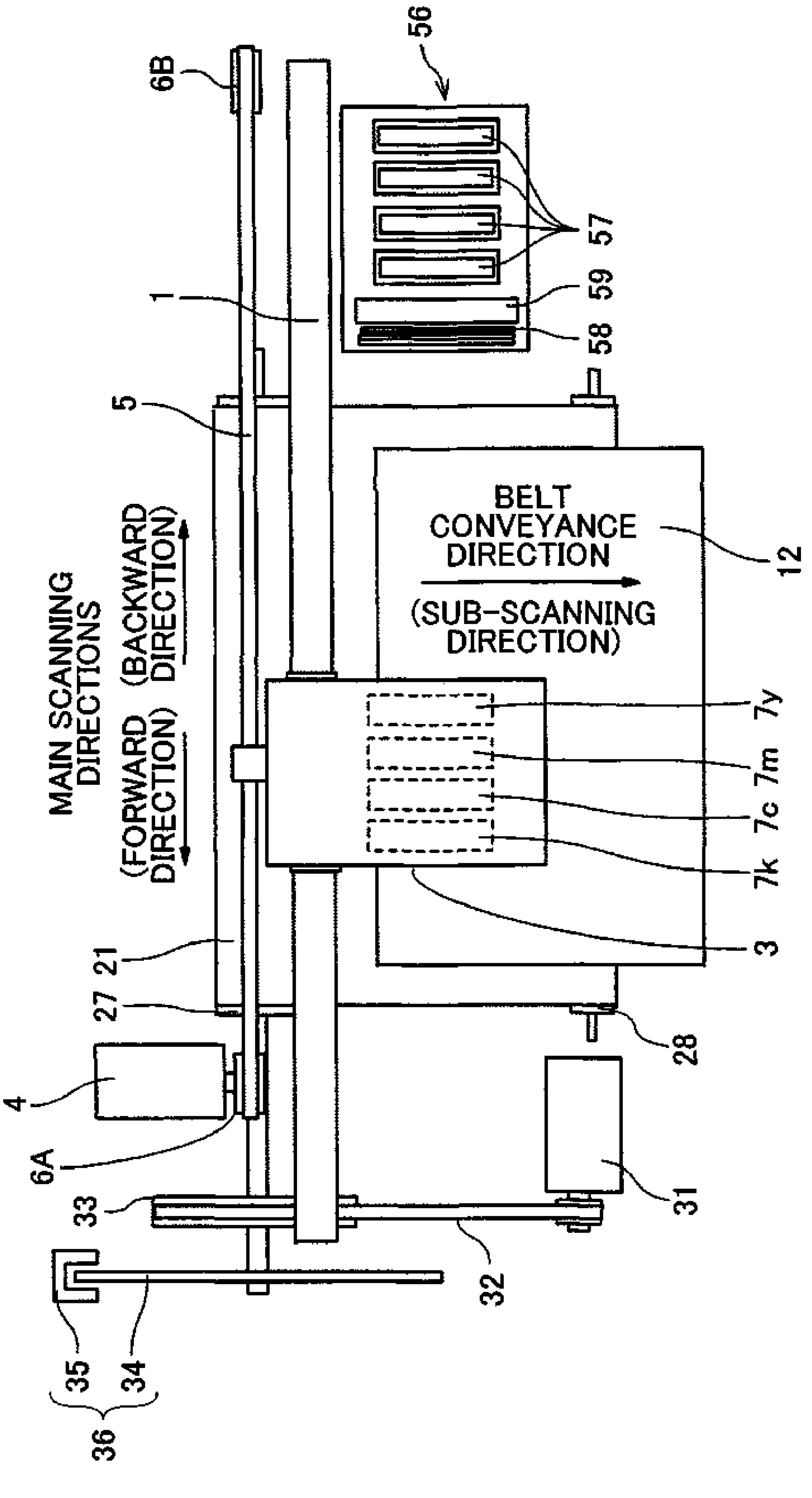
FIG. 2 is a plan view illustrating an essential part of the mechanical part.

In the image forming apparatus, a carriage 3 is held slidably in main scanning directions by a guide rod 1 and a guide rail 2 which are guide members extending across left and right side plates that are not shown in the figures, and moves for scanning in the directions of arrows (the main scanning directions) in FIG. 2, with a timing belt 5 extending on a driving pulley 6A and a driven pulley 6B by a main scanning motor 4.

On the carriage 3, four recording heads 7*y*, 7*c*, 7*m*, 7*k* (referred to as a "recording head 7" when the colors thereof are not distinguished) which are composed of, for example, liquid ejecting heads for ejecting ink drops of yellow (Y), cyan (C), magenta (M) and black (B), respectively, are arranged such that the plural ink ejection ports intersect the main scanning directions, and are carried such that the directions of ink drop ejection are downward.

For a liquid ejecting head constituting the recording head 7, there can be used one which includes a piezoelectric actuator such as a piezoelectric element, a thermal actuator that utilizes a phase change of liquid which is caused by film boiling thereof using an electrothermal element such as a heat element, a shape memory alloy actuator that uses a metal phase change caused by a temperature change, an electrostatic actuator that uses an electrostatic force, or the like as a pressure generating device for generating a pressure for ejecting a liquid drop. Also, it is not limited to the configuration of independent heads for respective colors and may also be composed of one or more liquid ejecting heads having a nozzle line composed of plural nozzles for ejecting liquid drops of plural colors.

Also, sub-tanks 8 for respective colors, for supplying respective colors to the recording head 7, are mounted on the carriage 3. The sub-tanks 8 are provided and supplied with inks from main tanks (an ink cartridge) that are not shown in the figures through ink supply tubes 9.

Meanwhile, a paper feeding part for feeding paper sheets 12 stacked on a paper sheet stacking part (platen) such as a paper feeding cassette 10 includes a separation pad 14 which opposes a meniscus control roller (paper feeding roller) 13 for separating and feeding paper sheets 12 from the paper sheet stacking part 11 one by one and is made of a material with a large frictional coefficient, and the separation pad 14 is pressurized to the side of the paper feeding roller 13.

Then, there are provided a conveyor belt 21 for electrostatically attracting and conveying a paper sheet 12, a counter-roller 22 for conveying and sandwiching a paper sheet 12 delivered from the paper feeding part through a guide 15 between it and the conveyor belt 21, a conveyor guide 23 for changing the course of a paper sheet 12 delivered vertically upward by approximately 90° and placing it on the conveyor belt 21, and a push control roller 25 pressurized by a push member 24 to the side of the conveyor belt 21, in order to convey a paper sheet 12 fed from the paper feeding part to the lower side of the recording head 7. A charging roller 26 which is a charging device for electrically charging the surface of the conveyor belt 21 is also provided.

Herein, the conveyor belt 21 is an endless belt, extends on a conveyor roller 27 and a tension roller 28, and is configured to rotate to a belt conveyance direction shown in FIG. 2 (sub-scanning direction) while the conveyor roller 27 is rotated with a timing belt 32 and a timing roller 33 by a sub-scanning motor 31. Additionally, a guide member 29 is arranged at the back side of the conveyor belt 21 in accordance with an image forming area of the recording head 7. Also, the charging roller 26 is arranged to contact the top surface of the conveyor belt 21 and rotates according to the one-directional rotation of the conveyor belt 21.

Also, as shown in FIG. 2, a slit disk 34 is attached to the spindle of the conveyor roller 27 and a sensor 35 for sensing the slit of the slit disk 34 is provided, whereby a rotary encoder 36 is configured by the slit disk 34 and the sensor 35.

Furthermore, a paper ejecting part for ejecting a paper sheet 12 on which recording is made by the recording head 7 includes a separation claw 51 for separating a paper sheet 12 from the conveyor belt 21, a paper ejecting roller 52, a paper ejection control roller 53, and a paper ejection tray 54 for stocking an ejected paper sheet 12.

Also, a double-sided paper feeding unit 61 is detachably attached to the backside. The double-sided paper feeding unit 61 captures and reverses a paper sheet 12 returned by the backward directional rotation of the conveyor belt 21, and feeds the paper sheet between the counter roller 22 and the conveyor belt 21 again.

Furthermore, as shown in FIG. 2, a maintenance and recovery mechanism 56 for maintaining and recovering the condition of a nozzle of the recording head 7 is arranged in a non-printing area at one side of the scanning directions of the carriage 3.

The maintenance and recovery mechanism 56 includes each cap 57 for capping each nozzle face of the recording head 7, a wiper blade 58 which is a blade member for wiping a nozzle face, a blank ejection receiver 59 for receiving a liquid drop when blank ejection for ejecting a liquid drop that does not contribute to recording is conducted in order to eliminate a thickened recording liquid, and the like.

In thus configured image forming apparatus, paper sheets 12 are separated and fed from the paper feeding part one by one, and the paper sheet 12 fed approximately vertically upward is guided by a guide 15, sandwiched and conveyed between the conveyor belt 21 and the counter roller 22, and pressurized onto the conveyor belt 21 by a push control roller 25 while the tip is guided by the conveyor guide 23 whereby the conveyance direction is changed by approximately 90°.

Then, an alternating voltage that repeats positive and negative ones alternately is applied on the charging roller 26 from an AC bias supplying part by a control part that is not shown in the figures so that the conveyor belt 21 is charged with an alternating charging voltage pattern, that is, a pattern in which pluses and minuses are alternately repeated with predetermined lengths in the sub-scanning directions which are rotation directions. As a paper sheet 21 is fed and sent onto the charged conveyor belt 21, the paper sheet 21 is attracted to the conveyor belt 21 by an electrically static force and the paper sheet 12 is conveyed in the sub-scanning directions by the rotational motion of the conveyor belt 21.

Then, while the carriage 3 is moved to the forward and backward directions and the recording head 7 is driven in response to an image signal, ink drops are ejected onto the stopping paper sheet 12 so as to record one line, and after the paper sheet 12 is conveyed by a predetermined distance, recording of a next line is conducted. When a recoding end signal or a signal for the back end of the paper sheet 12 which have reached a recording area is received, the recording operation is finished and the paper sheet 12 is ejected onto the paper ejection tray 54.

Also, in double-sided printing, when recording of the front surface (the firstly-printed surface) is finished, the conveyor belt 21 is reversely rotated so as to deliver a recorded paper sheet 12 into a double-sided paper feeding unit 61, and the paper sheet 12 is reversed (on the condition that the back surface is a surface to be printed) and fed into between the counter roller 22 and the conveyor belt 22 again. Similarly to the above descriptions, after delivery is made onto the conveyor belt 21 by conducting a timing control and recording is conducted on the back surface, paper sheet ejection is made onto the paper ejection tray 54.

Furthermore, during the standby for printing (recording), the carriage 3 is moved to the side of a maintenance and recovery mechanism 55 and the nozzle faces of the recording head 7 are capped with caps 57 so as to keep the nozzles on the wetting condition, thereby preventing defective ejection caused by drying of ink. Moreover, a recovery operation for eliminating thickened recording liquid or air bubbles is conducted by suctioning recording liquid from the nozzles on the condition that the recording head 7 is capped with the caps 57, and wiping is conducted with the wiper blade 58 in the recovery operation in order to clean and eliminate ink adhering to the nozzle faces of the recording head 7. Also, before the start of recording, the operation of blank ejection for ejecting ink that does not relate to recording is conducted, for example, during the recording. Thereby, the stable ejection performance of the recording head 7 is maintained.

Figure 3:
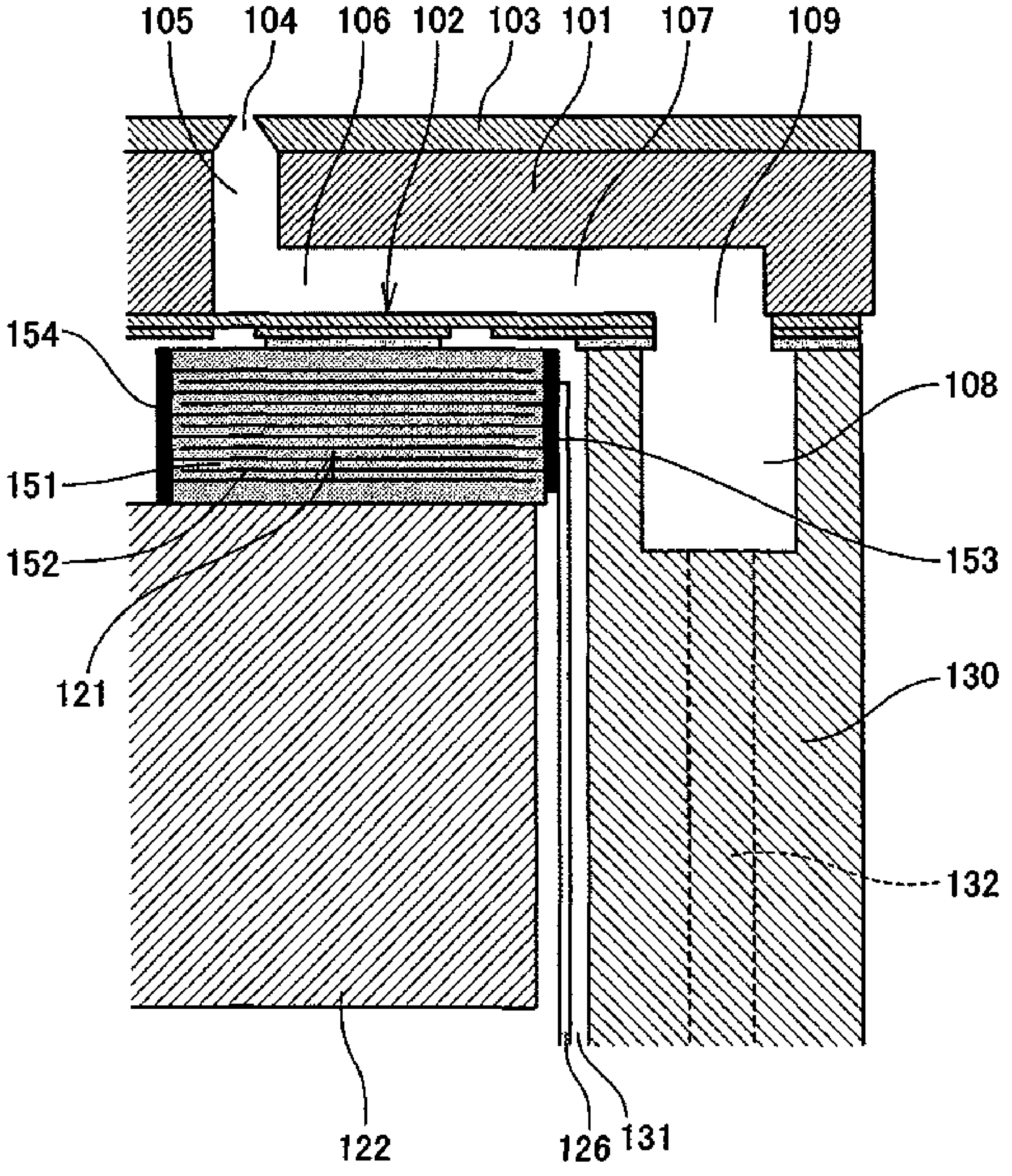
FIG. 3 is cross-sectional diagram illustrating one example of a recording head of the apparatus in the longitudinal directions of a liquid chamber.
Figure 4:
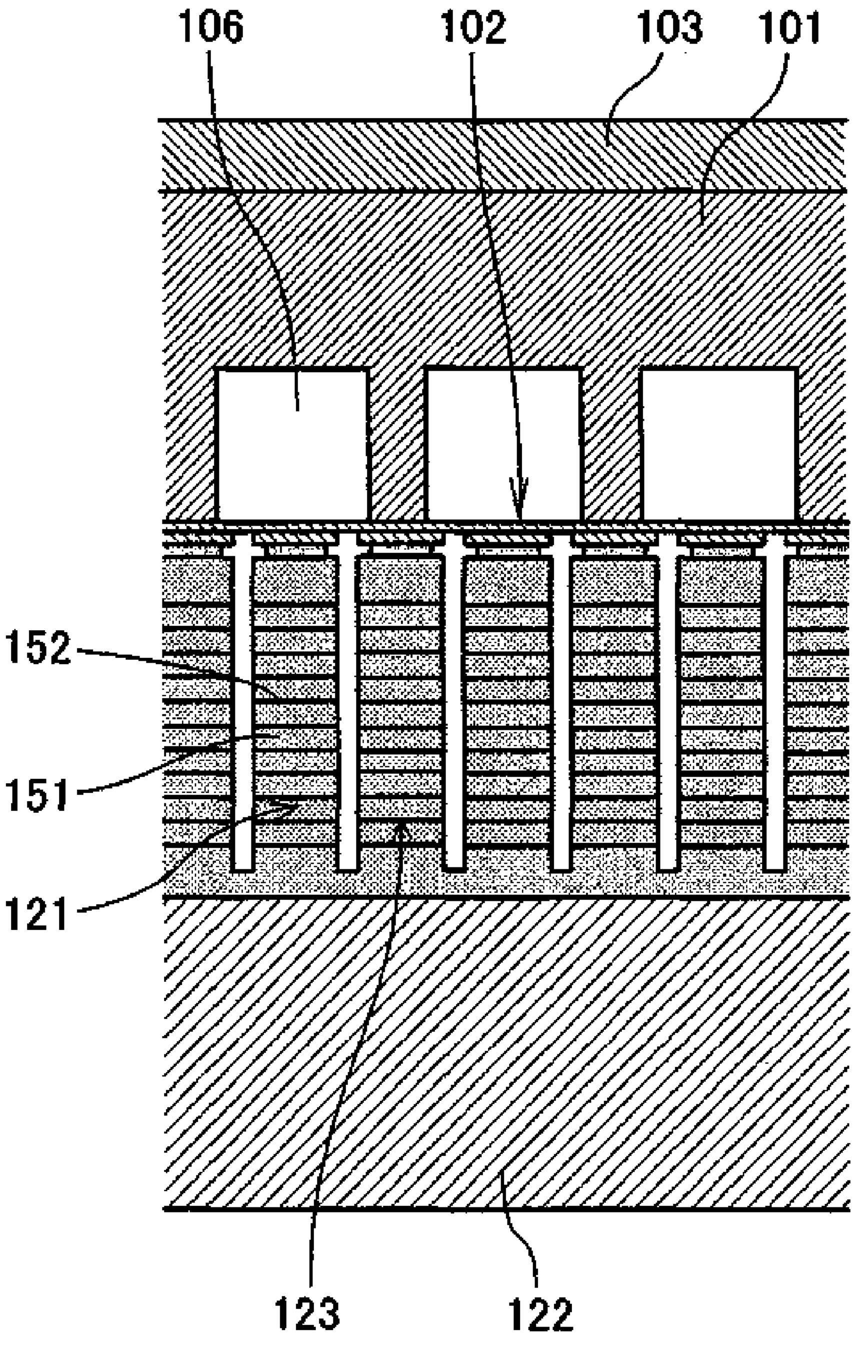
FIG. 4 is a cross-sectional diagram illustrating the recording head in the lateral directions of the liquid chamber.

Next, one example of a liquid ejecting head constituting the recording head 7 is described with reference to FIG. 3 and FIG. 4. Additionally, FIG. 3 is a cross sectional diagram illustrating the head in the longitudinal directions of a liquid chamber and FIG. 4 is a cross-sectional diagram illustrating the head in the lateral directions (nozzle sequence directions) of the liquid chamber.

The liquid ejecting head is configured with a nozzle communication channel 105 that is a flow channel communicating with a nozzle 104 for ejecting a liquid drop (ink drop) and provided by jointing and stacking a flow channel plate 101 which is formed, for example, by anisotropically etching a single crystal silicon substrate, a vibrating plate 102 which is jointed to the lower surface of the channel plate 101 and formed by means of, for example, nickel electroforming, and a nozzle plate 103 jointed to the top surface of the flow channel plate 101, a liquid chamber 106 that is a pressure generating chamber, an ink supplying port 109 that is provided for supplying ink to the liquid chamber 106 through a fluid resistance part (supplying channel) 107 and communicating with a common liquid chamber 108, and the like.

Also, there are provided two lines of laminated-type piezoelectric elements 121 (that are not shown in the figures) as electromechanical elements which are pressure generating devices (actuator devices) for pressurizing ink in the liquid chamber 106 by deforming the vibrating plate 102, and a base substrate 122 for jointing and fixing the piezoelectric elements 121. Additionally, supporting pillar parts 123 are provided between the piezoelectric elements 121. The supporting pillar parts 123 are parts that are formed together with the piezoelectric elements 121 by dividing and processing a piezoelectric member, but are simple supporting pillars since no driving voltage is applied thereon. Also, FC cables 126 on which a driving circuit (driving IC) is mounted and not shown in the figures are connected to the piezoelectric elements 121.

Then, the peripheral portion of the vibrating plate 102 is connected to a frame member 130 and recesses provided for a perforation part 131 for accommodating an actuator unit composed of the piezoelectric elements 121, the base substrate 122 and the like and the common liquid chamber 108 and an ink supply port 132 for supplying ink from the outside to the common liquid chamber 108 are formed on the frame member 130. The frame member 130 is formed by means of injection molding of, for example, a thermosetting resin such as epoxy-type resins or a poly(phenylene sulphite).

Herein, the flow channel plate 101 is provided by forming recesses and holes which are provided for the nozzle communication channel 105 and the liquid chamber 106 by, for example, anisotropically etching a single crystal silicon substrate with a crystallographic orientation (110) using an alkaline etching liquid such as an aqueous solution of potassium hydroxide (KOH). However, it is not limited to the single crystal silicon substrate and others such as a stainless substrate and photosensitive resins may also be used.

The vibrating plate 102 is formed from a metal plate of nickel and fabricated by, for example, an electroforming method (electrocasting method), and however, other metal plates, jointing members of a metal and resin plates, and the like may also be used. The piezoelectric elements 121 and the supporting pillar parts 123 are jointed to the vibrating plate 102 with a bonding material and the frame member 130 is further jointed with a bonding material.

The nozzle plate 103 includes a nozzle with a diameter of 10-30 μm which is formed so as to correspond to each liquid chamber 106, and is jointed to the flow channel plate 101 with a bonding material. The nozzle plate 103 is such that a water-repellent layer is formed on the top surface of a desired layer on the surface of a nozzle forming member made of a metal member.

The piezoelectric element 121 is a laminated-type piezoelectric element (herein, a PZT) provided by laminating piezoelectric materials 151 and internal electrodes 152 alternately. A separate electrode 153 and a common electrode 154 are connected to each of internal electrodes 152 which are alternately led to the different end faces of the piezoelectric element 121. Additionally, in this embodiment, there is provided a configuration such that ink in the liquid chamber 106 is pressurized by using a deformation of the piezoelectric element 121 in directions of d33 as directions of piezoelectricity, but there may also be provided a configuration such that ink in the pressurized liquid chamber 106 is pressurized by using a deformation of the piezoelectric element 121 in directions of d31 as directions of piezoelectricity. Also, there may also be provided a configuration such that one line of piezoelectric elements 121 is provided on one substrate 122.

In thus configured liquid ejecting head, for example, when a voltage applied to the piezoelectric element 121 is lowered relative to a reference electric potential, the piezoelectric element 121 is contracted and the vibrating plate 102 is lowered so as to increase the volume of the liquid chamber 106, whereby ink flows into the liquid chamber 106. Subsequently, the voltage applied to the piezoelectric element 121 is increased so that the piezoelectric element 121 extends in the directions of lamination, and the vibrating plate 102 is deformed toward the direction of the nozzle 104 so as to decrease the volume of the liquid chamber 106. Thereby, recording liquid in the liquid chamber 106 is pressurized so as to eject (jet) a drop of recording liquid from the nozzle 104.

Then, when the voltage applied to the piezoelectric element 121 is set back to the reference electric potential, the vibrating plate 102 is restored to the initial state and the liquid chamber 106 expands so as to generate a negative pressure. Then, the inside of the liquid chamber 106 is filled with recording liquid from the common liquid chamber 108. Then, after the vibration of a meniscus surface at the nozzle 104 damps and is stabilized, transition to an operation for next liquid drop ejection is made.

Additionally, the method for driving the head is not limited to the above example (pull-push-ejection) but pull-ejection or push-ejection may also be conducted depending on a method for providing a driving wave pattern.

Figure 5:
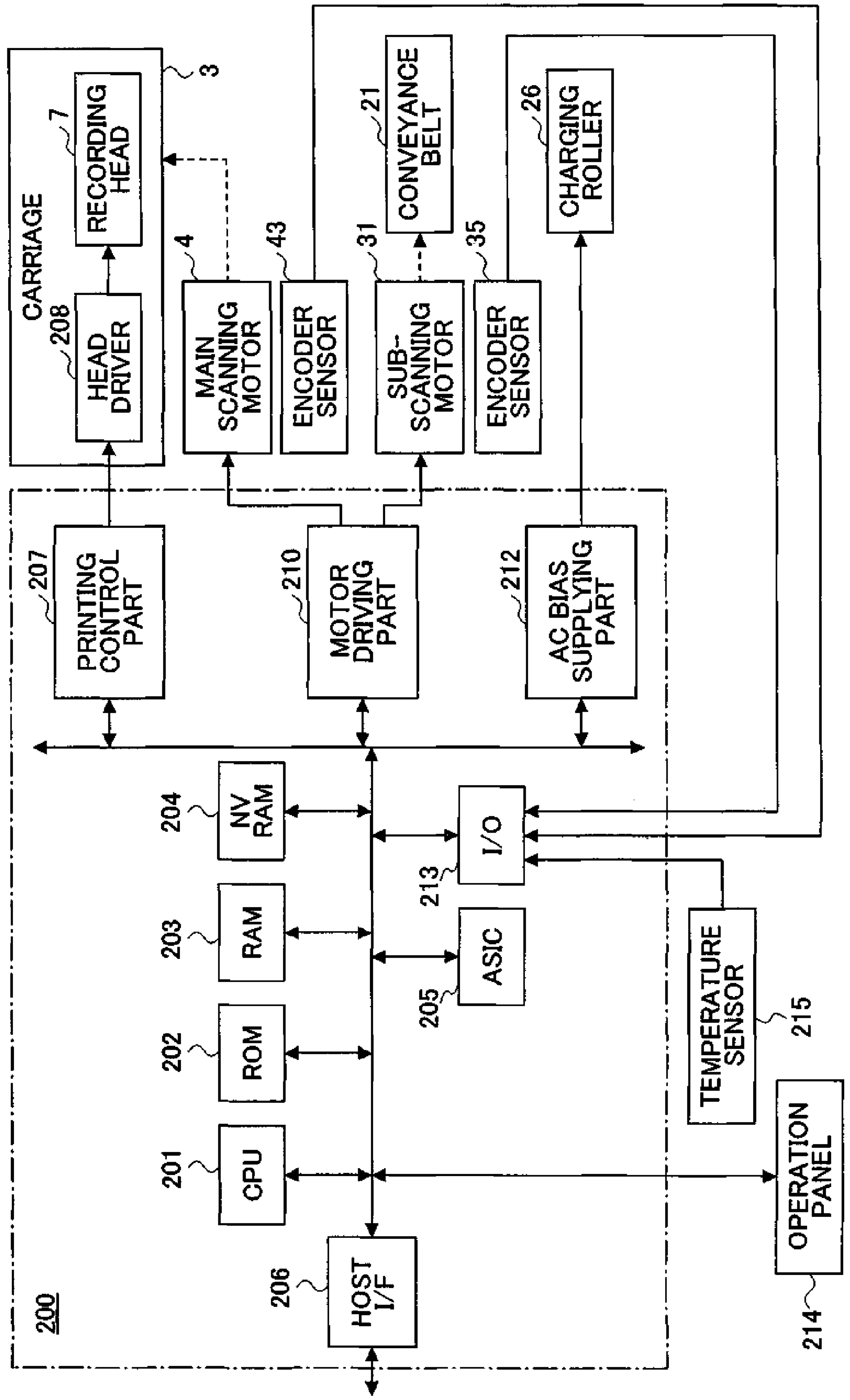
FIG. 5 is a block diagram showing a control part of the apparatus schematically.

Next, a control part of the image forming apparatus is described schematically with reference to the block diagram of FIG. 5.

The control part 200 includes a CPU 211 which also works as a device for correcting a profile according to an embodiment of the present invention (device for conducting jaggy correction) and conduct the control of the entire apparatus, a program containing a program according to an embodiment of the present invention which is executed by the CPU 211, a ROM 202 for storing the other fixed data, a RAM 203 for temporally storing image data and the like, a rewritable non-volatile memory 204 for holding data even when the power supply of the apparatus is switched off, and an ASIC 205 for each kind of signal processing for image data, for an image processing for conducting sorting and the like, and further for processing input and output signals for controlling the entire apparatus.

Also, the control part 200 includes an I/F 206 for conducting the transmission and reception of data or a signal to or from a host, a data transfer device for a driving control of the recording head 7, a printing control part 207 including a driving wave pattern generating device for generating a driving wave pattern, a head driver (driver IC) 208 for driving the recording head 7 provided at the side of the carriage 3, a motor driving part 210 for driving the main scanning motor 4 and the sub-scanning motor 31, an AC bias supplying part 212 for supplying an AC bias to the charging roller, an I/O 213 for inputting each of detection signals from encoder sensors 43 and 35 and a detection signal from each kind of sensor such as a temperature sensor 215 for detecting environmental temperature as a factor causing the displacement of a dot formation position, and the like. Also, an operation panel 214 for conducting input and display of information necessary for the apparatus is connected to the control part 200.

Herein, the control part 200 receives on the I/F 206 image data and the like from a host such as information processing devices such as a personal computer, image reading devices such as an image scanner, imaging devices such as a digital camera, and the like, through a cable or network.

Then, the CPU 201 of the control part 200 reads and analyzes print data in a receiving buffer included in the I/F 206, conducts a necessary image processing at the ASIC 205, a data sort processing, and the like, and transfers the image data from a head driving control part 207 to a head driver 208. Additionally, generation of dot pattern data for image output is conducted at a printer drive at the side of the host, as described below.

The printing control part 207 transfers the above-described image data to the head driver 208 as serial data and outputs to the head driver 208 a transfer clock or latch signal necessary for transfer of the image data and determination of the transfer, a liquid drop controlling signal, and the like. Furthermore, it includes a D/A converter for D/A converting pattern data of a driving signal stored in the ROM, a driving wave pattern generating part composed of an electric voltage amplifier, an electric current amplifier and the like, and a device for selecting a driving wave pattern provided for the head driver, and generates a driving wave pattern composed of one driving pulse (driving signal) or plural driving pulses (driving pulses) so as to output it to the head driver 208.

The head driver 208 drives the recording head 7 by selectively applying a driving signal composed of a driving wave pattern provided from the printing control part 207 to a driving element (for example, a piezoelectric element as described above) for generating energy for ejecting a liquid drop from the recording head 7 based on serially inputted image data corresponding to one line for the recording head 7. Then, dots with different sizes such as large liquid drops (large dots), middle liquid drops (middle dots) and small liquid drops (small dots) can be ejected selectively by selecting a driving pulse constituting a driving wave pattern.

Also, the CPU 201 calculates a driving output vale (control value) for the main scanning motor 4 based on a speed detection value and position detection value obtained by sampling a detection pulse from the encoder sensor 43 constituting a linear encoder and a speed target value and position target value obtained from preliminarily stored speed and position profiles, and drives the main scanning motor 4 via the motor deriving part 210. Similarly, it calculates a driving output value (control value) for the sub-scanning motor 31 based on a speed detection value and position detection value obtained by sampling a detection pulse from the encoder sensor 35 constituting a rotary encoder and a speed target value and position target value obtained from preliminarily stored speed and position profiles, and drives the sub-scanning motor 31 via the motor driving part 210 and a motor driver.

Figure 6:
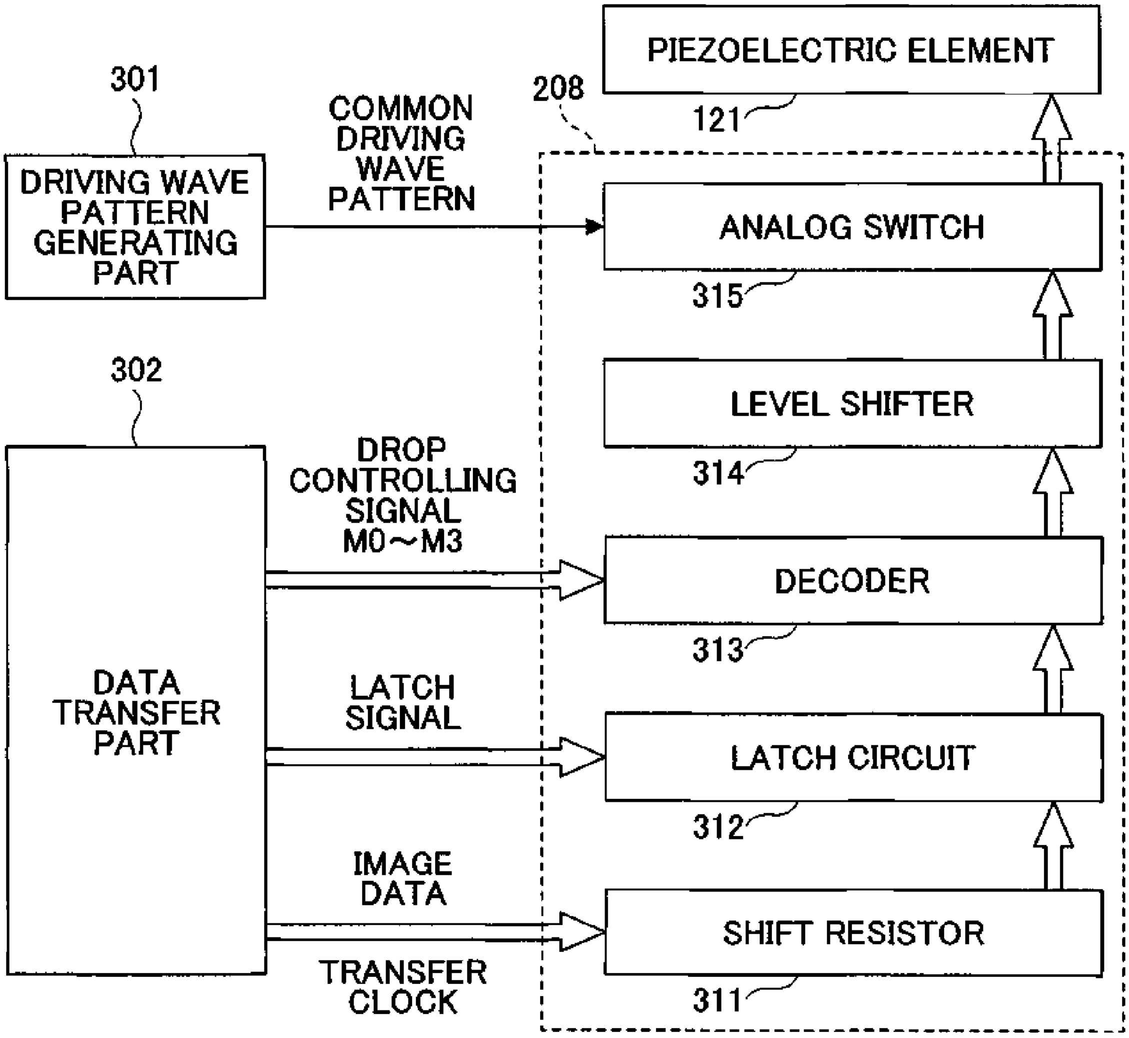
FIG. 6 is a black diagram showing one example of a printing control part of the control part.

Next, one example of the printing control part 207 and head driver 208 is described with reference to FIG. 6.

As described above, the printing control part 207 includes a driving wave pattern generation part 301 for generating and outputting a driving wave pattern (common driving wave pattern) composed of plural driving pulses (driving signals) in one printing time period and a data transfer part 302 for outputting two bits of image data corresponding to a printing image (tone signal 0 or 1), a clock signal, a latch signal (LAT), and drop control signals M0-M3.

Additionally, the drop control signal is two bits of signal which specifies, for every drop, the open or close of an analog switch 317 which is a switching device described below of the head driver 208. Then, the state transition to an H level (ON) is conducted at a wave patter which should be selected according to the printing time period of the common driving wave pattern and the state transition to an L level (OFF) is conducted at the time of no selection.

The head driver 208 includes a shift register 311 for inputting a transfer clock (shift clock) and serial image data (tone data: two bits/CH) from the data transfer part 302, a latch circuit 312 for latching each registered value of the shift register 311 according to a latch signal, a decoder 313 for decoding the tone data and the control signals M0-M3 and outputting the results thereof, a level shifter 314 for converting a logic level voltage signal of the decoder 313 into a level at which an analog switch 513 is allowed to operate, and a analog switch 316 which is turned on or off (opened or closed) according to an output of the decoder 313 provided through the level shifter 314.

The analog switch 316 is connected to a selection electrode (separate electrode) 154 of each piezoelectric element 121 and a common driving wave pattern is inputted from the driving wave pattern generating part 301. Therefore, the analog switch 316 is turned on depending on the result of decoding serially transferred image data (tone data) and control signals MN0-MN3 in the decoder 313, whereby a desired driving signal constituting a common driving wave pattern passes (is selected) and is applied to the piezoelectric element 121.

Next, one example of a driving wave pattern is described with reference to FIG. 7 and FIG. 8.

Figure 7:
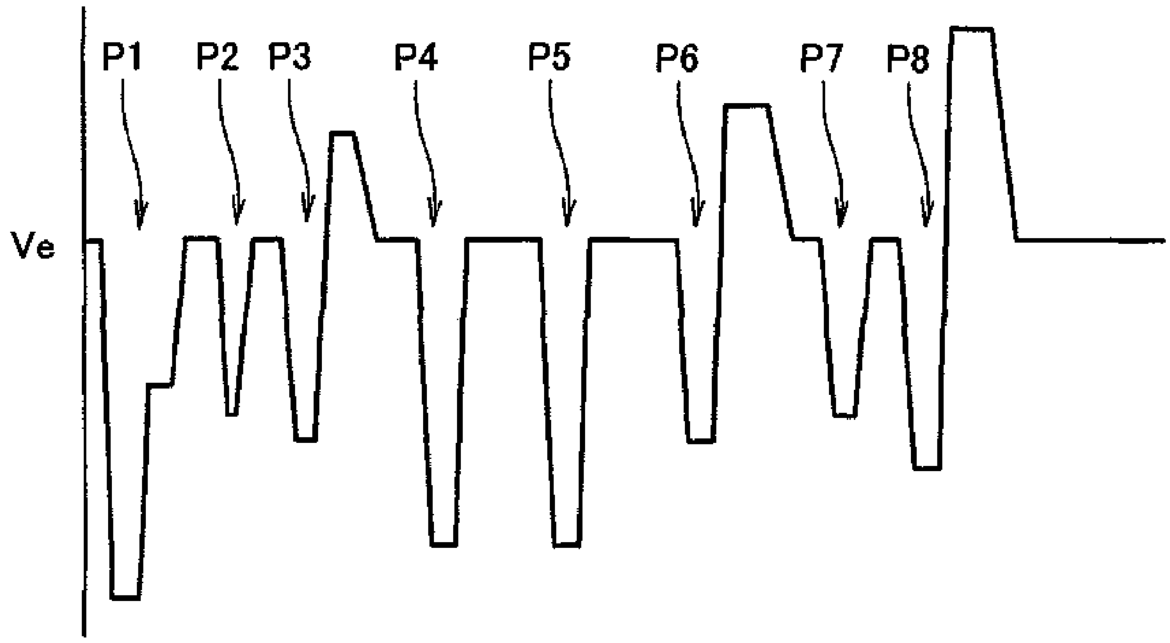
FIG. 7 is an illustration diagram showing one example of a driving wave pattern generated by and output from a driving wave pattern generating part of the printing control part.

As shown in FIG. 7, a driving signal (driving wave pattern) composed of eight driving pulses P1 through P8 which are composed of a wave pattern element falling from a reference electric potential Ve, a wave pattern element rising from the post-falling state, and the like in one printing time period (one driving time period) is generated and output from the driving wave pattern generating part 301. On the other hand, a driving pulse to be used is selected depending on drop control signals M0-M3 from the data transfer part 302.

Herein, a wave pattern element in which the electric potential V of a driving pulse falls from the reference electric potential Ve is a pulling wave pattern element such that the piezoelectric element 121 is contracted thereby so as to increase the volume of the pressurized liquid chamber 106. Also, a wave pattern element rising from the post-falling state is a pressurizing wave pattern element such that the piezoelectric element 121 is extended thereby so as to decrease the volume of the pressurized liquid chamber 106.

Figure 8:
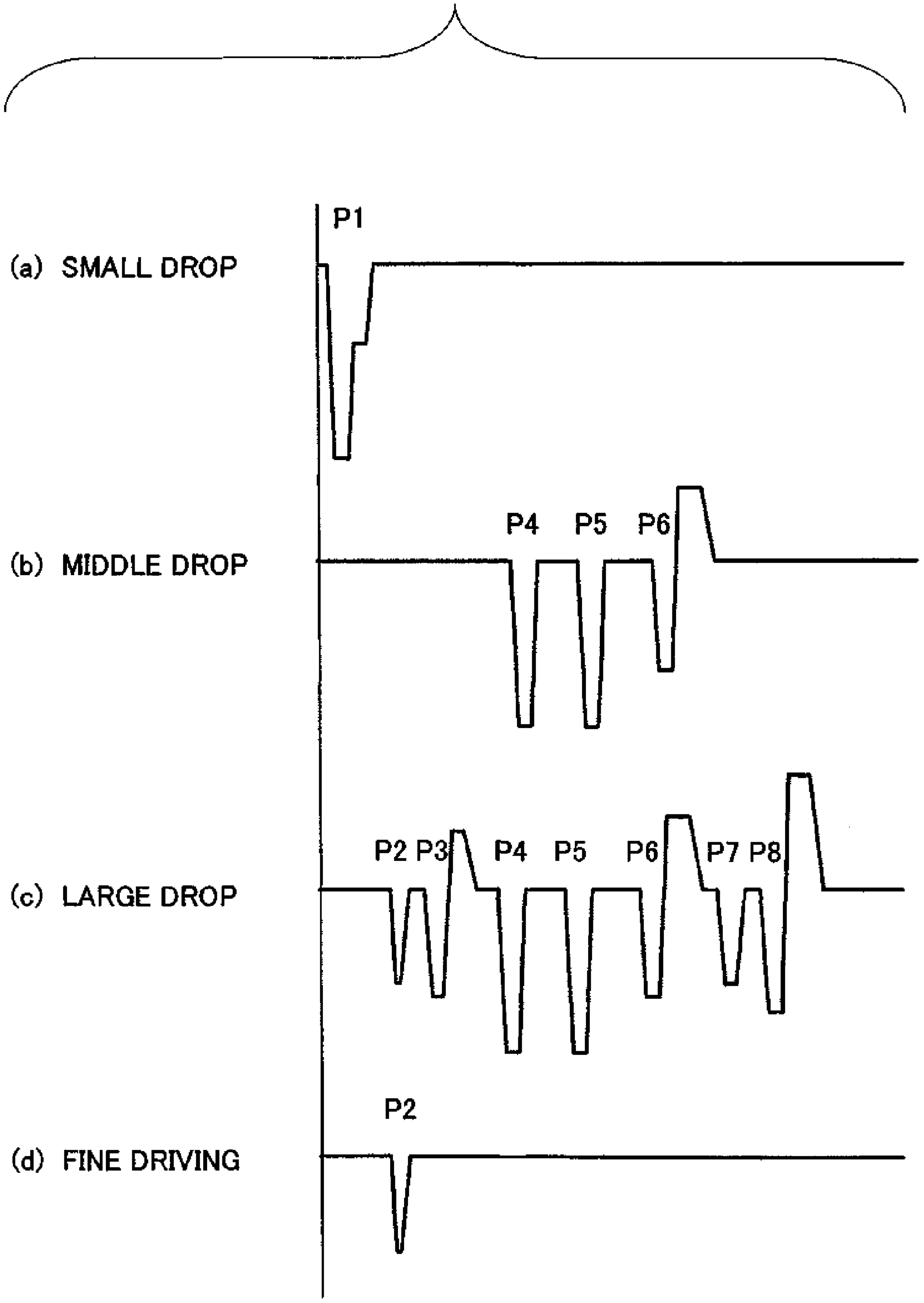
FIG. 8 is an illustration diagram illustrating the relationship between an ejected drop size and a driving wave pattern.

Then, a driving pulse P1 is selected as shown in FIG. 8(*a*) when a small drop (small dot) is formed, driving pulses P4-P6 are selected as shown in FIG. 8(*b*) when a middle drop (middle dot) is formed, driving pulses P2-P8 are selected as shown in FIG. 8(*c*) when a large drop (large dot) is formed, and a fine driving pulse P2 is selected as shown in FIG. 8(*d*) at the time of fine riving (when a meniscus is vibrated without drop ejection), depending on the drop control signals M0-M3 from the data transfer part 302, and any of them is applied to the piezoelectric element 121 of the recording head 7.

When a middle drop is formed, a first drop, a second drop, and a third drop are ejected by a driving pulse P4, a driving pulse P5, and a driving pulse P6, respectively, and they coalesce into one drop during the flight thereof, which is landed. Then, as the natural vibration period of a pressure chamber (liquid chamber 106) is Tc, it is preferable that the interval between the timings of ejection at the driving pulses P4 and P5 be 2Tc±0.5 μs. Since the driving pulses P4 and P5 are each composed of a simple pulling-ejection wave pattern element, the speed of an ink drop may become too high to displace from the landing position of another kind of drop when the driving pulse P6 is similarly a simple pulling-ejection wave pattern element. Herein, in regard to the driving pulse P6, the pull of the meniscus is reduced by reducing the pulling voltage (reducing a falling electric potential), thereby controlling the speed of the third ink drop. However, a rising electric potential is not reduced in order to keep a necessary volume of an ink drop.

That is, a pulling voltage for a pulling wave pattern element of the last driving pulse among the plural driving pulses is relatively small, whereby the speed of drop ejection depending on the last driving pulse is relatively small and the landing position is coincident with that of another kind of drop as much as possible.

Also, the fine driving pulse P2 is a driving wave pattern for vibrating the meniscus without ejecting an ink drop in order to prevent the meniscus of a nozzle from drying. In a non-printing area, the fine driving pulse P2 is applied to the recording head 7. Also, a reduction of the driving time period (speeding up) may be attained by utilizing the driving pulse P2 that is a fine driving wave pattern, as one of driving pulses providing a large drop.

Furthermore, the interval between the timings of ejection at the fine driving pulse P2 and driving pulse P3 is set within a range of the natural vibration period 2Tc±0.5 μs, whereby the volume of an ink drop ejected at the driving pulse P3 may be kept. That is, the volume of a drop ejected at the driving pulse P3 may be larger than the case where the driving pulse P3 is applied singularly, by combining the volume increase of the pressurized liquid chamber 106 at the driving pulse P3 with the pressure vibration of the pressurized liquid chamber 106 which depends on a period of vibration caused by the fine driving pulse P2.

Figure 9:
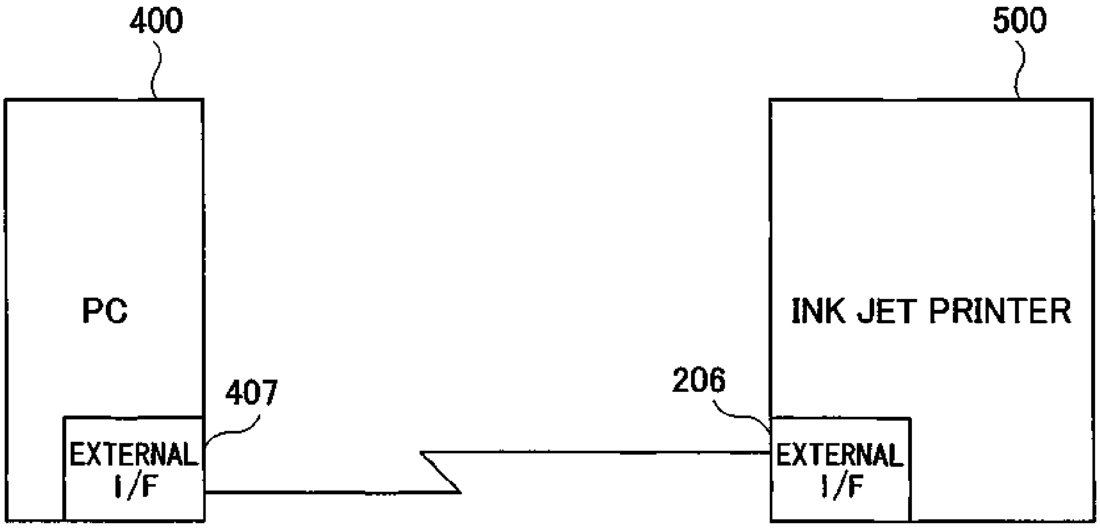
FIG. 9 is a block diagram showing one example of a printing system composed of the image forming apparatus and an image processing device according to an embodiment of the present invention.

Next, an image processing device in which a program according to an embodiment of the present invention is installed which makes a computer execute an image forming method for outputting a printed image according to an embodiment of the present invention using the above-mentioned image forming apparatus and the image forming apparatus are described with reference to FIG. 9, etc.

The printing system (image forming system) is configured such that one or more image processing devices 400 composed of a personal computer (PC) and the like are connected to an ink jet printer 500 via a particular interface or network.

Figure 10:
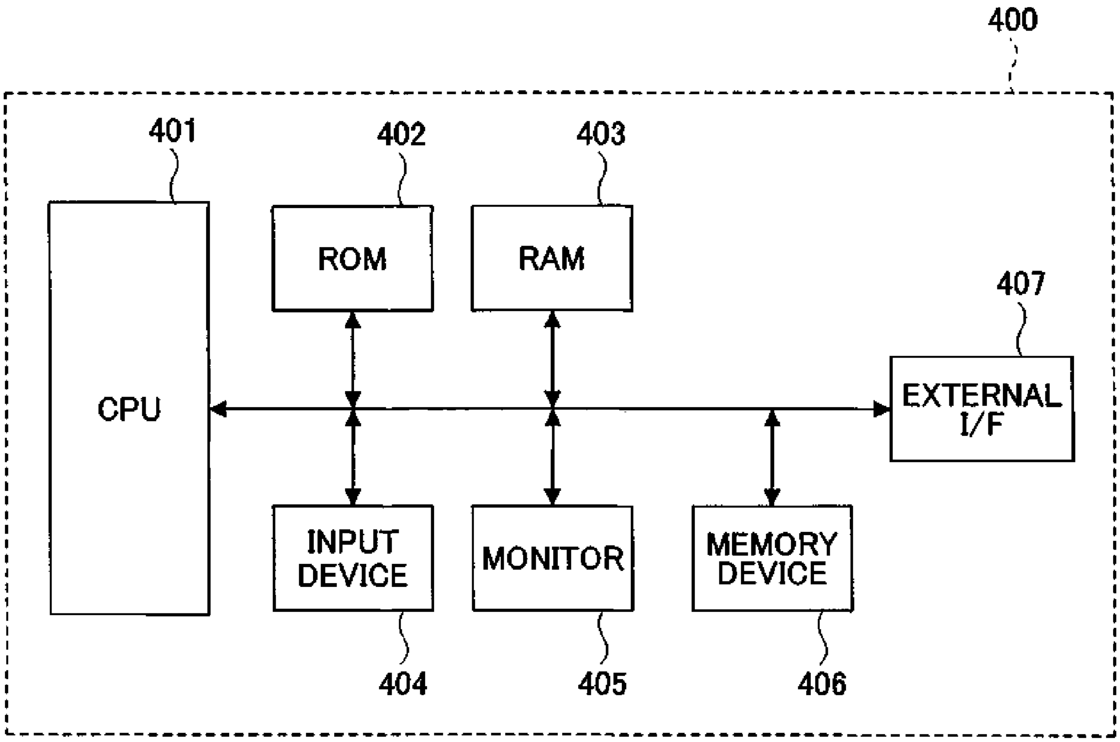
FIG. 10 is a block diagram showing one example of an image processing device in the system.

As shown in FIG. 10, a CPU 401 is connected to each kind of ROM 402 and RAM 403 as memory devices via bus lines in the image processing device 400. To the bus lines, a memory device 406 that uses a magnetic recording device such as a hard disk, an input device 404 such as a mouse and a key board, a monitor 405 such as an LCD and a CRT, and a recording medium reading device for reading a recording medium such as an optical disk, which is not shown in the figures, are connected via particular interfaces. Also, a particular interface (external I/F) 407 is connected for conducting a communication with an external instrument such as a network such as an inter net and a USB.

An image processing program including a program according to an embodiment of the present invention is stored in the memory device 406 of the image processing device 400. The image processing program is installed in the memory device 406 by reading a recording medium by using a recording medium reading device, downloading it from a network such as an internet or the like. Due to the installation, the image processing device 400 is on an operational condition for conducting an image processing as follows. Additionally, the image processing program may be operational on a particular OS. Also, it may be a pert of a particular application software.

Herein, an example of an image processing method according to an embodiment of the present invention which is conducted by means of a program at the side of the image processing device 400 is described with reference to a function block diagram of FIG. 11.

A printer driver 411 which is a program according to an embodiment of the present invention at the side of the image processing device 400 (PC) includes a CMM (Color Management Module) processing part 412 for conducting a conversion of image data 410 provided from an application software and the like (RGB display system→CMY display system) in a color space for monitor display to those in a color space for a recording device (image forming apparatus), a BG/UCR (black generation/Under Color Removal) processing part 413 for conducting black generation/under color removal from CMY values, a total quantity regulation part 414 for correcting a CMYK signal depending on the maximum total quantity value of a recording coloring material by which an image forming apparatus may form an image corresponding to a CMYK signal that is a recording control signal, a γ-correction part 415 for conducting input and output corrections reflecting a characteristic of a recording device or a preference of a user, a zooming process for conducting an enlargement process dependent on the resolution of an image forming apparatus that is not shown in the figure, a halftone processing part (many-valued or few-valued matrix) 416 which includes a many-valued or few-valued matrix for converting image data into an arrangement with a patter of dots ejected from an image forming apparatus, and a rasterizing part 417 for dividing dot pattern data which are printing image data obtained by means of a halftone processing into data for each scanning and for developing the data in accordance with the position of each nozzle for conducting further recording, wherein the output 418 of the rasterizing part 417 is delivered to an ink jet printer 500.

A part of such an image processing may be conducted at the side of the ink jet printer 500. This example is described with reference to a function diagram of FIG. 12.

The printer driver 421 at the side of the image forming apparatus 400 (PC) is to deliver image data generated by the above-mentioned processes including the γ-correction to an ink jet printer 500.

Meanwhile, a printer controller 511 (control part 200) of the ink jet printer 500 includes a zooming part for an enlargement process dependent on the resolution of an image forming apparatus that is not shown in the figure, a halftone processing part (many-valued or few-valued matrix) 516 which includes a many-valued or few-valued matrix (dither matrix) for converting image data into an arrangement with a patter of dots ejected from an image forming apparatus, and a rasterizing part 517 for dividing dot pattern data which are printing image data obtained by means of a halftone processing into data for each scanning and for developing the data in accordance with the position of each nozzle for conducting further recording, wherein the output of the rasterizing part 517 is provided to the printing control part 207.

Figure 11:
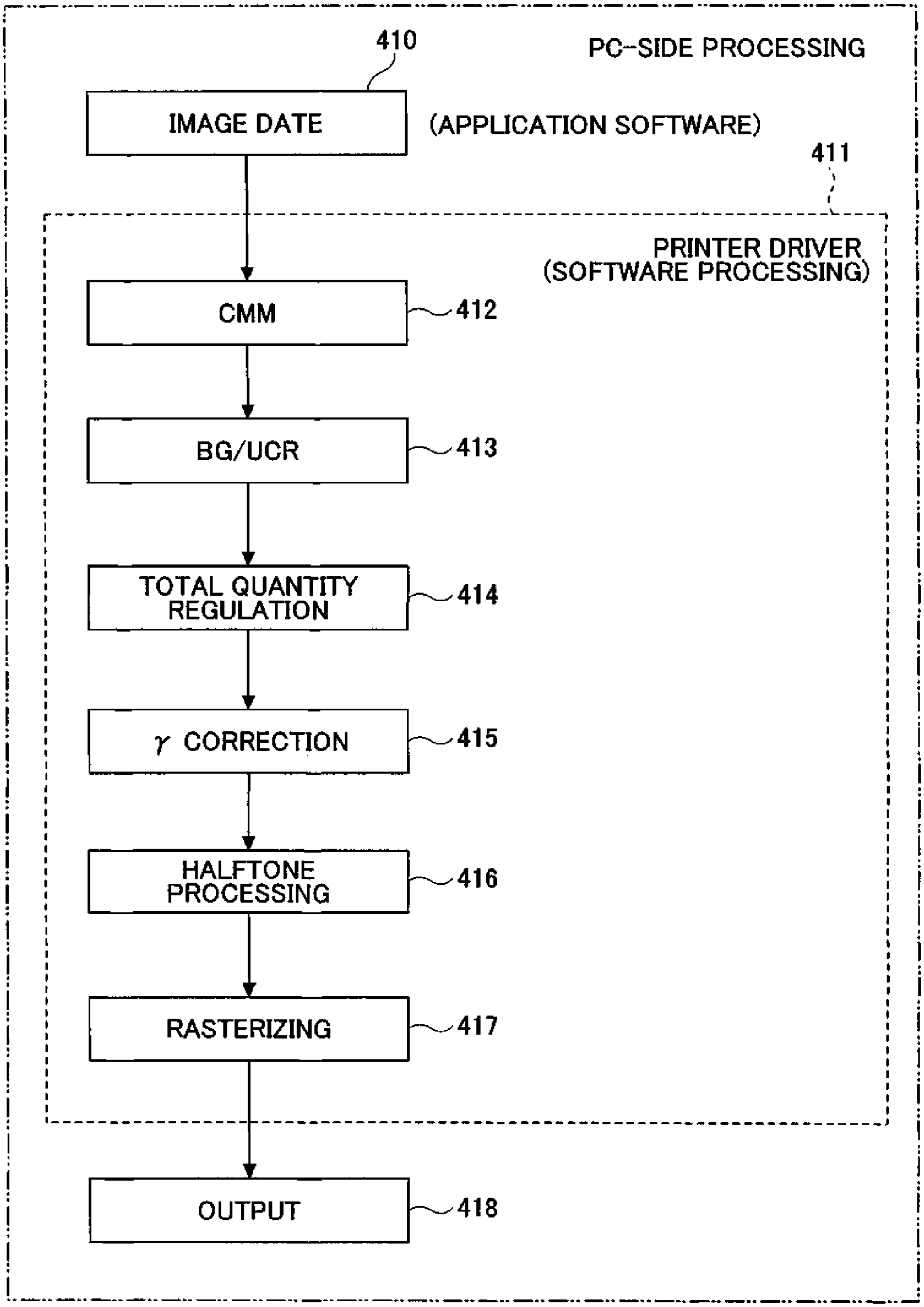
FIG. 11 is a block diagram that functionally illustrates one example of a printer driver as a program according to an embodiment of the present invention.
Figure 12:
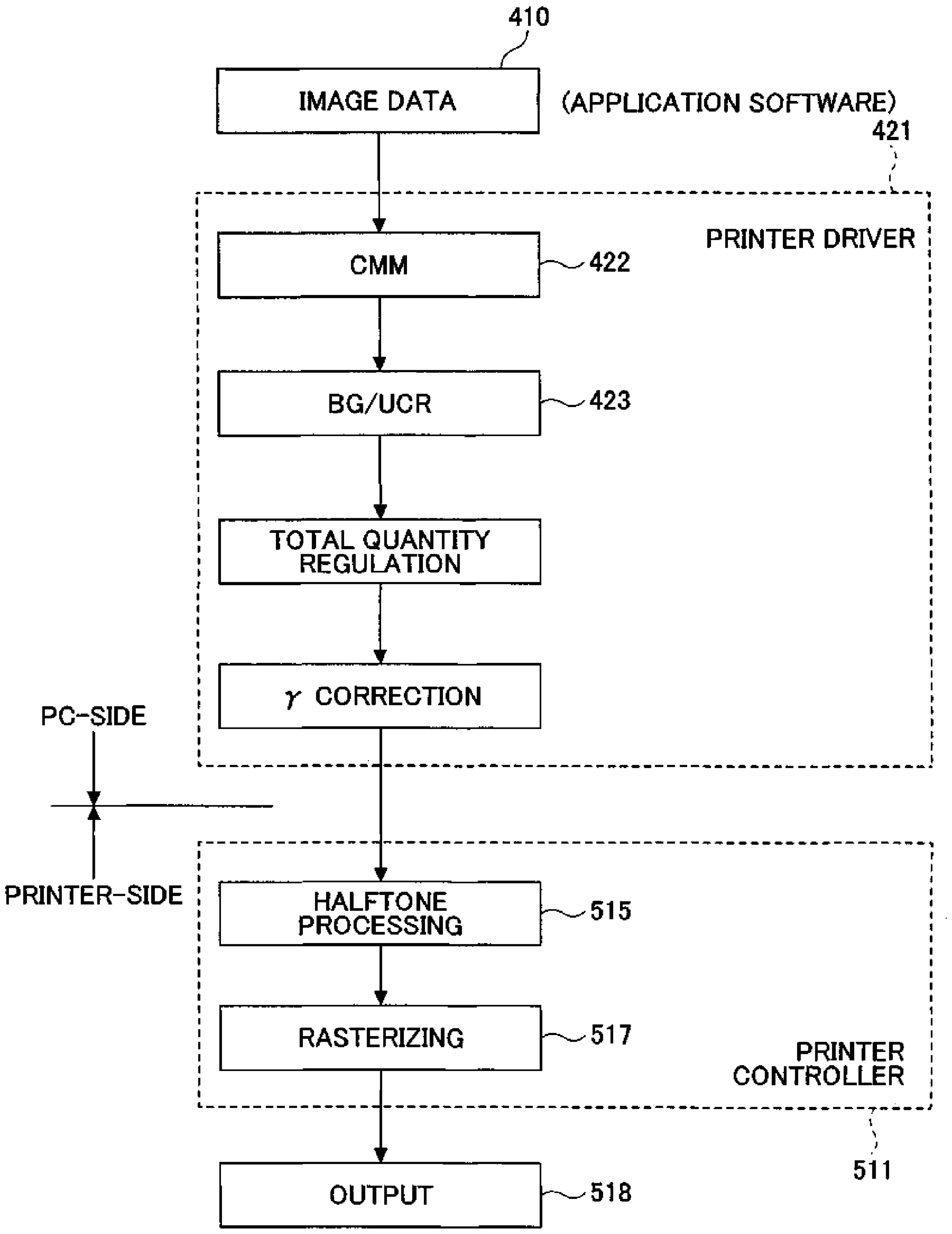
FIG. 12 is a block diagram that functionally illustrates another example of the configuration of the printer driver.

An image processing method according to an embodiment of the present invention may preferably be applied to any of the configurations of FIG. 11 and FIG. 12. Herein, as a configuration shown in FIG. 11, an example of an ink jet recording apparatus having no function of generating a dot pattern which is practically recorded at the side of the apparatus while a command for drawing a picture or printing a character in the apparatus is described. That is, an example is described such that a printing command from an application software and the like which are conducted in the image processing device 400 that is a host is image-processed by the printer driver 411 installed in the image processing device 400 (host computer) as a software so as to generate many-valued dot pattern data (printing image data) which are capable of being output from the ink jet printer 500 and it is rasterized, transferred to the ink jet printer 500 and printed and output from the ink jet printer 500.

Specifically, a command for drawing an picture and recording a character from an application software or an operating system (for example, in which the position, width, form and the like of a line to be recorded are specified or in which the font, size and the like of a character to be recorded are specified) is temporarily stored in an image data memory in the image processing device 400. Additionally, these commands are described in a particular print language.

Then, the command stored in a drawing image data memory is interpreted by a rasterizer, converted into a recording dot pattern dependent on specified position, width and the like in the case of a line recording command, converted into a recording dot pattern dependent on the specified position or size while calling corresponding character outline information from font outline data saved in the image processing device (host computer) 400 in the case of a character recording command, and converted into a recording dot pattern without change in the case of image data.

Subsequently, these recording dot patterns (image data 410) are subjected to an image processing and stored in a raster data memory. Then, the image processing device 400 conducts rasterizing into recording dot pattern data while basic recording positions are on orthogonal grids. For an image processing, as described above, there are provided, for example, a color management (CMM) processing for color adjustment, a γ-correction processing, a halftone processing such as a dither method and an error diffusion method, a background removal processing, an ink total quantity regulation processing, and the like. Then, the recording dot patterns recorded in the raster data memory are transferred to the ink jet recording apparatus 500 via an interface.

An embodiment of the present invention relates to a halftone processing in such an image processing. As mentioned above, a driving wave pattern with a desired driving frequency is provided to an energy generating device of a liquid ejecting head, and the frequency of a driving wave pattern (driving frequency) is constant for each nozzle or each drop size. Then, when a liquid drop with a drop size causing ejection irregularity or a liquid drop from a nozzle causing ejection irregularity is used, image data are generated for which a picture element on which a liquid drop is normally ejected is regarded as a picture element on which no liquid drop is ejected whereby no driving wave pattern for ejecting a liquid drop for the picture element is applied to the energy generating device, and therefore, the driving frequency of a driving wave pattern is substantially reduced. The embodiment of the present invention is to apply a halftone processing to image data in which the driving frequency of a driving wave pattern provided to such an energy generating device is reduced.

First, an example of error diffusion processing on 8 bits of tone levels in which output tones are provided as four values (none=0, small dot=1, middle dot=2, large dot=3) is described with reference to FIG. 13.

A corrected value for which the tone value of a picture element is added to an error value derived from the surrounding thereof is compared to a threshold value, thereby determining a drop size to be ejected thereon. An example shown in FIG. 13 indicates that ejected is a small drop in the case where the corrected value of a picture element is greater than a first threshold value “0”, a middle drop in the case where it is greater than a second threshold value “A”, and a large drop in the case where it is greater than a third threshold value "B". The processing is conducted for all the picture elements, so that the entire image is converted into four values.

Figure 13:
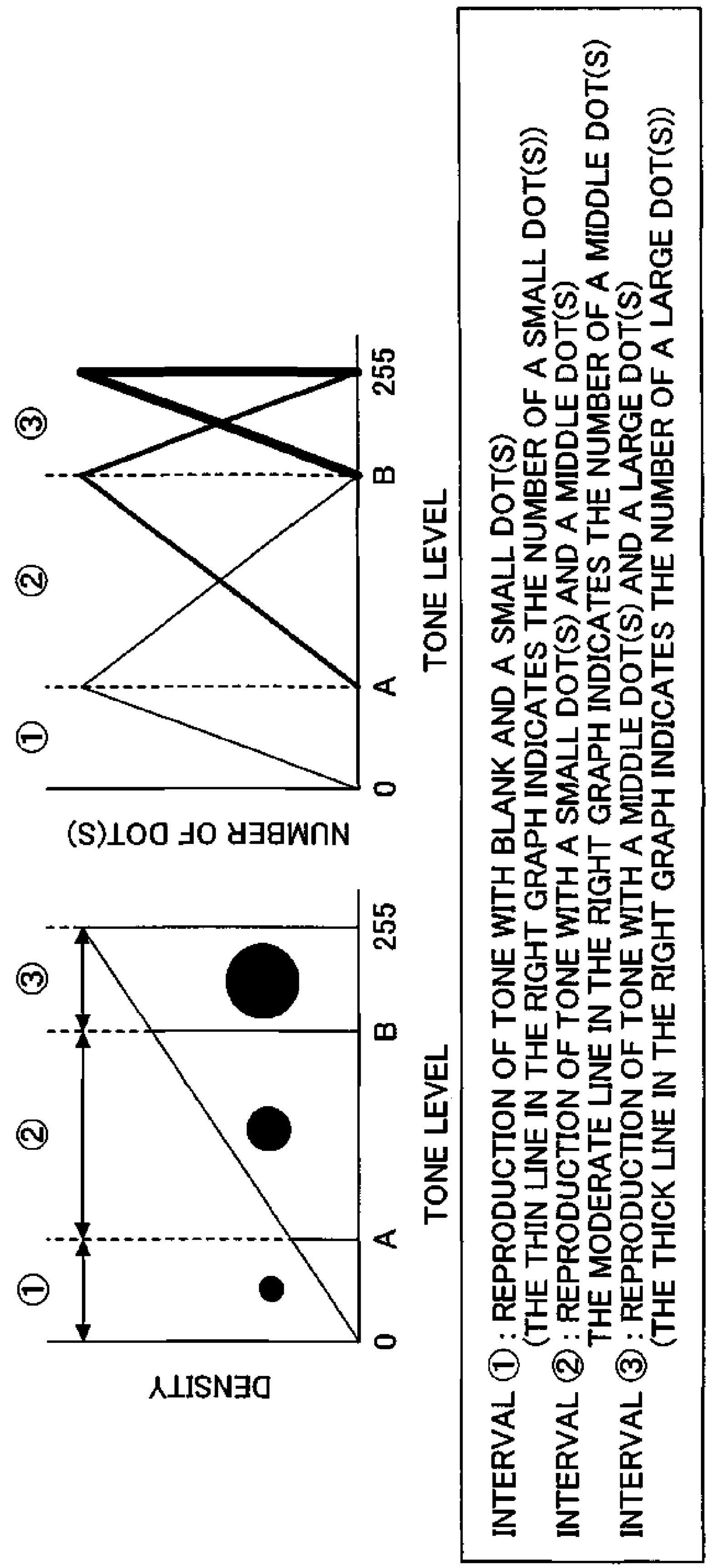
FIG. 13 is an illustration diagram showing one example of the relationship between a tone level and a used drop size in the image forming apparatus.

Therefore, in FIG. 13(*a*), a tone is reproduced with only blank and a small dot(s) in a range of tone level interval L1, a tone is reproduced with a small dot(s) and a middle dot(s) in a range of interval L2, and a tone is reproduced with a middle dot(s) and a large dot(s) in a range of interval L3. When this is viewed from a viewpoint of the number of used dots with each size, a small dot is used in intervals L1 and L2 of the tone level and has a peak at threshold value "A", a middle dot is used in intervals L2 and L3 of the tone level and has a peak at a threshold value "B", and a large dot is used in interval L of the tone level and has a peak at "255", as shown in FIG. 13(*b*).

In an embodiment of the present invention, when a conversion processing from the above-mentioned tone to a liquid drop is conducted, whether a liquid drop is ejected or not for a picture element "a" (the picture element) and whether a liquid drop with a drop size causing ejection irregularity at a picture element "b" is used or not which is on a certain line with the picture element "a" and for which whether a liquid drop is ejected or not is determined just before for the picture element "a" are determined during one main scanning operation of a carriage before ejecting a liquid drop, and if a liquid drop with a drop size causing ejection irregularity has been ejected for the picture element "b", the corrected value is applied without change, for the picture element "a", as an error value and "no drop".

Herein, even if the picture element "a" corresponds to "no drop", the error value of the picture element "a" is a large value, so that the drop size easily increases around the picture element "a", which does not provide a considerable influence on the density or image quality of the entire image. Also, if no liquid drop is ejected at the adjacent picture element "b", a liquid drop is ejected onto the picture element "a" according to the processing, and in this case, the error value of the picture element "a" is small.

On the other hand, when a liquid drop with a drop size causing no ejection irregularity at the picture element "a" is ejected, it is regarded as a picture element on which a liquid drop is normally ejected, without confirmation with respect to the adjacent picture element "b". In this case, the error value of the picture element "a" is also small.

Figure 14:
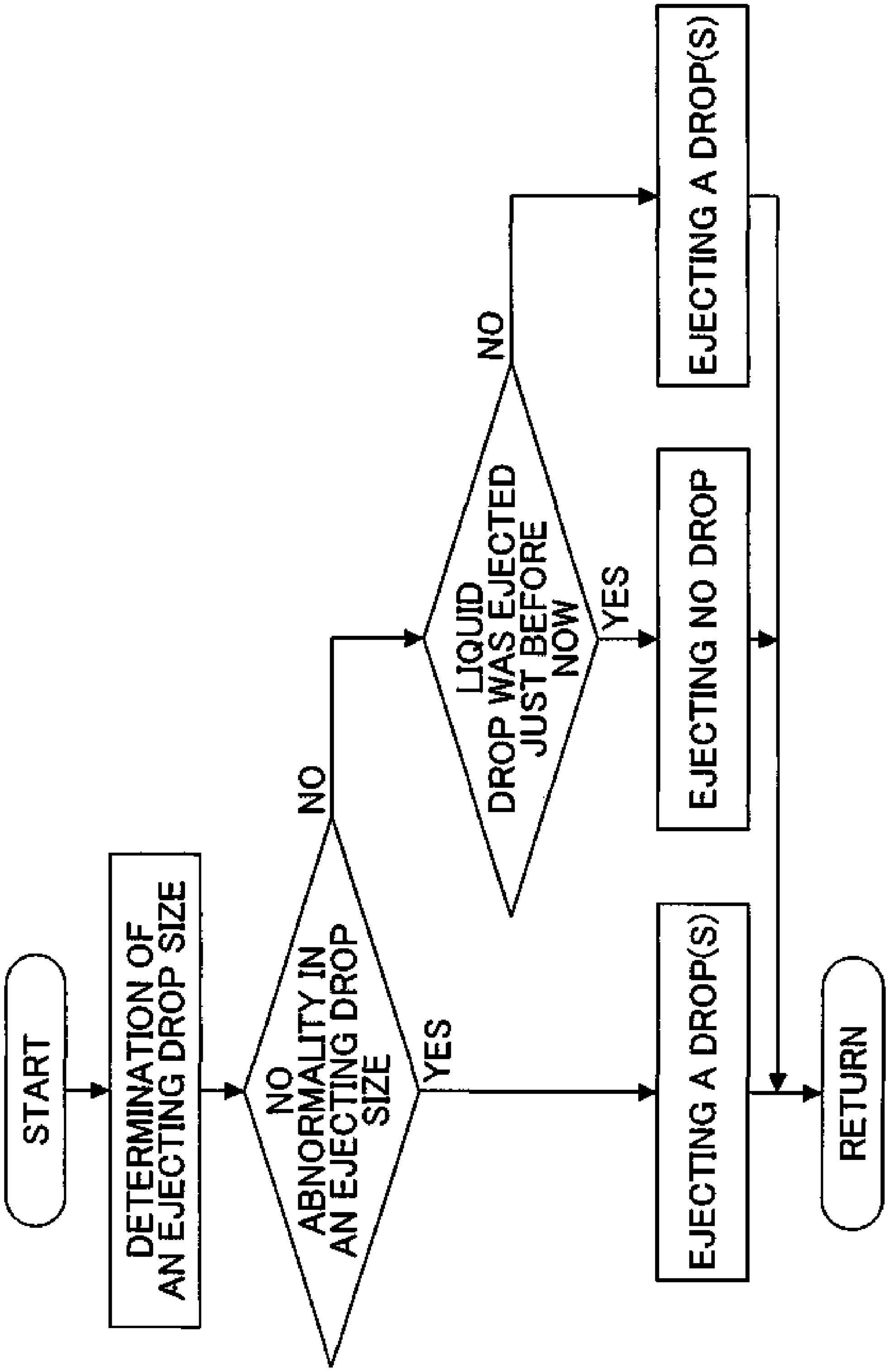
FIG. 14 is a flow diagram illustrating an error diffusion algorithm in the case where a halftone processing in an image processing method according to an embodiment of the present invention is conducted by an error diffusion method.

As the above-mentioned error diffusion algorithm is described with reference to FIG. 14, an error diffusion processing is started to determine the size of a drop ejected onto the picture element. Then, whether the size of an ejected drop is abnormal (a drop size causing no ejection irregularity) or not is determined, and if there is found no abnormality in the size of an ejected drop, a liquid drop is normally ejected onto the picture element. On the contrary, if there is an abnormality in the size of an ejected drop, whether a liquid drop is ejected or not at an adjacent picture element is determined. When a liquid drop is ejected at the adjacent picture element, no liquid drop is ejected onto the picture element, and if no liquid drop is ejected onto the adjacent picture element, a liquid drop is normally ejected. Additionally, the case where ejection irregularity is cased by a drop size is described herein, but the same may also be applied to the case where ejection irregularity is caused by a nozzle.

Figure 15:
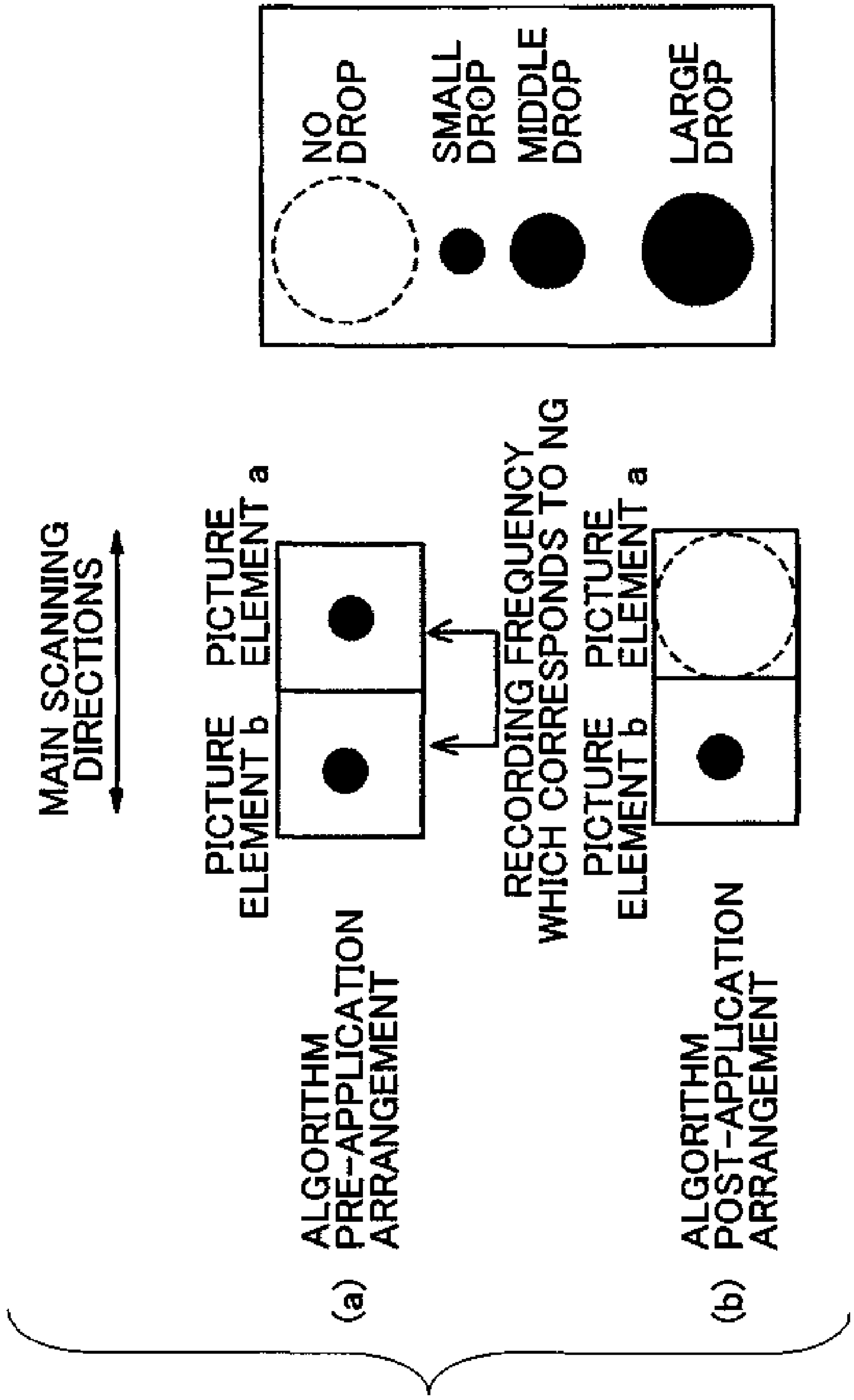
FIG. 15 is an illustration diagram contributing to an explanation of one example of dot arrangements before and after applying a halftone processing (error diffusion processing) according to an embodiment of the present invention.

As specifically described with reference to FIG. 15, liquid drops are ejected onto a picture element "a" and a picture element b adjacent thereto, as shown in FIG. 15(*a*), before the error diffusion algorithm is applied, wherein if a recording frequency (driving frequency) is no good (NG) due to the ejection of liquid drops onto the picture element "a" and the adjacent picture element "b", no liquid drop is ejected onto the picture element "a" (the driving frequency is substantially reduced) by applying the error diffusion algorithm when a liquid drop is ejected onto the picture element "b" adjacent to the picture element "a", as shown in FIG. 15(*b*).

Practically, when ejection irregularity on only small drops is caused by a high driving frequency during one main scanning operation of a carriage, a processing is conducted such that when a liquid drop ejected onto a picture element "a" is a small drop, whether a liquid drop is ejected or not onto an adjacent picture element "b" is determined, wherein if a liquid drop has been ejected, a small drop at the picture element "a" is replaced by "no drop" and if no liquid drop is ejected, a small drop is used.

That is, the driving frequency of a driving wave pattern applied to an energy generating device of a liquid ejecting head (recording head), per se, does not change, but when adjacent picture elements "a" and "b" are formed of liquid drops with a drop size causing ejection irregularity or liquid drops from a nozzle causing ejection irregularity, the driving frequency of a driving wave pattern is substantially reduced (which may be simply referred to as "reducing a driving frequency" below) with respect to the driving frequency of a driving wave pattern at the time of ejection of a liquid drop with a drop size causing no ejection irregularity (or a liquid drop from a nozzle causing no ejection irregularity) by regulating ejection of a liquid drop onto the picture element "a" (providing data for no ejection).

Accordingly, only a driving frequency at the time of ejection of a small drop may be substantially reduced to a half or less of that at the time of normal picture printing without changing the overall printing speed or a driving frequency at the time of ejection of a liquid drop with a drop size causing no ejection irregularity (for example, a middle drop and a large drop), and therefore, image formation may be conducted at a driving frequency causing no ejection irregularity or under the condition that ejection irregularity does not influence an image quality. However, as a result of the error diffusion processing, a liquid drop is ejected regardless of the picture element "b" with respect to a middle drop or large drop such that a liquid drop ejected onto the picture element "a" generates no ejection irregularity.

Figure 16:
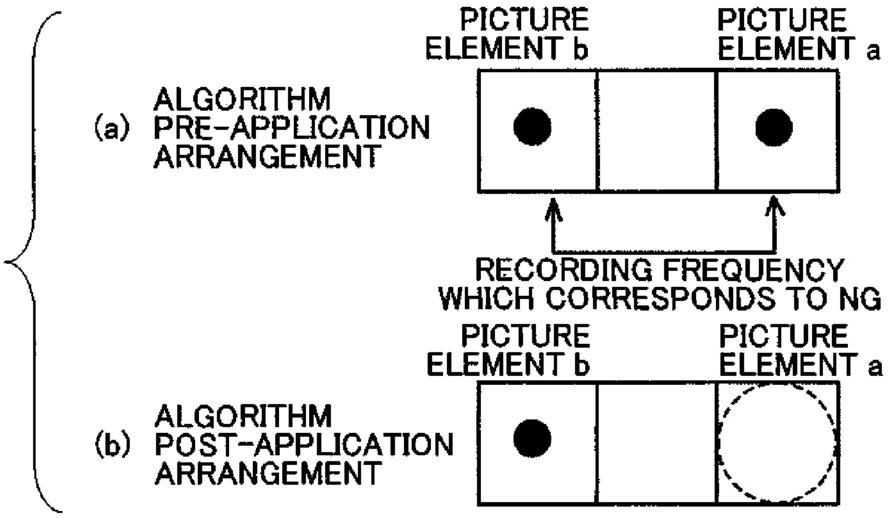
FIG. 16 is an illustration diagram contributing to an explanation of another example of dot arrangements before and after applying a halftone processing (error diffusion processing) according to an embodiment of the present invention.

Herein, the position of the adjacent picture element "b" varies depending on the balance between the driving frequency and the number of recording path(s). For example, when a picture element that is a target of confirmation is set in front by two picture elements as shown in FIG. 16, there are provided two kinds of patterns of "whether a driving frequency is set at a half of default when the number of paths is 2" and "whether a driving frequency is set at one third of default when the number of paths is 1". Also, more front picture element may be a target picture element on which whether a liquid drop is ejected onto the picture element or not is determined (confirmed), depending on the number of path(s) or a driving frequency at the time of picture printing, although the illustration is omitted. In an embodiment of the present invention, an "adjacent picture element" means to include any case.

In the above descriptions, a halftone processing for substantially reducing a driving frequency is conducted based on the ejection conditions of liquid drops sequential in the main scanning directions during once scanning of a recording medium with a carriage mounting a recording head, but a halftone processing for substantially reducing a driving frequency may be conducted based on the ejection conditions of liquid drops sequential in the sub-scanning directions during once scanning of a recording medium with a carriage mounting a recording head.

Figure 17:
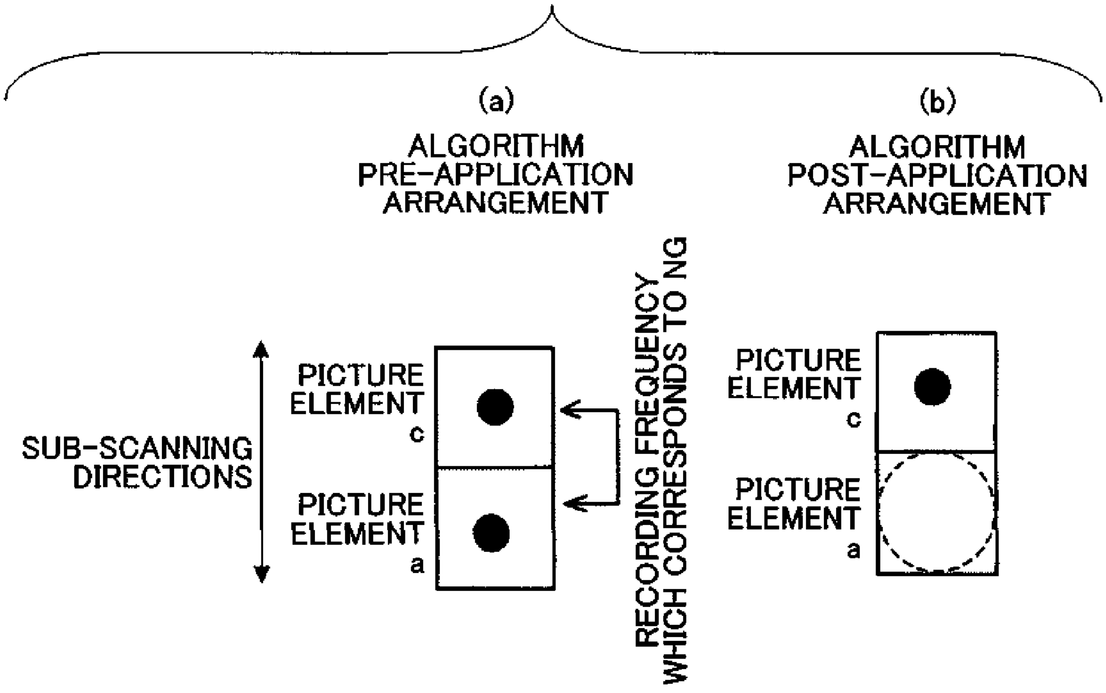
FIG. 17 is an illustration diagram contributing to an explanation of yet another example of dot arrangements before and after applying a halftone processing (error diffusion processing) according to an embodiment of the present invention.

For example, as shown in FIG. 17, the condition of a liquid drop on a adjacent picture element "c" which is adjacent to above or below picture element "a" (the picture element) and for which whether a liquid drop is ejected or not is determined before for picture element "a" (whether a liquid drop with a drop size causing ejection irregularity or a liquid drop from a nozzle causing ejection irregularity is ejected or not) is observed and a driving frequency is reduced by conducting a processing similar to that described above, whereby image degradation caused by ejection irregularity may be suppressed. Additionally, picture element "c" may be separated by one picture element or more, similarly to the case of FIG. 16.

Also, when the driving frequency of an energy generating device (recording element) is high or ejection irregularity may be generated due to nozzle failure or the like regardless of a drop size during one main-scanning operation of a carriage, a processing for confirming the presence or absence of a liquid drop ejected previously is conducted for all the liquid drop sizes to substantially reduce the driving frequency so that the driving frequency of the recording element is a value with no ejection irregularity or a value with a little ejection irregularity.

Figure 18:
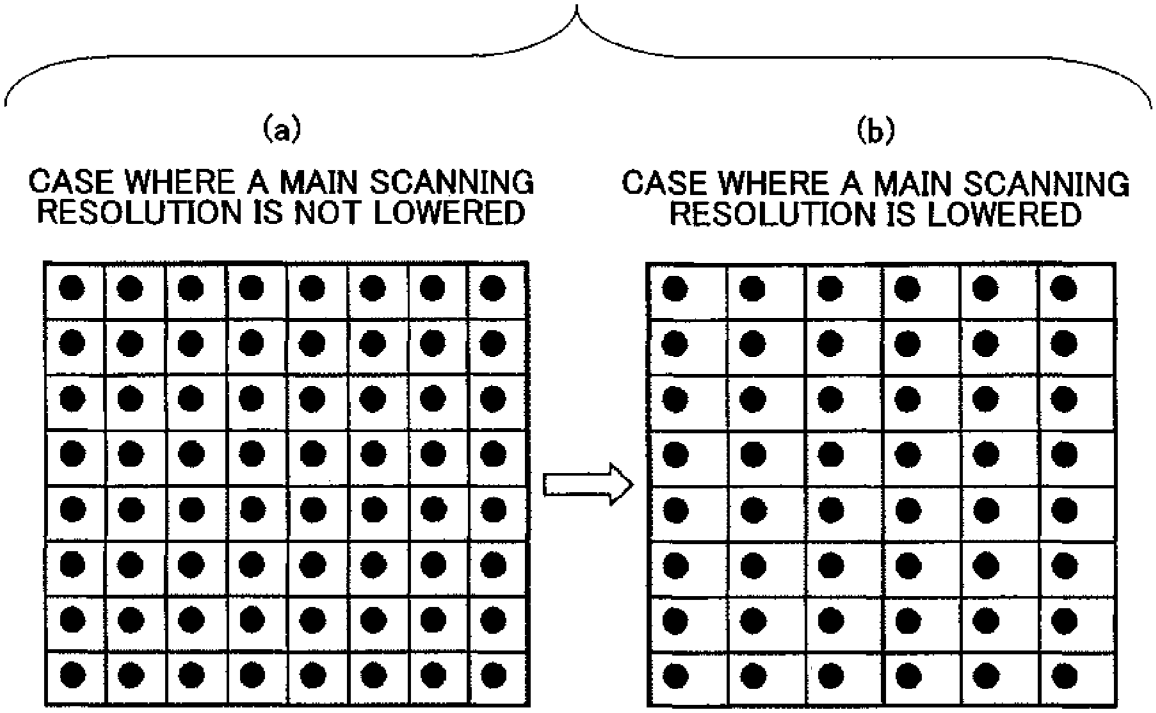
FIG. 18 is an illustration diagram contributing to an explanation of an example in the case where a driving frequency is regulated by modifying the resolution of an image to be printed in a halftone processing according to an embodiment of the present invention.

Furthermore, while the speed of a carriage is kept, ejection irregularity of liquid drops may also be suppressed by reducing the resolution of an image to be printed and increasing the space for liquid drop ejection, as shown in FIG. 18, in order to reduce the driving frequency and conduct printing. Additionally, FIG. 18(*a*) shows the case of conventional main scanning resolution without reduction of the resolution and FIG. 18(*b*) shows the case where the main scanning resolution is reduced.

Also, when a halftone processing method used for the halftone processing is not an error diffusion method but a dither method, a dither matrix (dither mask) in which a threshold value is previously set to reduce a driving frequency in regard to the development manner of a dot at a tone level containing a liquid drop to be ejected by reducing a driving frequency is used without determining dots for any of input images as an error diffusion method, in order to substantially reduce the driving frequency of a liquid drop ejected during one main scanning operation of a carriage.

Figure 19:
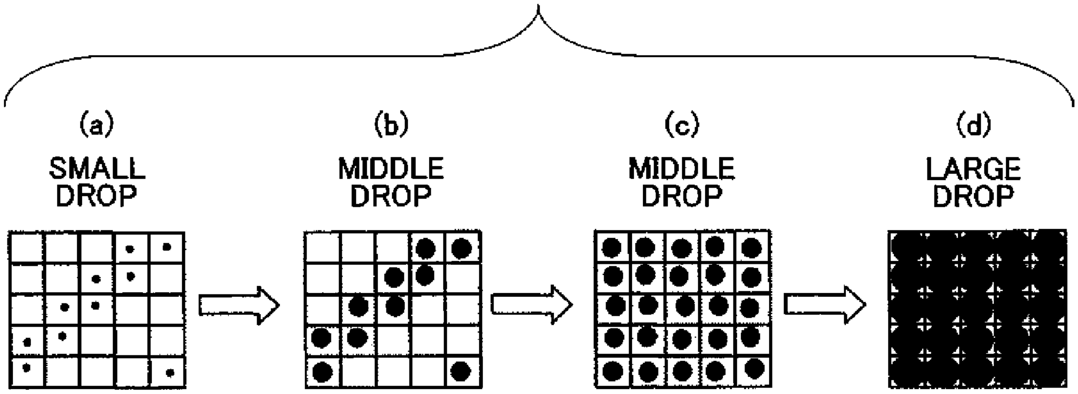
FIG. 19 is an illustration diagram showing an example of a growth pattern of dots in a general dither method.
Figure 20:
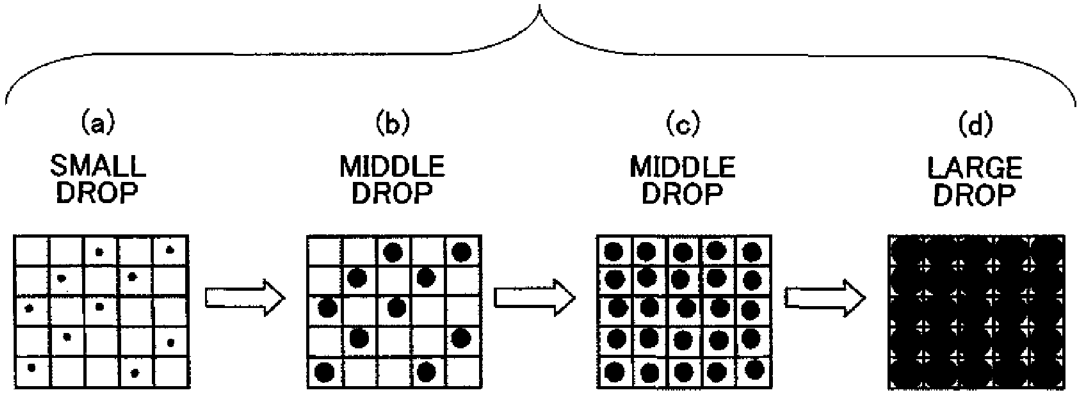
FIG. 20 is an illustration diagram showing an example of a growth pattern of dots in a dither method used in a halftone processing according to an embodiment of the present invention.

Specifically, basic tones of small drops are developed while they are adjacent to one another in a commonly used dither processing as shown in FIG. 19, but, when the driving frequency at the time of small drop ejection is substantially reduced (lowered), basic tones of small drops are developed while they are separated from one another as shown in FIG. 20 and subsequently they are replaced by middle drops with no problem even if the driving frequency is not reduced so as to develop the basic tones. Additionally, the details of the case where a dither processing is used are described below.

The degradation of an image which is caused by ejection irregularity of a liquid drop may be prevented by conducting the above-mentioned processing, regardless of a halftone processing method. Simultaneously, printing is conducted without influencing a printing speed since the speed of a carriage is not changed.

Next, the case where a dither processing is conducted as a halftone processing is described with reference to FIG. 21 etc.

Herein, as mentioned above, when the driving frequency of a recording element (energy generating device) is high or a drop size or nozzle causing ejection irregularity of a liquid drop due to nozzle failure and the like is present during one main scanning operation of a carriage, the threshold value of a dither matrix is set to form an image at a low driving frequency with a good ejection condition.

Figure 21:
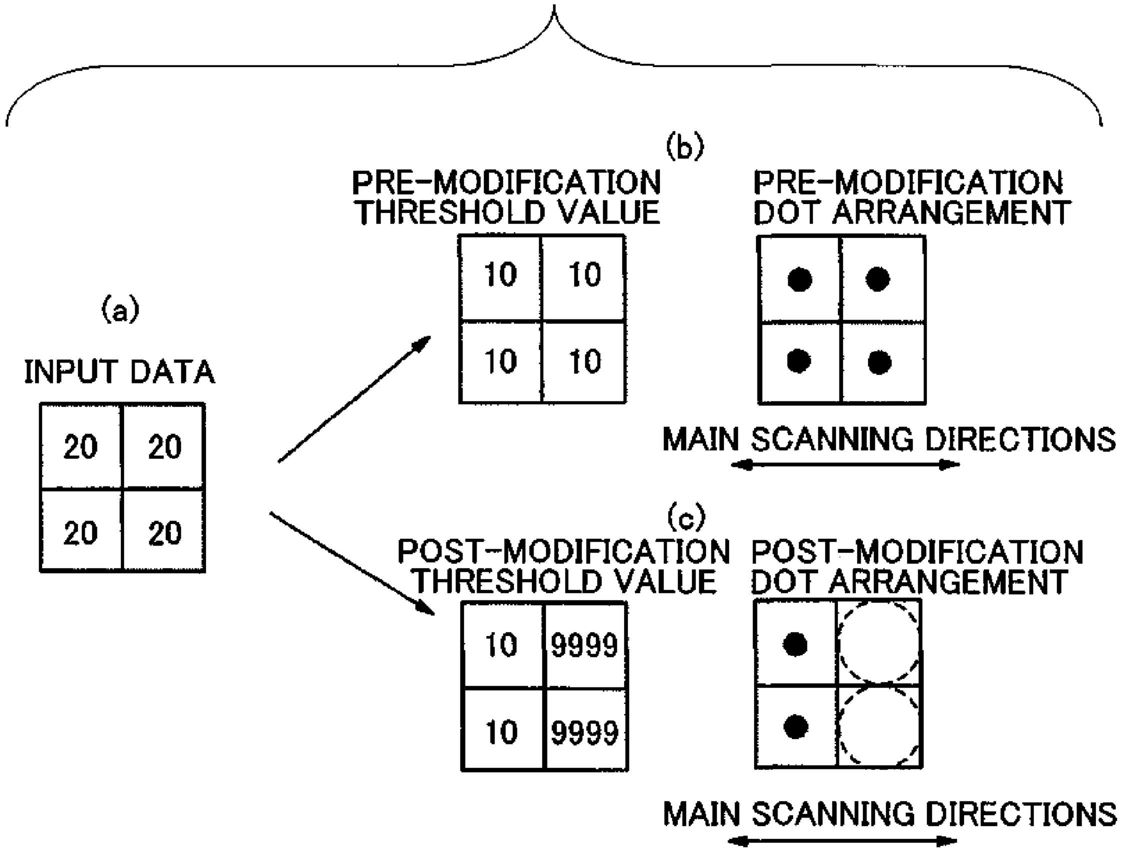
FIG. 21 is an illustration diagram contributing to an explanation of one example of dot arrangements before and after applying a halftone processing (dither processing) according to an embodiment of the present invention.

Practically, when there is irregularity in ejection of liquid drops which is caused by a high driving frequency in one main scanning operation of a carriage, the threshold value of a dither matrix is set not sequentially to generate liquid drops causing ejection irregularity, as shown in FIG. 21.

That is, if the threshold values of a dither matrix as shown in FIG. 21(*b*) are "10" (before changing) for input data of "20" shown in FIG. 21(*a*), dots are arranged for all the dots. On the other hand, the threshold values of a dither matrix are (changed to) "10" and "9999" as shown in FIG. 21(*c*), whereby a dot is placed on only a dot arrangement position corresponding to "10" among four dot arrangement positions and the same as driving at a substantially low driving frequency applies.

Accordingly, only a driving frequency of a liquid drop with a drop size causing ejection irregularity (or a nozzle causing ejection irregularity) without changing the overall printing speed or a driving frequency at the time of ejection of a drop with another size may be substantially reduced to a half of normal picture printing so as to form a image with a good quality.

Figure 22:
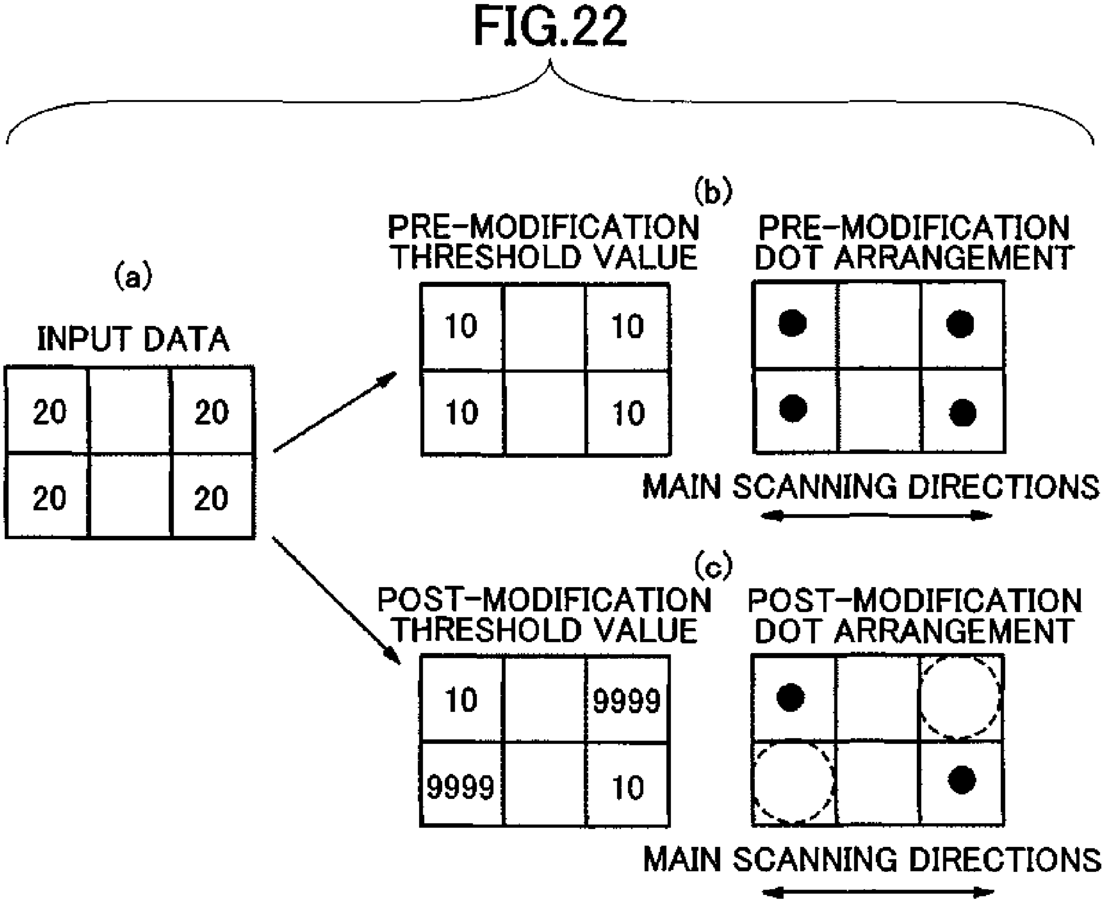
FIG. 22 is an illustration diagram contributing to an explanation of another example of dot arrangements before and after applying a halftone processing (dither processing) according to an embodiment of the present invention.

Also, the interval for restricting ejection of a liquid drop is changed depending on the balance between the driving frequency of a driving wave pattern and the number of a recording path(s). For example, as shown in FIG. 22, there are provided the case where the driving frequency is set to a half when the number of recording paths is two and the case where the driving frequency is set to a one third when the number of a recording path(s) is one, depending on a part that is blank in the figure. Also, more front picture element may be a target of confirmation depending on the number of recording path(s) or the driving frequency of picture printing although the illustration is omitted.

In the above descriptions, a halftone processing for substantially reducing a driving frequency is conducted based on the ejection conditions of liquid drops sequential in main scanning directions during one scanning of a recording medium with a carriage mounting a recording head, but a halftone processing for substantially reducing a driving frequency may be conducted based on the ejection conditions of liquid drops sequential in sub-scanning directions during one scanning of a recording medium with a carriage mounting a recording head.

Figure 23:
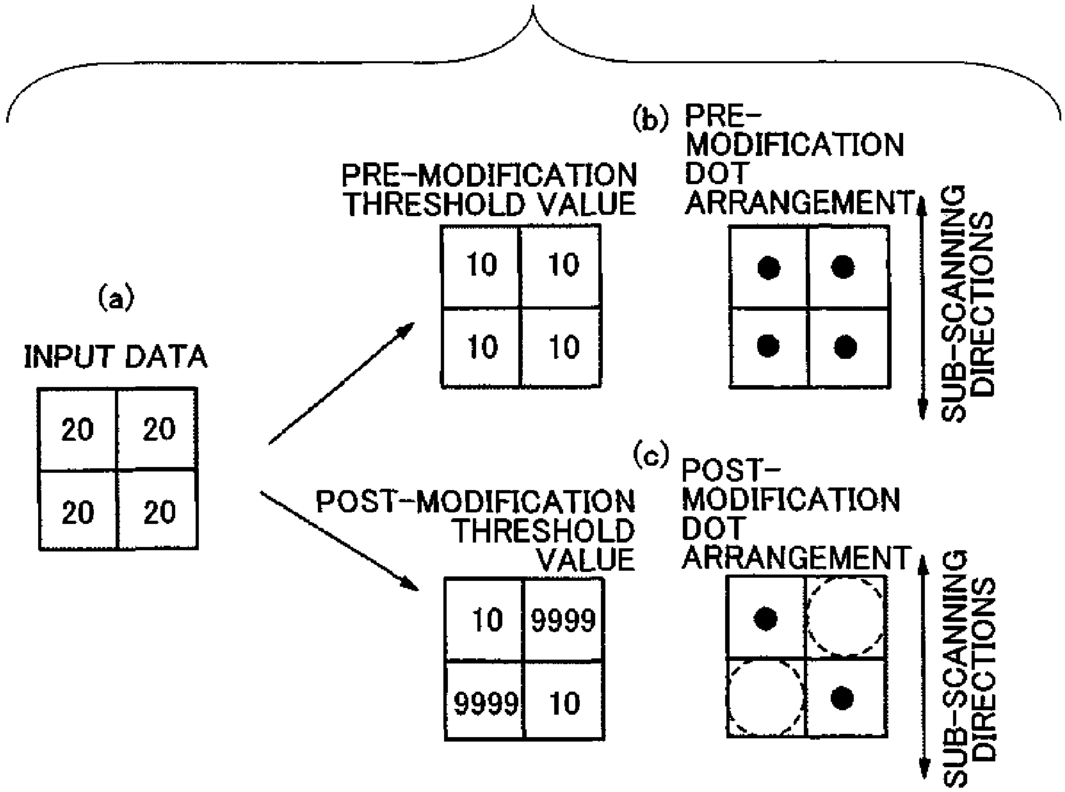
FIG. 23 is an illustration diagram contributing to an explanation of yet another example of dot arrangements before and after applying a halftone processing (dither processing) according to an embodiment of the present invention.

For example, even if ejection irregularity is caused when a liquid drop is ejected onto an adjacent picture element "c" that is adjacent above or below a (the) picture element "a", as shown in FIG. 23, a threshold value of a dither matrix for reducing a driving frequency is set similarly to the above descriptions, whereby ejection irregularity of a liquid drop may be reduced or eliminated. Additionally, in this case, an adjacent picture element may be separated by one picture element or more relative to the picture element, similarly to an example shown in FIG. 22.

Figure 24:
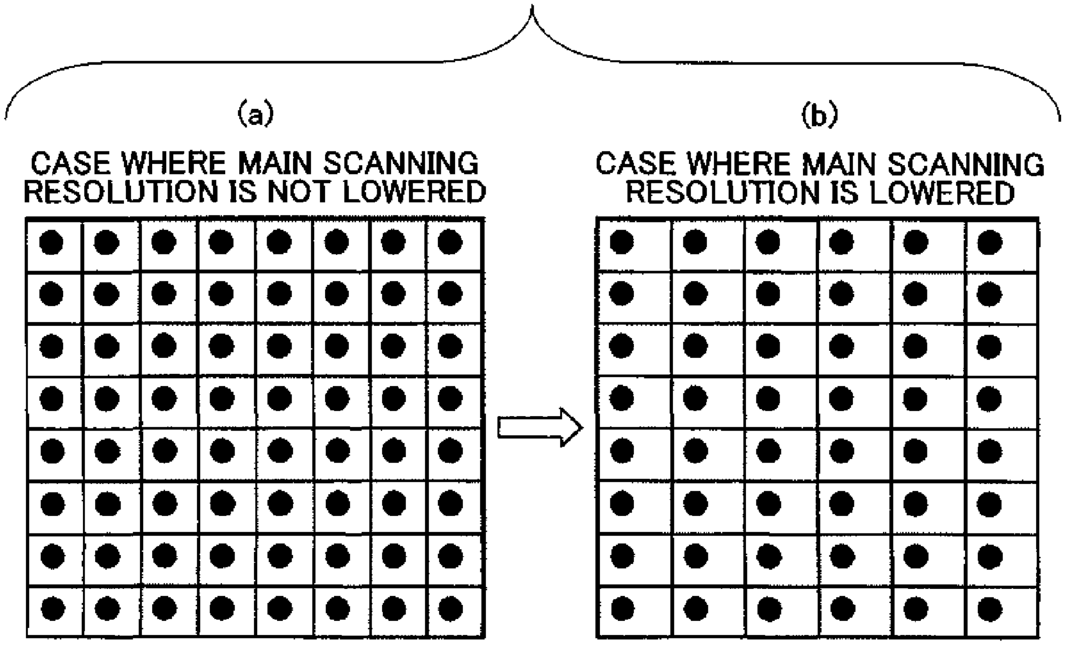
FIG. 24 is an illustration diagram contributing to an example in the case where a driving frequency is restricted by modifying the resolution of an image to be printed in a halftone processing according to an embodiment of the present invention.

Meanwhile, the interval of liquid drop ejection is increased by not controlling ejection/non-ejection of a liquid drop but reducing the resolution of an image to be printed as shown in FIG. 24, and therefore, a driving frequency may be reduced to suppress ejection irregularity of liquid drops while the speed of a carriage is kept.

Figure 25:
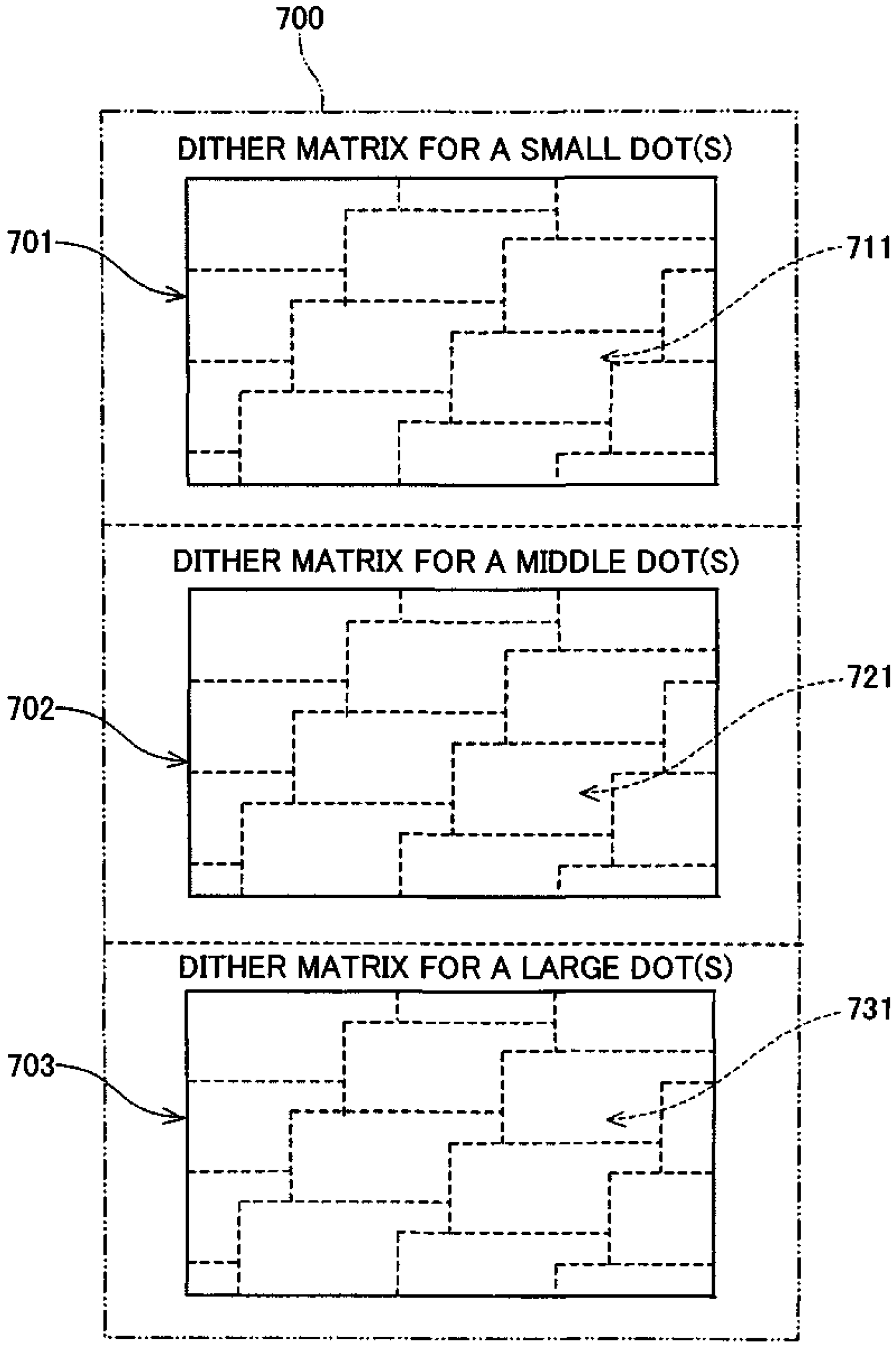
FIG. 25 is an illustration diagram showing one example of dither matrices used in a halftone processing (dither processing) according to an embodiment of the present invention.
Figure 28:
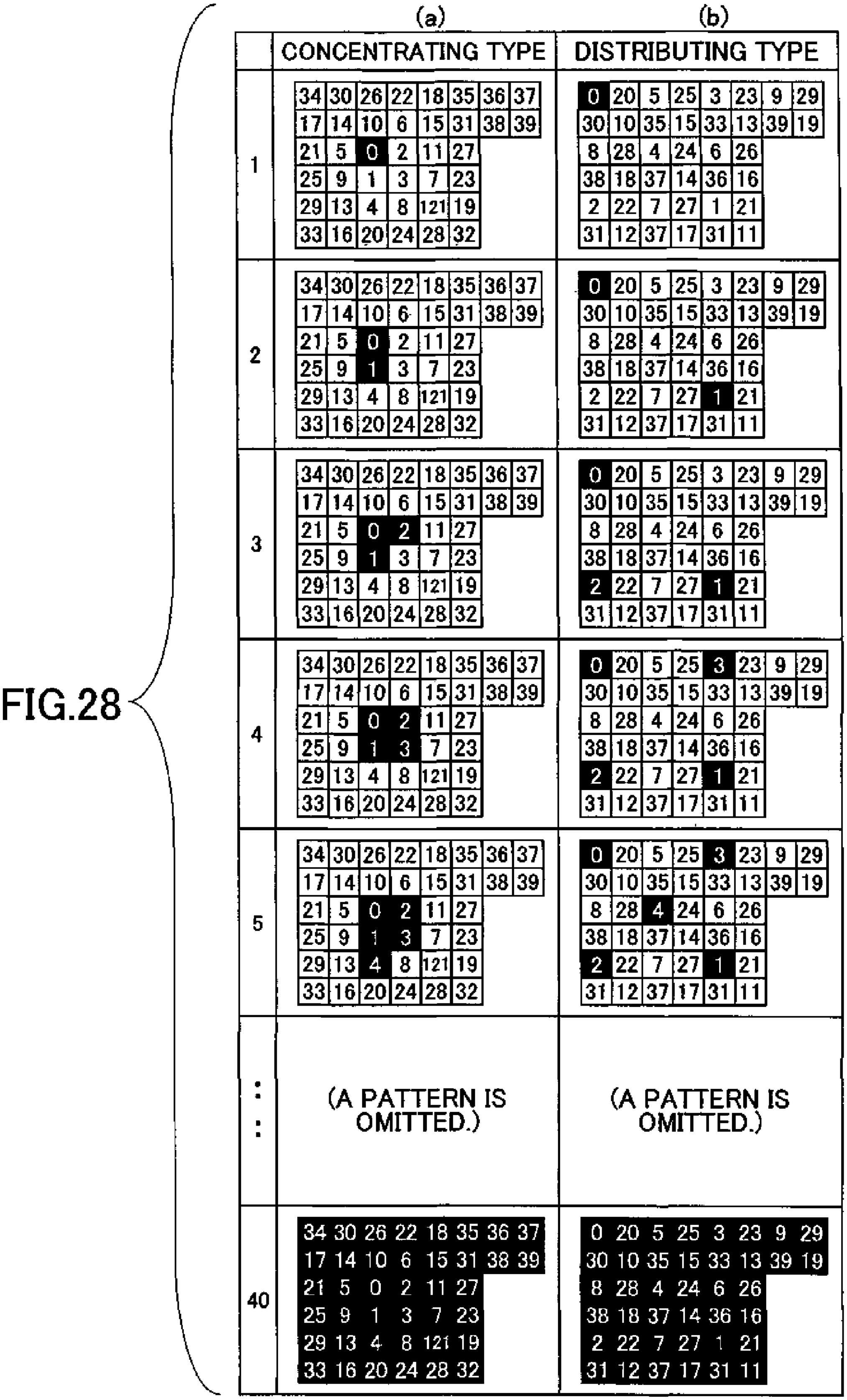
FIG. 28 is an illustration diagram contributing to an explanation of a concentrating type and dispersing type.

Herein, one example of a dither matrix used for a halftone processing in an embodiment of the present invention is described with reference to FIG. 25 through FIG. 28. Additionally, FIG. 25 is a diagram that schematically illustrates the entire of the dither matrix, FIG. 26 is an illustration diagram showing one specific example of the dither matrix, FIG. 27 is a diagram illustrating a dither matrix for small dots among the dither matrices, and FIG. 28 is an illustration diagram contributing to the illustration of a concentrating-type dither matrix and dispersing-type dither matrix.

Herein, since the size of a liquid drop to be ejected from the recording head 7 in the above mentioned image forming apparatus is the three kinds, that is, small, middle, and large, an example of dither matrix is described such that four values, which includes no ejection in addition to them, are output tone values, in other words, output tone values are four values (none=1, a small dot=1, a middle dot=2, and a large dot=3).

The dither matrices 700 are composed of a dither matrix for a small dot 701, a dither matrix for a middle dot 702 and a dither matrix for a large dot 703.

In an image processing, an output tone value is determined by comparing a picture element for an input image with the threshold value of a corresponding dither matrix 700. The processing is conducted such that the output tone is "0" if the value of the picture element is less than the threshold value of the dither matrix for a small dot 701, the output tone is "1" if it is less than the threshold value of the dither matrix for a middle dot 702, and the output tone is "2" or "3" if it is less or greater than the threshold value of the dither matrix for a large dot 703, respectively. The entire input image is converted into the four values by conducting the processing for all the picture elements.

Herein, one kind of dither matrix, for example, the dither matrix for a small dot 702, is defined as a table of threshold values with a size of 20×20, as also shown in FIG. 27. However, the size of the table is not limited to it but may be any size, such as 20×40, 40×40 and 256×256.

The dither matrix for a small dot 701 is composed of plural sub-matrices 711. The sub-matrix 711 is an element constituting the dither matrix 701 and is used as a unit in assignment of dot arrangement in the dither matrix 701, wherein a dot pattern or a screen line is formed for the dither matrix 701 depending on the form or arrangement of the sub-matrix 711. Additionally, the form of the sub-matrix 711 is not limited to this example, but may be any form which is allowed to fill the dither matrix 701 without interspace or overlapping. In this example, a form of combination of squares with 6×6 dots and 2×2 dots is used to provide a dither matrix in which a screen angle of sin (6/2) is formed.

Additionally, the dither matrix for a middle dot 702 and the dither matrix for a large dot 703 similarly include plural sub-matrices 721 and 732, respectively, as dither matrix components which are used as a unit in assignment of dot arrangement.

Next, the difference between the concentrating type and dispersing type with respect to a dot arrangement pattern in a sub-matrix is described with reference to FIG. 28.

As shown in FIG. 28(*a*), the concentrating type has an arrangement such that dots are adjacent and are centered on a point. On the other hand, as shown in FIG. 28(*b*), the dispersing type has an arrangement such that dots are arranged dispersively and dots are not as adjacent as possible.

As an example of a method for determining the order of the concentrating arrangement, there are provided a method for arranging dots in the order of increasing the geometrical linear distance thereof from a center point, a method for spirally arranging them from a center point with a preference of the continuity of arrangement, and the like. Also, as a example of a method for determining the order of a dispersing arrangement, there are provided, a method of utilizing a bayer patter, a method of providing an order to have a high-pass filter characteristic over the entire dither mask, a method of randomly arranging them, and the like. Any arrangement that provides a visually concentrating or dispersing dot arrangement is allowed.

As referring back to FIG. 25 and FIG. 26, the dither matrix 700 is a dither matrix used in a dither image processing for making an output tone be the four values (none=0, a small dot=1, a middle dot=2, and a large dot=3), as described above, wherein a concentrating type sub-matrix pattern is used for sub-matrices 711 and 721 which are components of the dither matrix for a small dot 701 and the dither matrix for a middle dot 702, respectively, which compose the dither matrix 700, and a dispersing type sub-matrix pattern is used for a sub-matrix 731 which is a component of the dither matrix for a large dot 703 which composes the dither matrix 700.

Therefore, when input image data with a input tone value (M value) is converted into an output image data with a less value (N value: M>N>2) which is output, by using the dither matrix 700, a dither processing is conducted such that if the output tone value is less than a predetermined threshold value (T value: N>T>1, in this example, T=3), that is, none (=0), a small dot (=1), or a middle dot (=2), the order of dot arrangement is a concentrating type and if the output tone value (N value) is equal to or greater than a predetermined threshold value (T value), that is, a large dot (=3), the order of dot arrangement is dispersing type.

That is, a dither image processing may be conducted for taking a concentrating type patter for a tone on which dots are small, and therefore, the merit of concentration is significant and for switching it to a dispersing type pattern for a tone on which dots are large, and therefore, the demerit of concentration (such as bleeding and overflow) is significant. Additionally, in this example, switching between the concentrating type and the dispersing type is provided between a large dot and the others, and however, the switching point is not limited but may be any output tone.

Thus, while plural smaller sub-matrices are arranged with a certain screen angle and without interspace or overlapping in a dither matrix so that the arrangement pattern of an output image forms a dot pattern or screen line, the order of dots arranged in the sub-matrix is configured to be a concentrating type if the output tone value is less than a predetermined threshold value T or a dispersing type if it is equal to or greater than T, whereby a problem may be avoided by forming a concentrating-type dot pattern or screen angle and switching it to a dispersing-type pattern at an output tone causing a harmful effect of concentration (such as bleeding and beading), so as to improve an image quality.

Figure 29:
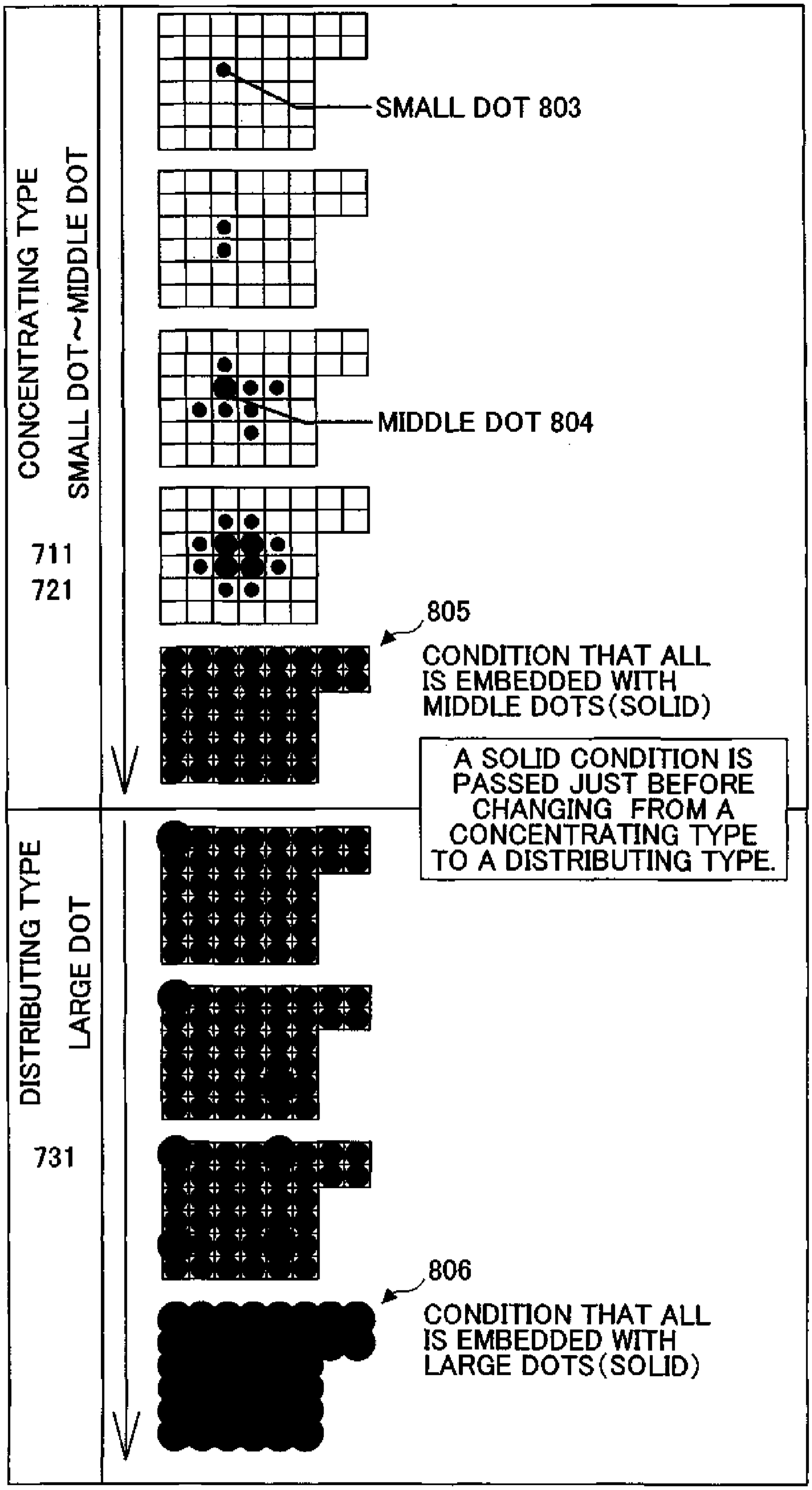
FIG. 29 is an illustration diagram contributing to an explanation of the transition of a dot arrangement which includes a switching point from a concentrating type to a dispersing type.

Next, the switching point between a concentrating type and a dispersing type is described in detail with reference to FIG. 29. Additionally, FIG. 29 is an illustration diagram showing one example of the transition of a dot arrangement with a size of one sub-matrix. Herein, a dispersing type is provided for a large dot or after and a concentrating type is provided for a small dot and a middle dot before it, as described above.

Herein, the sub-matrices for a small dot 711 and for a middle dot 721 as classified into a concentrating type form concentrating dot patterns by using a small dot 803 and a middle dot 804. Then, a pattern 805 under the condition that the sub-matrix 721 is all filled with dots is ultimately completed in those concentrating type ones and it transfers to the dispersing-type sub-matrix for a large drop 731, which is a next output tone. In regard to the dispersing-type dither matrix for a large dot 703, while a pattern 805 which is all filled with middle dots 804 is a start pattern, dots are formed in a dispersing type and a pattern 806 under the condition that the sub-matrix 731 is all filled with dots is ultimately completed.

Thus, the last output tone causing no problem of concentration may be used so as to represent the maximum density by passing through a solid pattern just before switching from a concentrating type to a dispersing type, and the formation of the following dispersing pattern may be designed independent of the concentrating type by uniformly filling with all dots.

Figure 30:
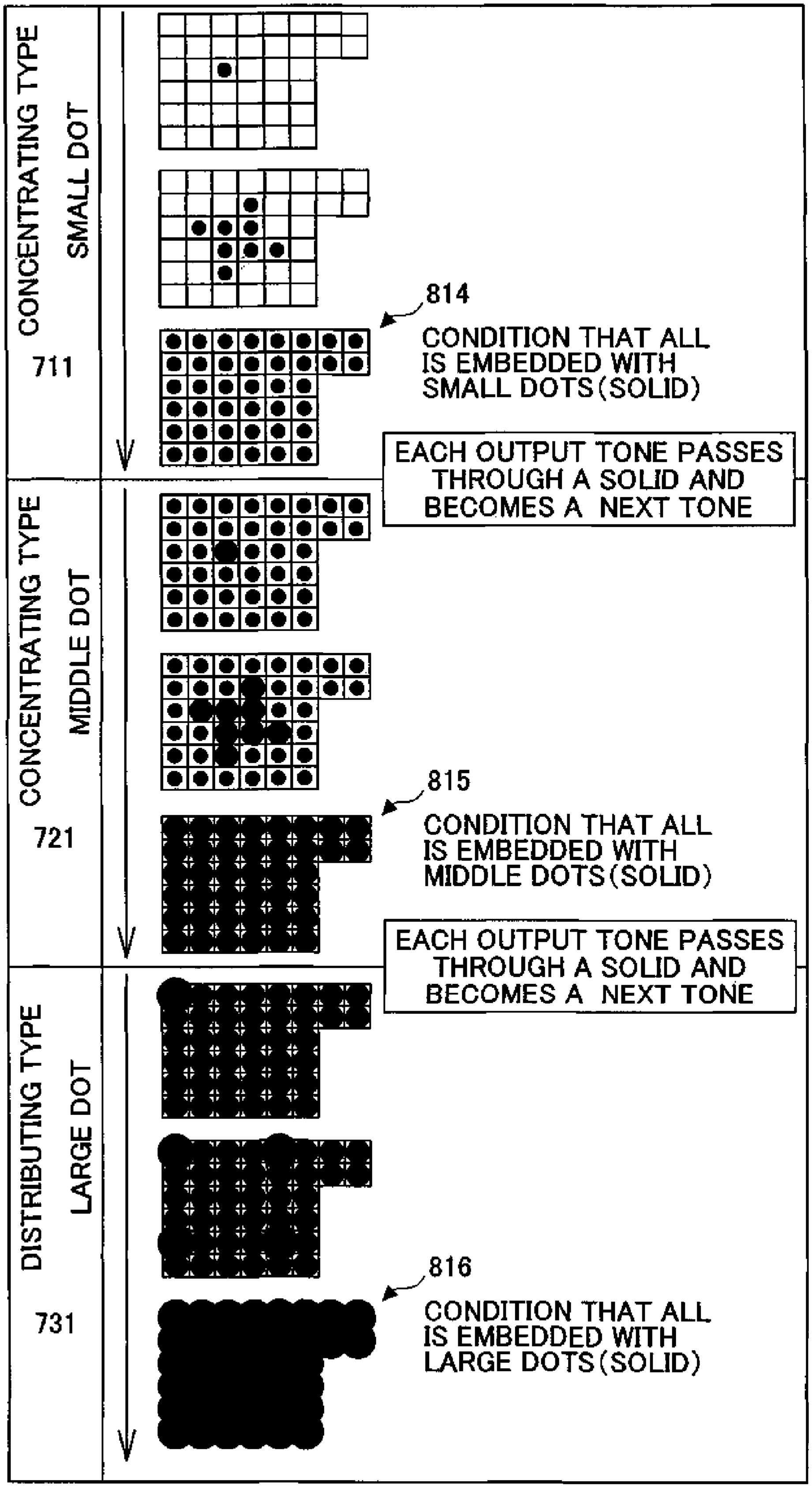
FIG. 30 is an illustration diagram contributing to an explanation of another example of the transition of a dot arrangement which includes a switching point from a concentrating type to a dispersing type.

Next, another example of the switching point between a concentrating type and a dispersing type is described in detail with reference to FIG. 30. Additionally, FIG. 30 is also an illustration diagram showing one example of the transition of a dot arrangement with a size of one sub-matrix.

This example is configured to fill the entire sub-matrix for each output tone. That is, a concentrating type dot pattern is formed by using small dots in the sub-matrix for a small dot 711 as classified into a concentrating type and a pattern 814 under the condition that the sub-matrix 711 is all filled with dots is ultimately completed so as to transfer to the sub-matrix for a middle dot 721 as classified into a concentrating type and being a next output tone. Then, the sub-matrix for a middle dot 721 as classified into a concentrating type forms a concentrating type dot pattern by using middle dots and a pattern 815 under the condition that the sub-matrix 721 is all filled with dots is ultimately completed so as to transfer to the dispersing type sub-matrix for a large dot 731 which is a next output tone. Then, dispersing type dots are formed in the dispersing type sub-matrix for a large dot 703 and a pattern 816 under the condition that the sub-matrix 731 is all filled with dots is ultimately completed.

That is, this example is an example based on the configuration of passing through a solid pattern at the switching point between a concentrating and dispersing shown in FIG. 29 and also forming a solid pattern at the switching point between arbitrary output tones (the switching point from small to middle).

Thus, the coverage of a paper sheet with dots may be increased at an earlier tone by forming a solid pattern at an arbitrary output tone and the generation of white irregularity and the like may be suppressed even in a paper sheet on which ink spreading is not good.

Figure 31:
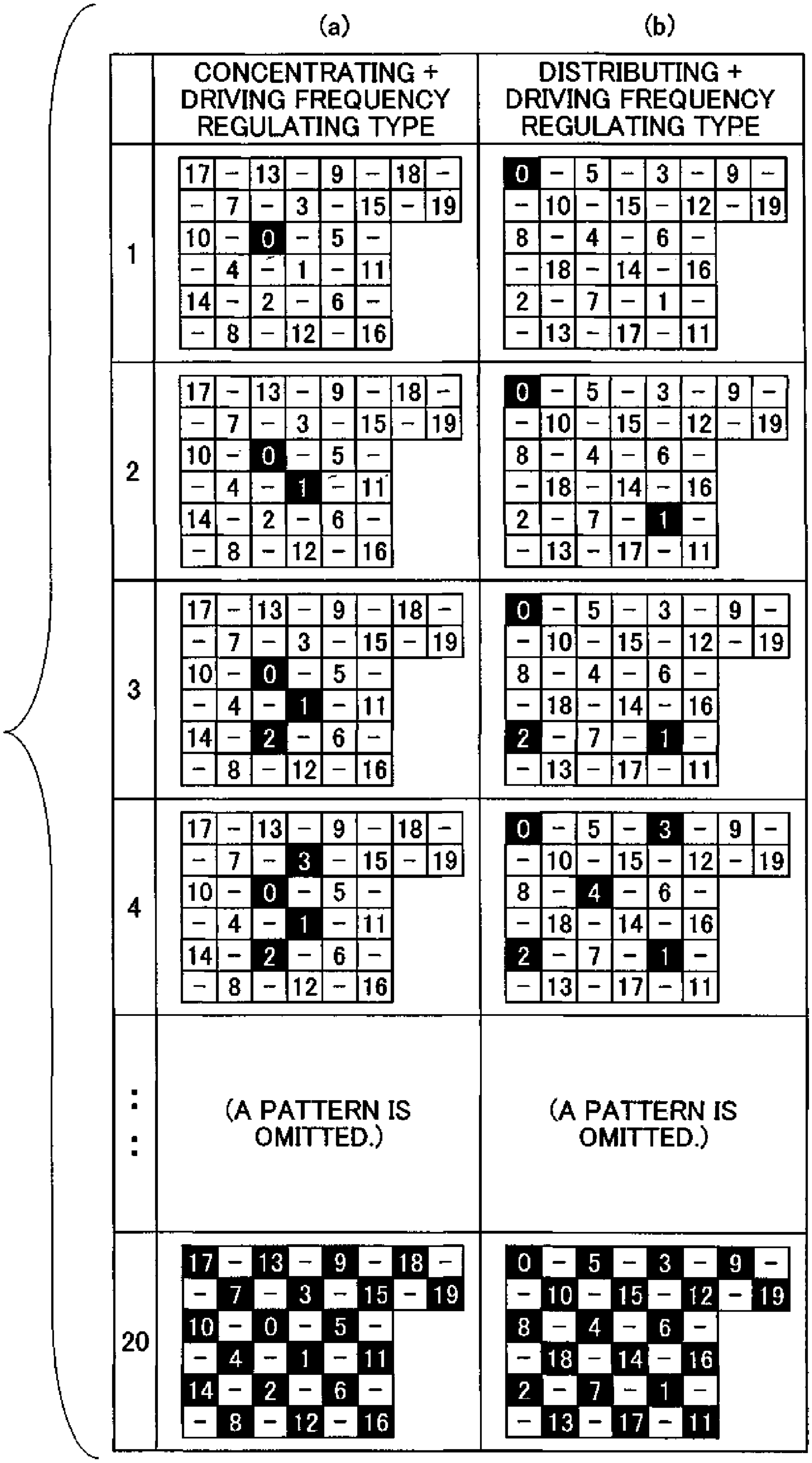
FIG. 31 is an illustration diagram contributing to an explanation of a dither matrix in which a concentrating type and a driving frequency regulating type are combined and a dither matrix in which a dispersing type and a driving frequency regulating type are combined.

However, when the driving frequency is restricted, the filling factor of a sub-matrix is changed. For example, when the driving frequency is restricted to a half thereof, the maximum number of dots filling a sub-matrix is 50% of the whole as shown in FIG. 31. Also, there may be provided a pattern such that not all the sub-matrix but only a part thereof is filled according to the conditions.

FIG. 31(*a*) is one example of a concentrating+driving frequency restricting type sub-matrix for restricting a driving frequency at a concentrating type and FIG. 31(*b*) is one example of a dispersing+deriving frequency restricting type sub-matrix for restricting a driving frequency at a dispersing type.

Next, the assignment of the order of dot arrangement for plural sub-matrices as components constituting one dither matrix is described with reference to FIG. 32. Additionally, a dither matrix for a small dot is described as an example in FIG. 32, and the same applies to dither matrices for a middle dot and for a large dot.

Figure 32:
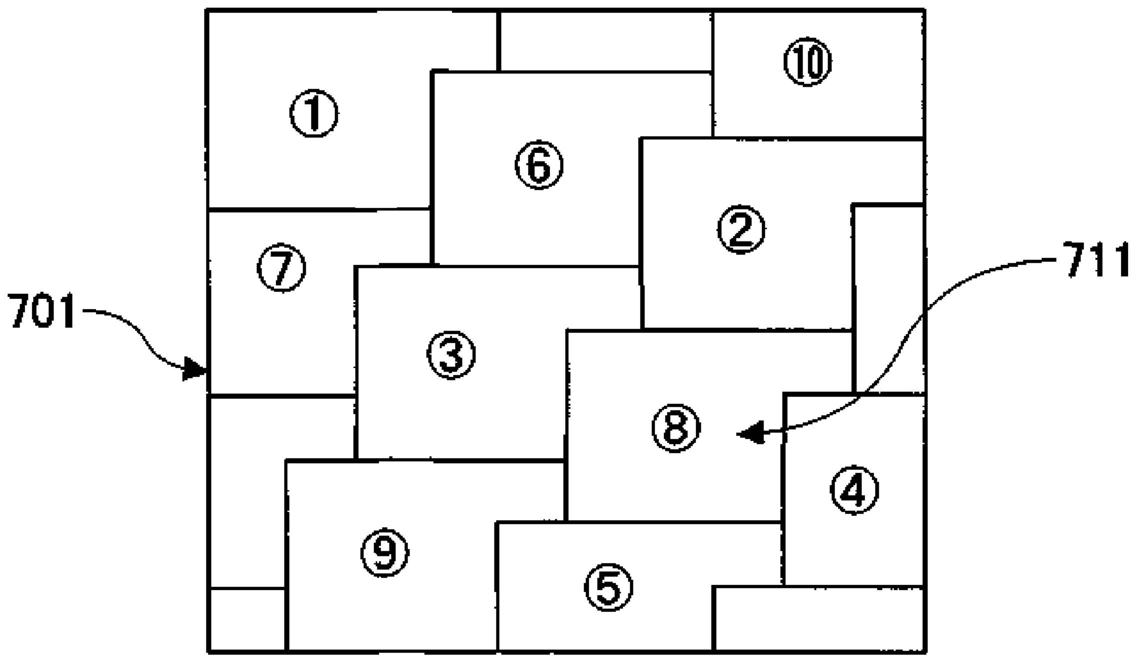
FIG. 32 is an illustration diagram contributing to an explanation of the order of dot arrangement between plural submatrices.

In FIG. 32, the order of dot arrangement is assigned such that adjacent sub-matrices 711 are not continuously selected but are selected to skip one in the diagonal directions sequentially in regard to plural sub-matrices 711 which are components of the dither matrix 701, as denoted by the numbers 1-10 with parentheses in the figure. That is, the plural sub-matrices have a configuration such that adjacent sub-matrices are not continuously selected, in other words, continuous threshold values are arranged in adjacent sub-matrices.

Since sub-matrices may be arranged dispersively by employing such an order, irregularity of dot generation is eliminated over the entire dither matrix and a phenomenon to provide appearance of different textures may be suppressed by selecting (arranging) sub-matrices dispersively.

Additionally, dispersive arrangement (selection) of plural sub-matrices are not limited to the example described above, are not limited to this order if it is dispersive, and may be randomly arranged (selected) or may be arranged (selected) in an order to have a high-pass filter characteristic.

Next, processing in the case where an input image is a color image composed of plural color planes is described.

Figure 33:
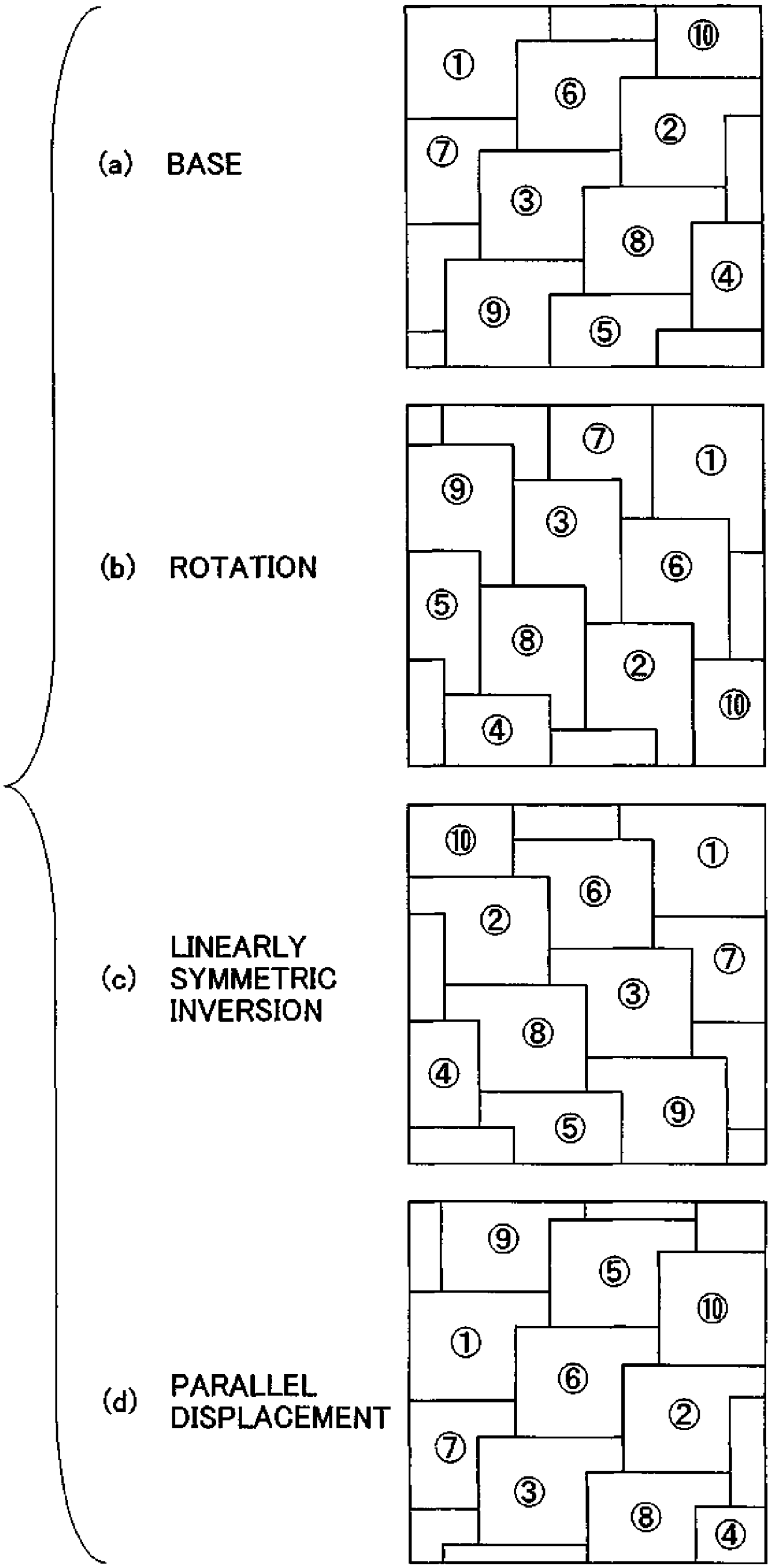
FIG. 33 is an illustration diagram contributing to an explanation of an example in which a base dither matrix is rotated, linearly symmetrically inversed or parallel displaced.

A rotated, reversed, or parallel translated dither matrix is prepared as shown in FIG. 33 (*a*)-(*d*) based on a reference dither matrix shown in FIG. 33(*a*) prepared by the example described above and illustrated in FIG. 32 or the like. Then, such a prepared pattern may be used for each color print (color plane). Additionally, FIG. 33(*b*) is an example of clockwise rotating the reference dither matrix by 90°, FIG. 33(*c*) is an example of reversing the same symmetrically with respect to a center perpendicular, and FIG. 33(*d*) is an example of parallel translating the same downward by five dots.

For example, there may be provided a configuration such that the dither matrix shown in FIG. 25 is assigned to cyan as a reference dither matrix and ones for which the reference matrix is parallel translated downward by five dots, ten dots, and fifteen dots are may be for black, for magenta, and for yellow, respectively. Herein, the number of the color prints is not limited to four but may be a number in accordance with the number of a color(s).

Figure 34:
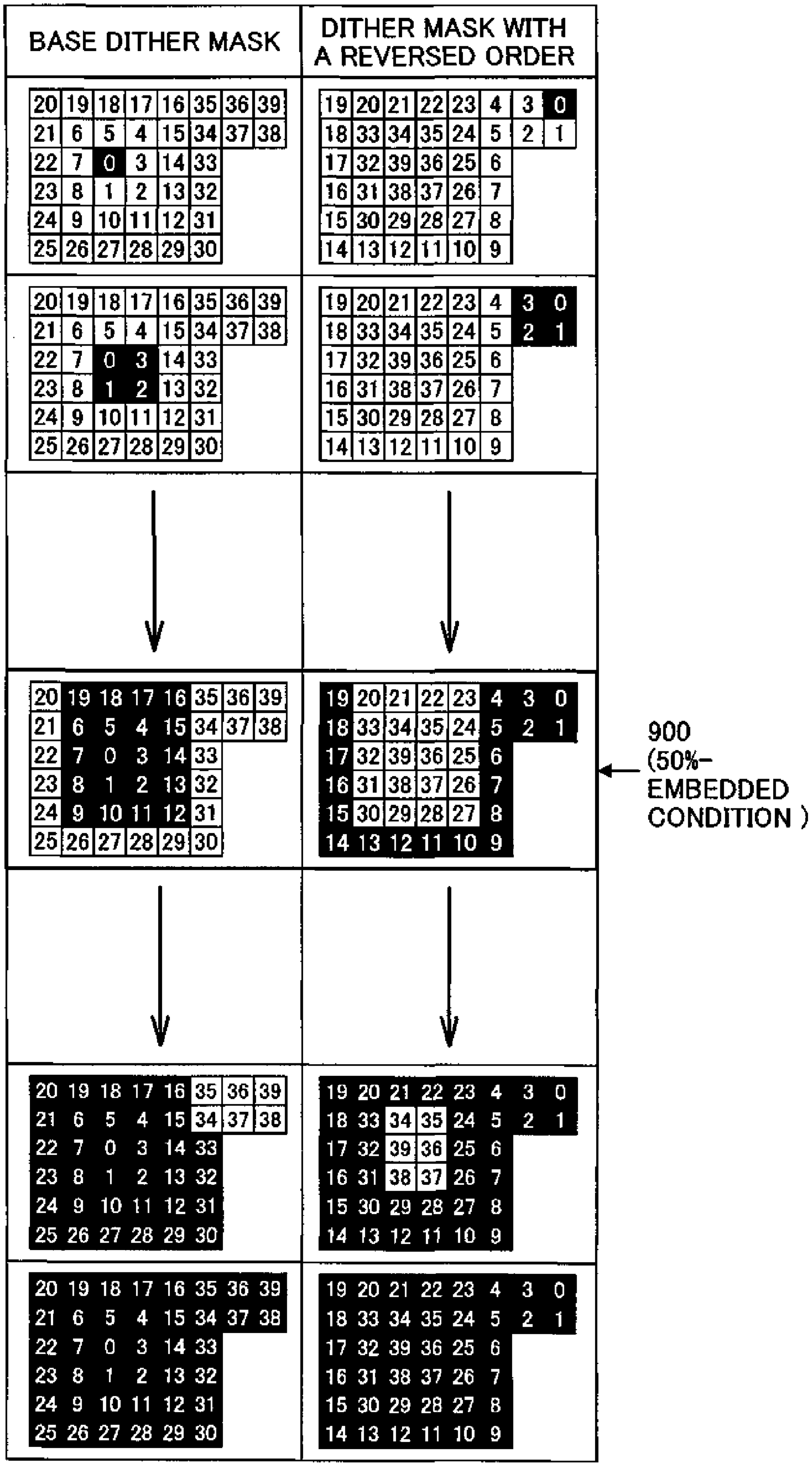
FIG. 34 is an illustration diagram contributing to an explanation of one example of a base dither matrix and dither matrix whose order is reversed.

Also, an example of a pattern such that the order of dot generation on the reference dither matrix is reversed at an output tone unit is shown in FIG. 34 in order that the dots of two color prints (color planes) are prevented from overlapping as much as possible.

In this example, dots are arranged for the reference dither mask shown in FIG. 34(*a*) and the dither mask in which the order is reversed as shown in FIG. 34(*b*) in patterns opposite to each other, and therefore, there may be provided a configuration such that the two color planes do not overlap at all in the tone of pattern 900 in which a dot arrangement with a surface area ratio of 50% and below. Accordingly, an image processing for increasing the dispersibility between the colors and suppressing white irregularity or the deviation of a color phase may be conducted.

Thus, when the input image is a color image composed of plural color planes, a dither matrix for which a processing such as “rotation”, “linearly symmetric reverse”, “parallel translation”, and “reverse of the order of dot generation for each output tone” is applied to an original reference dither matrix is assigned for each color print (color plane) and different color dots are formed dispersively with respect to secondary or higher colors, whereby there may be no deviation in a color phase, and image degradation with an appearance of white irregularity may be suppressed since the coverage for a paper sheet is increased.

Also, although a sub-matrix is formed in a manner that combines squares with different sizes in the above example, sub-matrices filling a dither matrix without interspace or overlapping may be prepared by forming a sub-matrix in a manner that combines rectangles with different sizes and a screen angle and the number of screen lines may be adjusted depending on the combination of the sizes of the rectangles. Furthermore, a color dither image processing with a little Moire and a little deviation in a color phase may be realized by using an upward or downward displaced pattern in regard to color prints (color planes).

Also, when an image is formed of two or more color prints (color planes), there is a problem such that a color phase may be deviated when overlapping of ink is not uniform. In particular, the problem may easily occur for a grey color.

Figure 35:
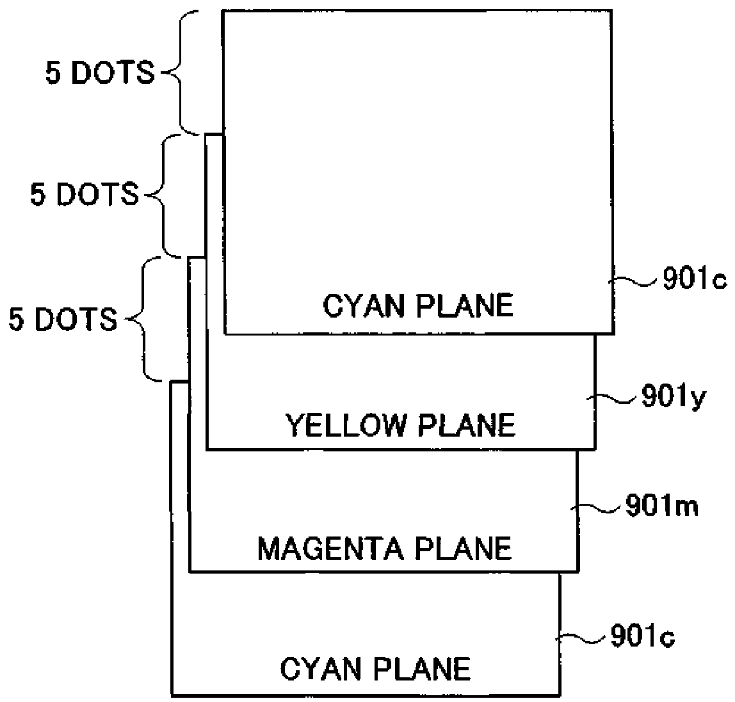
FIG. 35 is an illustration diagram contributing to an explanation of an example in which a gray balance is taken by parallel displacing color planes and containing no black ink.

Then, when the gray balance is adjusted without including a K ink, dither matrices of respective color prints (color planes) 901*c*, 901*m* and 901*y* are parallel translated (by five dots, respectively, in this example) to prevent the dots of respective color prints (color planes) from overlapping as much as possible, as shown in FIG. 35, in order to equalize the overlap of inks.

Thus, the dots of each color except a color may be uniformly overlapped so as to realize a color dither processing with a little deviation in a color phase.

Additionally, in this case, if the overlap of inks can be equalized, a method or device for rotation, reverse, or a change of the order of dot generation in a dither matrix as well as parallel translation may be used.

Figure 36:
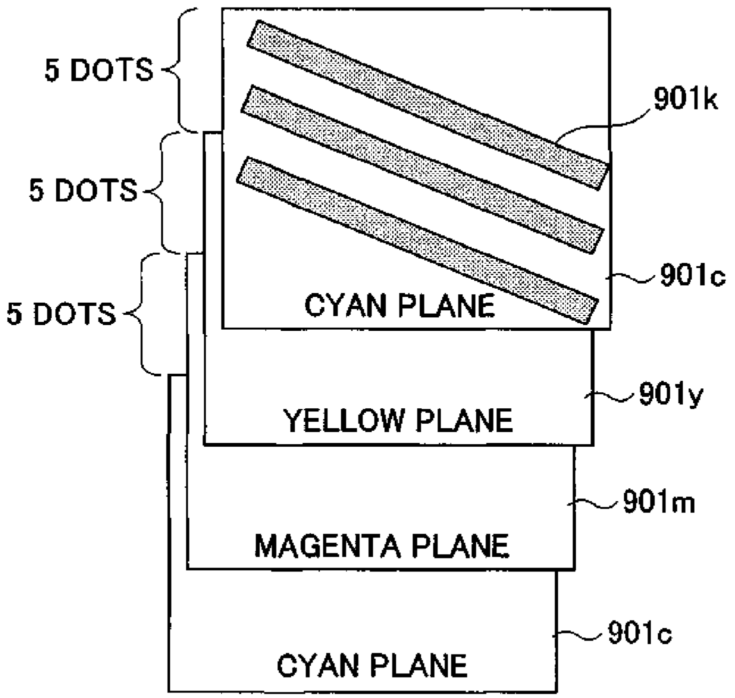
FIG. 36 is an illustration diagram contributing to an explanation of an example in which a gray balance is taken by parallel translating color planes and containing no black ink.
Figure 37:
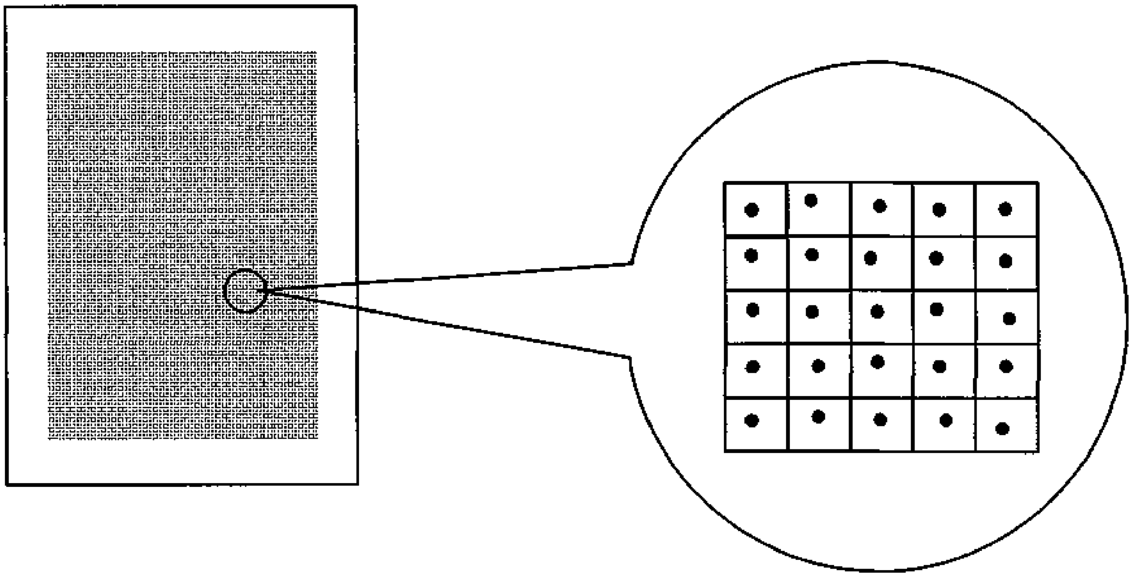
FIG. 37 is an illustration diagram contributing to an explanation of a specific implementation of a halftone processing according to an embodiment of the present invention.

Also, when the gray balance is adjusted with the addition of a K ink, the grey balance is first adjusted without including a K ink in accordance with the above-mentioned method. Subsequently, a K dither mask is changed to a linear dither pattern (wherein the basic tone of a K dither pattern is denoted by 901*k*) having a certain screen angle, as shown in FIG. 36, so that the rates of overlapping of a K dot with dots of respective color planes except K are equal. Accordingly, the grey balance is adjusted with the addition of a K ink.

Additionally, the K dither mask is not limited to a linear dither pattern but, otherwise, may be, for example, rotation, reverse or parallel translation of a reference dither matrix, a change of the order of dot generation of a dither matrix, a bayer-type dither mask, or the like.

Also, the spread of a dot is small in the above-mentioned halftone processing, particularly when recording liquid is landed, and it is useful on the case where recording is conducted on a coated paper for commercial or publication printing which has a property such as aggregation.

Next, representative conditions for the case where it is necessary to form an image at a low driving frequency by applying a halftone processing in the above-mentioned embodiment of the present invention is described as follows.

(1) the case where a drop size causing ejection irregularity is present depending on a frequency—ejection characteristic for each of the sizes and colors of ink drops.

(2) the case where ejection irregularity is caused depending on the colors of ink drops independently of a frequency—ejection characteristic.

(3) the case of a defective nozzle with respect to nozzle conditions.

In such cases (1) through (3), an image is formed at a low driving frequency by changing a threshold value of a dither matrix or executing the above-mentioned error diffusion algorithm, whereby image degradation caused by ejection irregularity of liquid drops may be prevented. Also, since the speed of a carriage is not changed, printing is conducted without influencing the printing speed.

Additionally, although an example of using a liquid ejecting head which is capable of changing a drop size by a single nozzle is described in the above descriptions, the driving frequency may be controlled depending on a nozzle diameter even for a liquid ejecting head for conducting ejection from nozzles with plural kinds of diameters when liquid drops with different drop sizes are ejected. Also, although an example of a piezoelectric head as a liquid ejecting head of an image forming apparatus is described in which the energy generating device is an electromechanical element such as a piezoelectric element, the same may apply to an image forming apparatus in which a thermal-type head being an electromechanical element is used for an energy generating device or an image processing device for generating image data for it.

Furthermore, although inks of four colors, that is, black, cyan, magenta, and yellow are used in an image forming apparatus for outputting an image data on which an image processing method according to an embodiment of the present invention is applied or which is generated by means of the image processing method, the above-mentioned halftone processing for restricting a driving frequency is not only applied to the all colors but also may be applied to only a part of colors. For example, the conventional halftone processing for limiting no driving frequency may be conducted for a color and a halftone processing for limiting a driving frequency may be conducted for another color.

The image processing method according to an embodiment of the present invention may be conducted by preparing a program for making a computer execute the above-mentioned halftone processing. The program may be stored in a recording medium.

As the case of application on a specific image forming apparatus or image processing device for providing image data to an image forming apparatus is described, it is necessary to apply a halftone processing for substantially reducing a driving frequency in an embodiment of the present invention and it is sufficient to conduct a usual halftone processing that does not substantially reduce a driving frequency (conducting driving at the driving frequency of a driving wave pattern applied to an energy generating device) if there is no or little ejection irregularity of liquid drops even for a high driving frequency in the image forming apparatus.

On the contrary, it is preferable to apply a halftone processing for substantially reducing a driving frequency in an embodiment of the present invention in the case where there is ejection irregularity of liquid drops due to a high driving frequency, nozzle failure or the like.

Therefore, a usual halftone processing for substantially reducing non driving frequency (referred to as a first halftone processing) and a halftone processing for substantially reducing a driving frequency according to an embodiment of the present invention (referred to as a second halftone processing) are installed and it is preferable to switch and use these halftone processing operations according to the following steps.

First, a sample as shown in FIG. 20 is prepared for continuously ejecting liquid drops. That is, a predetermined sample image capable of evaluating ejection irregularity of a recording head is output. Herein, the sample image is an image in which dots in a predetermined area are all filled with small drops.

Then, a device capable of hardware-evaluating printing quality automatically is included in an image forming apparatus and the first halftone processing and the second halftone processing may be switched automatically by reading the output sample image and determining whether ejection irregularity of liquid drops due to a high driving frequency or nozzle failure is present or not. That is, a device for outputting a predetermined sample image capable of evaluating ejection irregularity of a recording head, a reading device for reading the sample image, and a device for applying a halftone processing depending on the result read by the reading device may be included. In this case, when a halftone processing is conducted at the side of an image processing device, it is only necessary to provide the result of evaluation of ejection irregularity from the side of the image forming apparatus to the side of the image processing device.

Additionally, a detection device such as a photo-sensor is attached near a carriage or head for the device for reading a sample image and automatically evaluating a printing quality, and the presence or absence of ejection irregularity of liquid drops may be determined by detecting and measuring the density or brightness of a printed part and comparing it with the density or brightness in the case of ideal drop landing.

Herein, a recording head is generally driven according to different driving methods for different printing modes in an image forming apparatus, and there is a possibility of exhibiting abnormality or no abnormality depending on a used recording medium (paper sheet) or printing mode. Then, the second halftone processing may be applied depending on the printing mode of an image forming apparatus.

Also, the evaluation of the recording quality may not be conducted by automatic evaluation but may be conducted by an operation of a user. That is, when a user visually compares the output sample image, a reference sample image with ideal drop landing, and a sample image on which ejection irregularity of liquid drops is present and is allowed to determine that no desirable density is provided or a stripe is generated, a command for conducting a processing with the second halftone processing may be provided for an image processing device or an image forming apparatus. At the side of the device or the apparatus, the second halftone processing is applied to conduct a processing when a command for conducting a processing with the second halftone processing is provided externally.

Also, the presence or absence of abnormality in the precision of drop landing may be confirmed by imaging a sample image using an imaging device (measurement instrument) such as a camera without visual observation of a user and comparing a density or brightness obtained from the result of the imaging with the density or brightness in the case of ideal drop landing. Also, the first halftone processing and the second halftone processing may also be selected and instructed according to the preference of a user.

Also, whether a liquid ejecting head is a head which easily causes ejection irregularity or not, for example, whether the form of a nozzle is a nozzle form causing ejection irregularity or not may be determined, for example, by directly imaging the state of the nozzle of the head with an imaging device such as a camera without thus outputting a sample image and comparing it with a predetermined nozzle form, so that the first halftone processing and the second halftone processing may be selectively applied based on the result of the determination.

Also, when abnormality (ejection irregularity) in ejection of liquid drops is found based on the determination of hardware or a user, a device for automatically generating or downloading through a network and the like a parameter and the like, used for a halftone processing in an embodiment of the present invention may be included.

Figure 38:
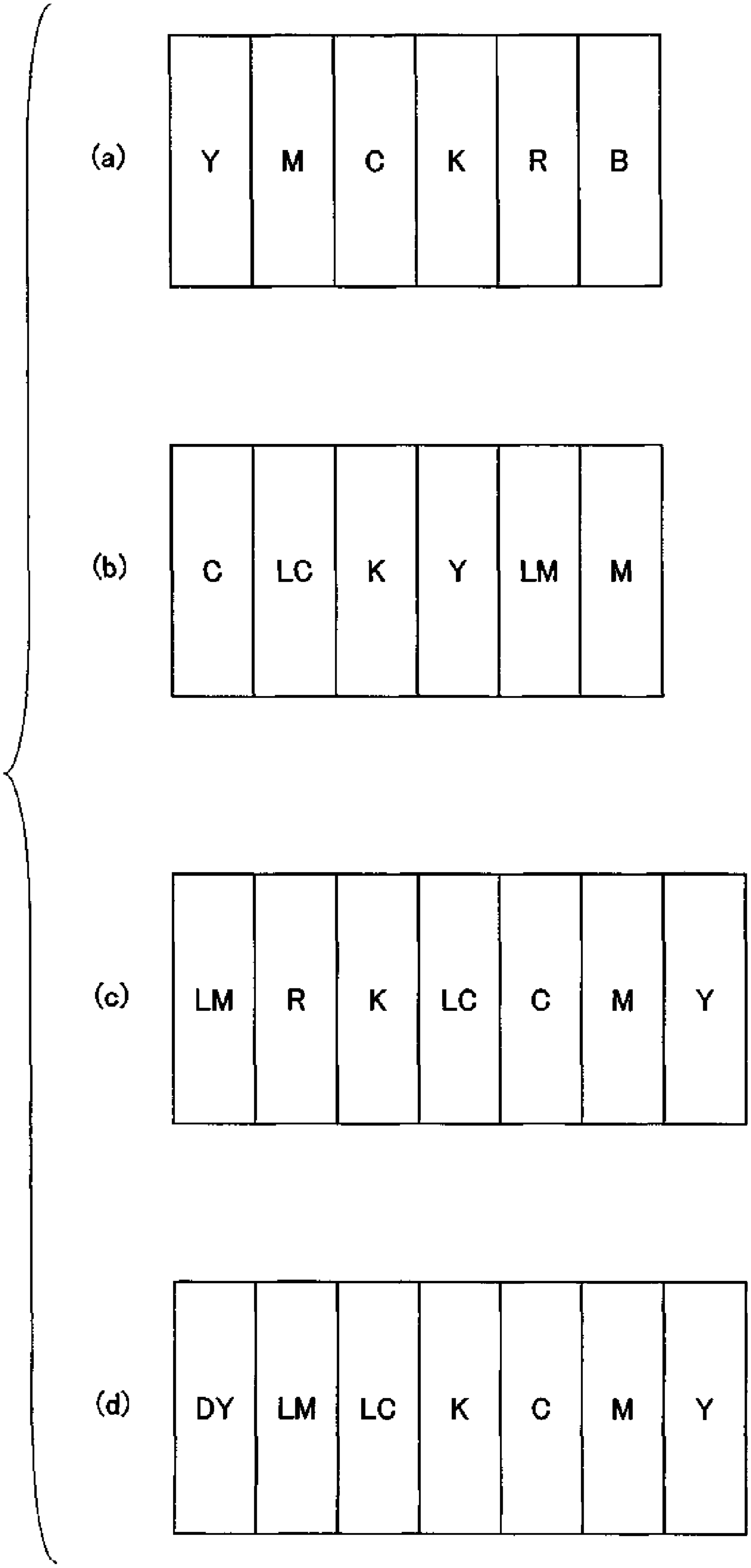
FIG. 38 is an illustration diagram contributing to an explanation of another different example of the structure of a recording head.

Additionally, although an example such that a recording head is composed of four liquid ejecting heads for ejecting ink drops (liquid drops) with respective colors such as black (K), cyan (C), magenta (M) and yellow (Y) or one or more liquid ejecting heads having plural nozzle sequences for ejecting ink drops with such colors is described in the embodiment, the number of colors and the order of arrangement are not limited to those described. For example, there may be provided a head configuration for using six color inks in which red (R) and blue (B) are added to four colors of KCMY as shown in FIG. 38(*a*), a head configuration for using six color inks in which light cyan (LC) and light magenta (LM) are added to four colors of KCMY as shown in FIG. 38(*b*), a head configuration for using seven color inks in which light cyan (LC), light magenta (LM) and red (R) are added to four colors of KCMY as shown in FIG. 38(*c*), a head configuration for using seven color inks in which light cyan (LC), light magenta (LM) and dark yellow (DY) are added to four colors of KCMY as shown in FIG. 38(*d*), and the like.

Next, a coated paper for commercial or publication printing is described which is provided as a medium on which an image is formed by the above-mentioned image forming apparatus (which may be referred to as a "recording medium" below).

The coated paper for commercial and publication printing includes a coated paper for electrophotographic recording and a coated paper for ink jet recording which is developed for use in commercial printing and publication printing as well as coated paper for printing which is represented by a coated paper for offset printing and a coated paper for gravure printing.

The coated paper for commercial and publication printing as a recording medium is configured to have a supporter and a coating layer on at least one surface of the supporter, and may be configured further to have another layer according to need.

In a recording medium, the quantity of ink transferred into a recording medium for a contact time period of 100 ms, which is measured by a dynamic scanning absorptometer, is 4-15 $ml/m^2$, and preferably 6-14 $ml/m^2$. Also, the quantity of pure water transferred into a recording medium is 4-26 $ml/m^2$, and preferably 8-25 $ml/m^2$.

If the quantity of transferred ink or pure water for a contact time period of 100 ms is too small, beading may easily occur, and if it is too large, the diameter of a recorded ink dot may be excessively smaller than a desired diameter.

Also, the quantity of ink transferred into a recording medium for a contact time period of 400 ms, which is measured by a dynamic scanning absorptometer, is 7-20 $ml/m^2$, and preferably 8-19 $ml/m^2$. Also, the quantity of pure water transferred into a recording medium is preferably 5-29 $ml/m^2$, and more preferably 10-28 $ml/m^2$.

If the quantity of transferred one for a contact time period of 400 ms is too small, the drying property may be insufficient, and accordingly, a spur mark may be generated, and if it is too large, bleeding may easily occur and the glossiness of an image portion after drying may be easily lowered.

Herein, the dynamic scanning absorptometer (DSA: JAPAN TAPPI JOURNAL, Volume 48, May 1994, pp. 88-92, Shigenori Kuga) is a device which can accurately measure the quantity of a liquid absorbed for a very short time period. The dynamic scanning absorptometer conducts an automatic measurement by the steps of directly reading the speed of liquid absorption based on the movement of a meniscus in a capillary, shaping a sample into a disc, spirally scanning it with a liquid absorbing head, and automatically changing the scanning speed in accordance with a predetermined pattern so as to conduct the measurement with respect to only the necessary number of point(s) for one sample. A liquid supplying head for a paper sample is connected to the capillary via a Teflon (registered trademark) tube, and the position of the meniscus in the capillary is automatically read by an optical sensor. Specifically, a dynamic scanning absorptometer (K350 series, type D, available from Kyowa Co., Ltd.) was used to measure the quantity of transferred pure water or ink. The quantity of transferred one for a contact time period of 100 ms or 400 ms may be obtained by interpolating measurement values of transfer quantity measured for contact time periods around each contact time period. The measurement was conducted at 23° C. and 50% RH.

—Supporter—

A supporter is not particularly limited and may be selected appropriately according to the purpose. For example, there may be provided a sheet-shaped material such as a wood fiber-based paper and a nonwoven fabric based on a wood fiber and synthetic fiber.

The paper sheet is not particularly limited and may be selected appropriately among well-known ones according to the purpose. For example, wood pulp, recycled pulp, and the like may be used. For the wood pulp, there may be provided leaf bleached kraft pulp (LBKP), needle bleached kraft pulp (NBKP), NBSP, LBSP, GP, TMP, and the like.

For the raw materials of the recycled pulp, there may be provided superior whites, ruled whites, cream whites, cards, special whites, middle whites, similis, white colors, Kents, white arts, extra pieces, special pieces, newspapers, magazines and the like, which are indicated in the standard table of standard qualities of recycled papers of the Paper Recycling Promotion Center. Specifically, there may be provided recycled papers of normal papers and board papers such as; printer papers such as non-coated computer paper, heat sensitive paper, and pressure-sensitive paper which are papers relating to information; OA recycled papers such as papers for an PPC; coated papers such as art paper, coat paper, ultra-lightweight coated paper, and matt paper; and non-coated papers such as wood-free paper, color wood-free bond paper, note, letter paper, wrapping paper, fancy paper, medium quality paper, newspaper, woody paper, supermarket flyers, simili paper, pure-white roll paper, and milk cartons and the like; and chemical pulp papers; high yield pulp containing papers; and the like. In regard to them, one kind of them may be used separately or two or more kinds of them may be used in combination.

Generally, the recycled paper pulp is produced by a combination of the following four processes:

(1) Disintegration is for treating a recycled paper with a mechanical force of a pulper and a chemical to disintegrate it into fibers and separate printing ink from the fibers;

(2) Dust elimination is for eliminating foreign substances (such as plastics) contained in a recycled paper and dust by means of a screen, a cleaner, or the like;

(3) Deinking is for eliminating printing ink separated from fibers by using a surfactant to an external system by a flotation method or a cleaning method; and (4) Bleaching is for increasing the whiteness of fibers by using oxidation or reduction effect.

When the recycled pulps are mixed, it is preferable that the mixing ratio of recycled pulp to the whole pulp is equal to or less than 40% from the viewpoint of the prevention of curl after recording.

For an internal filler used for the supporter, for example, a conventionally or publicly known pigments are used as a white pigment. For the white pigment, there may be provided, for example, white inorganic pigments such as calcium carbonate light, calcium carbonate heavy, kaolin, clays, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate, magnesium hydroxide, and the like; and organic pigments such as styrenic plastic pigments, acrylic plastic pigments, polyethylene, microcapsules, urea resin, melamine resin, and the like. In regard to them, one kind of them may be used separately or two or more kinds of them may be used in combination.

For an internal sizing agent used in papermaking the supporter, there may be provided, for example, neutral rosin-type sizing agents used for neutral papermaking, alkenyl succinic anhydrides (ASA), alkyl ketene dimers (AKD), petroleum resin-based sizing agents, and the like. Among these, neutral rosin sizing agents or alkenyl succinic anhydrides are particularly preferable. Although alkyl ketene dimers have a high sizing effect, and therefore, the loadings thereof are small, the friction coefficient of the surface of a recording paper sheet (medium) is reduced to cause easy slipping and it may be unfavorable from the viewpoint of the conveyance property thereof at the time of ink jet recording.

—Coating Layer—

The coating layer is configured to include a pigment and a binder (binding agent), and may be configured further to include a surfactant and another component, according to need.

For the pigment, an inorganic pigment or a combination of an inorganic pigment and organic pigment may be used.

For the inorganic pigment, there may be provided, for example, kaolin, talc, calcium carbonate heavy, calcium carbonate light, calcium sulfite, amorphous silica, alumina, titanium white, magnesium carbonate, titanium dioxide, aluminum hydroxide, calcium hydroxide, magnesium hydroxide, zinc hydroxide, chlorite, and the like. Among these, kaolin is excellent in gloss expression and is particularly preferable since the appearance of it is allowed to be like a paper sheet for offset printing.

In the case of a pigment ink, in which a colorant is in the state of dispersion in ink, the colorant remains on the surface of a coating layer, and therefore, it is not necessary to use a large quantity of a pigment with a small index of refraction such as amorphous silica and alumina, as an inorganic pigment for a coating layer.

For The kaolin, there may be provided delaminated kaolin, calcined kaolin, engineered kaolin subjected to surface modification, and the like, and it is preferable that a kaolin having a particle diameter distribution in which the rate of particle diameters equal to or less than 2 μm is equal to or greater than 80% by mass occupy 50% by mass or greater of the total amount of kaolins, by taking the gloss expression into consideration.

In regard to the loading of kaolin, 50 parts by mass or greater based on 100 parts by mass of the binder is preferable. If the loading is less than 50 parts by mass, a sufficient effect with respect to glossiness may not be obtained. Although the upper limit of the loading is not particularly limited, 90 parts by mass or less in more preferable for coating suitability by taking the fluidity of kaolin, particularly, the thickening property thereof under a high shearing force into consideration.

For the organic pigment, there may be provided, for example, water-soluble dispersions of styrene-acrylic copolymer particles, styrene-butadiene copolymer particles, polystyrene particles, polyethylene particles or the like. Two or more kinds of these organic pigments may be mixed.

The amount of an organic pigment in the total amount of pigment in the coating layer is preferably 2-20 mass percent. An organic pigment as described above has a specific gravity lower than that of an inorganic pigment and therefore provides a thick, high-gloss coating layer having a good coatability. If the mass percentage of an organic pigment is less than 2 percent, a desired effect is not obtained. If the mass percentage of an organic pigment is more than 20 percent, the fluidity of a coating liquid becomes too low and, as a result, the efficiency of a coating process decreases and the operational costs increase.

Organic pigments can be divided into several types according to their particle shapes: solid-shape, hollow-shape, and doughnut-shape. To achieve a good balance between the glossiness, coatability, and fluidity of a coating liquid, an organic pigment having hollow-shaped particles with a void percentage of 40 percent or higher and an average diameter of between 0.2 and 3.0 μm is preferable.

As a binder, a water-based resin is preferably used.

As a water-based resin, a water-soluble resin or a water-dispersible resin may be used. Any type of water-based resin may be used depending on the purpose. For example, the following water-based resins may be used: polyvinyl alcohol; a modified polyvinyl alcohol such as anion-modified polyvinyl alcohol, cation-modified polyvinyl alcohol, or acetal-modified polyvinyl alcohol; polyurethane; polyvinyl pyrrolidone; a modified polyvinyl pyrrolidone such as polyvinyl pyrrolidone-vinyl acetate copolymer, vinyl pyrrolidone-dimethylaminoethyl methacrylate copolymer, quaternized vinyl pyrrolidone-dimethylaminoethyl methacrylate copolymer, or vinyl pyrrolidone-methacrylamide propyl trimethyl ammonium chloride copolymer; cellulose such as carboxymethyl cellulose, hydroxyethyl cellulose, or hydroxypropylcellulose; modified cellulose such as cationized hydroxyethyl cellulose; polyester, polyacrylic acid (ester), melamine resin, or modified versions of these substances; synthetic resin made of polyester-polyeurethane copolymer; and other substances such as poly(metha)acrylic acid, poly(metha)acrylamide, oxidized starch, phosphorylated starch, self-denatured starch, cationized starch, other modified starches, polyethylene oxide, polyacrylic acid soda, and alginic acid soda. The above substances may be used individually or in combination.

Among the above substances, polyvinyl alcohol, cation-modified polyvinyl alcohol, acetal-modified polyvinyl alcohol, polyester, polyurethane, and polyester-polyeurethane copolymer are especially preferable in terms of ink-absorption rate.

Any type of water-dispersible resin may be used depending on the purpose. For example, the following water-dispersible resins may be used: polyvinyl acetate, ethylene-polyvinyl acetate copolymer, polystyrene, styrene-(metha)acrylic ester copolymer, (metha)acrylic ester polymer, polyvinyl acetate-(metha)acrylic acid (ester) copolymer, styrene-butadiene copolymer, an ethylene-propylene copolymer, polyvinyl ether, and silicone-acrylic copolymer. A water-dispersible resin may contain a cross-linking agent such as methylol melamine, methylol hydroxypropylene urea, or isocyanate. Also, a self-crosslinking copolymer containing a unit of methylol acrylamide may be used as a water-dispersible resin. Two or more of the water-dispersible resins described above may be used at the same time.

The mass ratio of the water-based resin to the pigment in the coating layer is preferably 2:100 to 100:100, and more preferably 3:100 to 50:100. The amount of the water-based resin in the coating layer is determined so that the liquid-absorption rate of a recording medium falls within a specific range.

When a water-dispersible colorant is used, whether to mix a cationic organic compound in the binder is optional. For example, primary to tertiary amines that react with sulfonic groups, carboxyl groups, or amino groups of a direct dye or an acid dye in a water-soluble ink, and form insoluble salt; or a monomer, oligomer, or polymer of quarternary ammonium salt may be used. Among them, an oligomer and a polymer of quarternary ammonium salt are especially preferable.

As a cationic organic compound, the following substances may be used: dimethylamine-epichlorohydrin polycondensate, dimethylamine-ammonia-epichlorohydrin condensate, poly(trimethyl aminoethyl-methacrylate methylsulfate), diallylamine hydrochloride-acrylamide copolymer, poly(diallylamine hydrochloride-sulfur dioxide), polyallylamine hydrochlorid, poly(allylamine hydrochlorid-diallylamine hydrochloride), acrylamide-diallylamine copolymer, polyvinylamine copolymer, dicyandiamide, dicyandiamide-ammonium chloride-urea-formaldehyde condensate, polyalkylene polyamine-dicyandiamide ammonium salt consensate, dimethyl diallyl ammonium chloride, poly(diallyl methyl amine) hydrochloride, poly(diallyl dimethyl ammonium chloride), poly(diallyl dimethyl ammonium chloride-sulfur dioxide), poly(diallyl dimethyl ammonium chloride-diallyl amine hydrochloride derivative), acrylamide-diallyl dimethyl ammonium chloride copolymer, acrylate-acrylamide-diallyl amine hydrochloride copolymer, polyethylenimine, ethylenimine derivative such as acrylamine polymer, and modified polyethylenimine alkylene oxide. The above substances may be used individually or in combination.

It is preferable to use a cationic organic compound with a low-molecular weight such as dimethylamine-epichlorohydrin polycondensate or polyallylamine hydrochlorid and a cationic organic compound with a relatively-high molecular weight such as poly(diallyl dimethyl ammonium chloride) in combination. Compared with a case where only one cationic organic compound is used, using cationic organic compounds in combination improves image density and reduces feathering.

The equivalent weight of cation in a cationic organic compound obtained by the colloid titration method (performed using polyvinyl potassium sulfate and toluidine blue) is preferably between 3 and 8 meq/g. With an equivalent weight in the above range, the dry deposit mass of the cationic organic compound falls within a preferable range. In the measurement of the equivalent weight of cation, the cationic organic compound is diluted with distillated water so that the solid content in the solution becomes 0.1 mass percent. No pH control is performed.

The dry deposit mass of the cationic organic compound is preferably between 0.3 and 2.0 $g/m^2$. If the dry deposit mass of the cationic organic compound is lower than 0.3 $g/m^2$, sufficient improvement in image density and sufficient reduction in feathering may not be achieved.

Any surfactant may be used depending on the purpose. For example, an anion surfactant, a cation surfactant, an amphoteric surfactant, or a nonionic surfactant may be used. Among the above surfactants, a nonionic surfactant is especially preferable. Adding a surfactant improves water resistance and density of an image, and thereby reduces bleeding.

For example, the following nonionic surfactants may be used: higher alcohol ethylene oxide adduct, alkylphenol ethylene oxide adduct, fatty acid ethylene oxide adduct, polyhydric alcohol fatty acid ester ethylene oxide adduct, higher aliphatic amine ethylene oxide adduct, fatty acid amide ethylene oxide adduct, fatty oil ethylene oxide adduct, ethylene oxide adduct of fat, polypropylene glycol ethylene oxide adduct, glycerol fatty acid ester, pentaerythritol fatty acid ester, sorbitol-sorbitan fatty acid ester, sucrose fatty acid ester, polyhydric alcohol alkyl ether, and alkanolamine fatty acid amide. The above substances may be used individually or in combination.

Polyhydric alcohol is not limited to a specific type and any type of polyhydric alcohol may be used depending on the purpose. For example, glycerol, trimethylolpropane, pentaerythrite, sorbitol, or surcose may be used. Ethylene oxide adduct may be made by replacing a part of ethylene oxide with an alkylene oxide such as propylene oxide or butylene oxide to the extent that the water solubility is not affected. The percentage of the replaced part is preferably 50 percent or lower. The hydrophile-lipophile balance (HLB) of a nonionic surfactant is preferably between 4 and 15, and more preferably between 7 and 13.

The mass ratio of the surfactant to the cationic organic compound is preferably 0:100 to 10:100, and more preferably 0.1:100 to 1:100.

Other components may also be added to the coating layer to the extent that its advantageous effects are not undermined. Examples of other components include additives such as an alumina powder, a pH adjuster, an antiseptic agent, and an antioxidant.

The method of forming the coating layer is not limited to a specific method. For example, the coating layer may be formed by impregnating the base material with a coating liquid or by applying a coating liquid to the base material. For the impregnation or application of a coating liquid, a coater such as a conventional size press, a gate roll size press, a film transfer size press, a blade coater, a rod coater, an air knife coater, or a curtain coater may be used. Also, using a conventional size press, a gate roll size press, or a film transfer size press attached to a paper machine for the impregnation or application of a coating liquid may improve the efficiency of the process.

There is no specific limit to the amount of a coating liquid on the base material. However, the solid content of a coating liquid on the base material is preferably between 0.5 and 20 $g/m^2$, and more preferably between 1 and 15 $g/m^2$. After the impregnation or application of a coating liquid, the coating liquid may be dried. The temperature for this drying process is preferably between 100 and 250° C., but is not limited to the specific range.

The exemplary recording medium used in the recording method of the present invention may also have a back layer on the back of the base material, and other layers between the base material and the coating layer or between the base material and the back layer. Also, a protective layer may be provided on the coating layer. Each of the layers may be composed of one layer or multiple layers.

In the case that absorbency of liquid is within the above range of invention, the recording medium used in the recording method of the present invention may be commercially available coated paper for offset printing, coated paper for gravure other than recording medium used for ink jet.

It is preferable that grammage of the recording medium used in the recording method of the present invention is between 50 and 250 $g/m^2$. When it is less than 50 $g/m^2$, it is easy to produce poor transportation that the recording medium is clogged on the way of a transportation course so that there is no strength. When the grammage of the recording medium is over than 250 $g/m^2$, the recording medium cannot finish turning in a curve part on the way of the transportation course so that the strength of paper becomes too strong thereby it is easy to produce poor transportation that the recording medium is clogged.

Also, as a coloring material of ink, either a pigment or a dye can be used and a mixture thereof can be used. Additionally, when a pigment is used, it is relatively easy to form a high quality image with excellent weatherability and water resistance on a normal paper sheet, compared to a dye.

As a pigment, the following ones can be preferable used. Also, a mixture of plural kinds of the pigments may be used.

As an organic pigment, there can be provided, for example, azoic, phthalocyanine-based, anthraquinone-based, quinacridone-based, dioxazine-based, indigo-based, thioindigo-based, perylene-based, and isoindolinone-based pigments, aniline black, azomethine-type pigments, rhodamine B lake pigment, and carbon black.

As an inorganic pigment, there can be provided, for example, iron oxide, titanium oxide, calcium carbonate, barium sulfate, aluminum hydroxide, barium yellow, iron blue, cadmium red, chrome yellow, and metal powder.

The particle diameter of the pigment is preferably 0.01-0.30 μm, and if it is 0.01 μm or less, the light fastness thereof may be degraded or feathering may be easily caused since the particle diameter is close to that of dye. On the other hand, if it is 0.30 μm or greater, clogging of an ejection port or a filter in a printer may be caused and stable ejection may be hardly attained. 0.01-0.16 μm is more preferable from the viewpoint of the clogging or the stable ejection.

As a carbon black used for a black pigment ink, preferable is a carbon black manufactured by a furnace method or a channel method and having a primary diameter of 15-40 millimicrons, a BET specific surface area of 50-300 square meter/g, a DBP oil absorption of 40-150 ml/100 g, 0.5-10% of a volatile component, and a pH value of 2-9. As such, there can be used, for example, No. 2300, No. 900, MCF-88, No. 33, No. 40, No. 45, No. 52, MA7, MA8, MA100, No. 2200B (which are available from Mitsubishi Chemical Corporation), Raven 700, Raven 5750, Raven 5250, Raven 5000, Raven 3500, Raven 1255 (which are available from Columbian Chemicals Company), Regal 400R, Regal 330R, Regal 660R, MogulL, Monarch 700, Monarch 800, Monarch 880, Monarch 900, Monarch 1000, Monarch 1100, Monarch 1300, Monarch 1400 (which are available from Cabot Corporation), Color black FW1, Color black FW2, Color black FW2V, Color black FW18, Color black FW200, Color black S150, Color black 5160, Color black S170, Printex 35, Printex U, Printex V, Printex 140U, Printex 140V, Special black 6, Special black 5, Special black 4A, and Special black 4 (which are available from Degussa), but it is not limited to them.

Specific examples of color pigments are provided below.

As an organic pigment, there can be provided, for example, azoic, phthalocyanine-based, anthraquinone-based, quinacridone-based, dioxazine-based, indigo-based, thioindigo-based, perylene-based, and isoindolinone-based pigments, aniline black, azomethine-type pigments, rhodamine B lake pigment, and carbon black, and as an inorganic pigment, there can be provided, for example, iron oxide, titanium oxide, calcium carbonate, barium sulfate, aluminum hydroxide, barium yellow, iron blue, cadmium red, chrome yellow, and metal powder.

Specifically, the following ones for each color are provided below.

As an example of a pigment which can be used for yellow ink, there can be provided, for example, CI pigment yellows 1, 2, 3, 12, 13, 14, 16, 17, 73, 74, 75, 83, 93, 95, 97, 98, 114, 128, 129, 151, and 154, but it is not limited to them.

As an example of a pigment which can be used for magenta ink, there can be provided, for example, CI pigment reds 5, 7, 12, 48 (Ca), 48 (Mn), 57 (Ca), 57:1, 112, 123, 168, 184, and 202, but it is not limited to them.

As an example of a pigment which can be used for cyan ink, there can be provided, for example, CI pigment blues 1, 2, 3, 15:3, 15:34, 16, 22, and 60, and CI vat blue 4 and 60, but it is not limited to them.

Also, a pigment which is newly manufactured for the present invention can be used as a pigment contained in each ink used in the present invention.

An ink jet recording liquid may be obtained by dispersing the pigment described above in an aqueous medium using a polymeric dispersing agent or a surfactant. As a dispersing agent for dispersing powder of such an organic pigment, a commonly used water-soluble resin or water-soluble surfactant can be used.

As a specific example of the water-soluble resin, there can be provided, for example, block copolymers, random copolymers, and salts thereof, which copolymers are obtained from at least two kinds of monomers selected from the group including styrene, styrene derivatives, vinylnaphthalene derivatives, aliphatic alcohol esters of α,β-ethylene unsaturated carboxylic acids, acrylic acid, acrylic acid derivatives, maleic acid, maleic acid derivatives, itaconic acid, itaconic acid derivatives, fumarate, and fumarate derivatives.

These water-soluble resins are alkali-soluble resins which are soluble in aqueous solution in which a base is dissolved, and among these, it is particularly preferable that the weight-average molecular weight thereof is 3,000-20,000, since an advantage can be obtained such that the viscosity of a dispersion liquid can be reduced and the dispersion is easily attained, in the case of use in an ink jet recording liquid.

Also, a combination of a polymeric dispersing agent and a self-dispersing pigment is preferable to obtain an appropriate dot diameter. The reason has not been necessarily clear but can be considered as follows.

The penetration into a recording paper sheet is suppressed by containing a polymeric dispersing agent. On the other hand, since aggregation of a self-dispersing pigment is suppressed by containing a polymeric dispersing agent, the self-dispersing pigment can spread smoothly in the horizontal directions. As a result, a dot spreads widely and thinly so that a desirable dot can be formed.

Also, as a specific example of a water-soluble surfactant which can be used as a dispersing agent, the following ones can be provided. For example, as an anionic surfactant, there can be provided, for example, higher fatty acid salts, alkyl sulfates, alkyl ether sulfates, alkyl ester sulfates, alkyl aryl ether sulfates, alkyl sulfonates, sulfosuccinates, alkyl allyl sulfonates, alkyl naphthalene sulfonates, alkyl phosphate, polyoxyethylene alkyl ether phosphates, and alkyl allyl ether phosphates. Also, as a cationic surfactant, there can be provided, for example, alkyl amine salts, dialkyl amine salts, tetraalkyl ammonium salts, benzalkonium salts, alkyl pyridinium salts, and imidazolinium salts.

Further, as an amphoteric surfactant, there can be provided, for example, dimethyl alkyl lauryl betaines, alkyl glycines, alkyl di(aminoethyl) glycines, and imidazolinium betaines. As a nonionic surfactant, there can be provided, for example, polyoxyethylene alkyl ethers, polyoxyethylene alkyl allyl ethers, polyoxyethylene polyoxypropylene glycol, glycerin esters, sorbitan esters, sucrose esters, polyoxyethylene ethers of glycerin esters, polyoxyethylene ethers of sorbitan esters, polyoxyethylene ethers of sorbitol esters, fatty acid alkanolamides, polyoxyethylene fatty acid amides, amine oxides, and polyoxyethylene alkylamines.

Also, the pigment can be coated with or microencapsulated by a resin having a hydrophilic group so as to provide it with dispersibility.

As a method for coating a water-insoluble pigment with or microencapsulating it by an organic polymer, any of the publicly known methods can be used. As a publicly known method, there can be provided, for example, chemically manufacturing methods, physically manufacturing methods, physically chemical methods, and mechanically manufacturing methods. Specifically, there can be provided, for example, an interfacial polymerization method, an in-situ polymerization method, a submerged cured coating method, a coacervation (phase separation) method, a submerged drying method, a melting-dispersion-cooling method, an aerial suspension coating method, a spray-drying method, an acid precipitation method, and a phase inversion emulsification method.

The interfacial polymerization method is a method such that two kinds of monomers or two kinds of reactants are separately dissolved in a dispersion phase and a continuous phase and both substances are reacted on the interface therebetween so as to form a wall film. The in-situ polymerization method is a method such that a liquid or gaseous monomer and a catalyst or two kinds of reactive substances are provided from either of the sides of a continuous phase and nuclear particles so as to cause reaction and to form a wall film. The submerged cured coating method is a method such that drops of a polymer solution containing particles of a core material is insolubilized by a curing agent, etc., in liquid so as to form a wall film.

The coacervation (phase separation) method is a method such that a polymer dispersion liquid in which particles of a core material are dispersed is separated into a coacervate (concentrated phase) with a high polymer concentration and a diluted phase so as to form a wall film. The submerged drying method is a method such that a liquid in which a core material is dispersed in a solution of a wall film material is prepared, the dispersion liquid is added into a liquid which is not miscible with a continuous phase of the dispersion liquid so as to obtain a complex emulsion, and a medium dissolving the water film material is gradually removed so as to form a wall film.

The melting-dispersion-cooling method is a method such that a wall film material which is melted into liquid by heating and solidified at ordinary temperature is heated and liquefied, particles of a core material are dispersed therein, they are made be fine particles, and cooling is performed to form a wall film. The aerial suspension coating method is a method such that particles of a core material are suspended as powder in gas by a fluidized bed and floated in gas stream while a coating liquid of a wall film material is sprayed and mixed therein so as to form a wall film.

The spray-drying method is a method such that a stock solution for capsulation is sprayed and contacted with hot wind so as to evaporate and dry a volatile component whereby a wall film is formed. The acid precipitation method is a method such that at least one of anionic groups of an organic polymeric compound containing the anionic groups is neutralized with a basic compound so as to provide the solubility to water, kneading is made with a coloring material in an aqueous medium, subsequently, neutralization or acidification is made with an acidic compound so as to precipitate organic compounds and fix them on the coloring material, and finally, neutralization and dispersion are made. The phase inversion emulsification method is a method such that while a mixture containing an anionic organic polymer having dispersibility in water and a coloring material is provided as a organic solvent phase, water is thrown into the organic solvent phase or the organic solvent phase is thrown into water.

As an organic polymer (resin) used for a material for constituting a wall film of a microcapsule, there can be provided, for example, polyamides, polyurethanes, polyesters, polyureas, epoxy resins, polycarbonates, urea resins, melamine resins, phenol resins, polysaccharides, gelatin, gum Arabic, dextran, casein, proteins, natural rubbers, carboxypolymethylene, polyvinyl alcohol, polyvinyl pyrrolidone, polyvinyl acetate, polyvinyl chloride, polyvinylidene chloride, cellulose, ethylcellulose, methylcellulose, nitrocellulose, hydroxyethylcellulose, cellulose acetate, polyethylene, polystyrene, homopolymers and copolymers of (meth)acrylic acid, homopolymers and copolymers of (meth)acrylates, (meth)acrylic acid-(meth)acrylate copolymer, styrene-(meth)acrylic acid copolymer, styrene-maleic acid copolymer, sodium alginate, fatty acids, paraffins, beeswax, water wax, hardened beef tallow, carnauba wax, and albumin.

Among these, organic polymers having an anionic group such as a carboxyl group or a sulfone group can be used. Also, as a nonionic organic polymer, there can be provided, for example, polyvinyl alcohol, polyethylene glycol monomethacrylate, polypropylene glycol monomethacrylate, methoxypolyethylene glycol monomethacrylate and copolymers thereof, and cationic ring-opening polymers of 2-oxazoline. Particularly, polyvinyl alcohol obtained through complete saponification has a low water-solubility and a property such that it is easily dissolved in hot water but is not easily dissolved in cold water, which is particularly preferable.

Also, the content of an organic polymer for constituting a wall film of a microcapsule is 1% by weight or more and 20% by weight or less of a water-insoluble coloring material such as organic pigments and carbon blacks. As the content of the organic polymer is in the range described above, the content of the organic polymer in the capsule is comparatively low and, therefore, the lowering of the coloring property of a pigment which is caused by coating the surface of the pigment with the organic polymer can be suppressed. If the content of the organic polymer is less than 1% by weight, it may be difficult to provide the effect of capsulation, and, on the other hand, if it is more than 20% by weight, the coloring property of the pigment may be significantly lowered. Further, as other properties thereof are taken into consideration, the content of the organic polymer is preferably in a range of 5-10% by weight of the water-insoluble coloring material.

That is, since a part of the coloring material is not coated but is substantially exposed, the lowering of the coloring property can be suppressed and, on the other hand, a part of the coloring material is not exposed but is substantially coated, the effect of coating the pigment is simultaneously provided. Also, the number-average molecular weight of the organic polymer is preferably 2,000 or greater from the viewpoint of the manufacture of a capsule. Herein, "being substantially exposed" does not mean a partial exposure associated with a defect such as a pinhole and a crack but means the condition of being positively exposed.

Further, when an organic pigment which is a self-dispersive pigment or a self-dispersive carbon black is used as a coloring material, even if the content of the organic polymer in the capsule is comparatively low, the dispersibility of the pigment can be improved and, therefore, a sufficient storage stability can be obtained, which is more preferable for the present invention.

Additionally, it is preferable to select a suitable organic polymer depending on a method of microencapsulation. For example, for an interfacial polymerization method, polyesters, polyamides, polyurethanes, polyvinyl pyrrolidone, epoxy resins, etc., are suitable. For an in-situ polymerization method, homopolymers and copolymers of (meth)acrylates, (meth)acrylic acid-(meth)acrylate copolymers, styrene-(meth)acrylic acid copolymers, polyvinyl chloride, polyvinylidene chloride, polyamides, etc., are suitable. For a submerged cured coating method, sodium alginate, polyvinyl alcohol, gelatin, albumin, epoxy resins, etc., are preferable. For a coacervation method, gelatin, celluloses, casein, etc., are suitable. Of course, any of the publicly known encapsulation methods in addition to those described above can be also utilized for obtaining a fine and uniform microencapsulated pigment.

When a phase inversion method or an acid precipitation method is selected as a method of microcapsulation, an anionic organic polymer is used as an organic polymer for providing a wall film of a microcapsule. The phase inversion method is a method such that a complex of an anionic organic polymer having self-dispersibility or solubility in water and a coloring material such as a self-dispersive-organic pigment or a self-dispersion-type carbon black or a mixture of the anionic organic polymer, a coloring material such as a self-dispersive organic pigment or a self-dispersion-type carbon black, and a curing agent is provided as an organic solvent phase and microcapsulation is conducted while self-dispersion (phase inversion emulsification) is caused by throwing water into the organic solvent phase or throwing the organic solvent phase into water. In the inversion phase method, it is not problematic to mix a vehicle for recording liquid or an additive into the organic solvent phase for the manufacture. Particularly, it is more preferable to mix a liquid medium for recording liquid since a dispersion liquid for recording liquid can be directly manufactured.

On the other hand, the acid precipitation method is a method such that a part of or all anionic groups in a water-containing cake obtained by a manufacturing method including a processes of neutralizing a part of or all anionic groups of an organic polymer containing the anionic groups with a basic compound, kneading it with a coloring material such as a self-dispersive organic pigment or a self-dispersion-type carbon black in aqueous medium, and to control the pH to neutral or acidic using an acidic compound to precipitate and fix the anionic group-containing organic polymer on the pigment, is neutralized using a basic compound, thereby conducting the microencapsulation. Thus, an aqueous dispersion liquid containing a fine anionic microencapsulated pigment containing much pigment can be manufactured.

Also, as a solvent used in the microencapsulation as described above, there can be provided, for example, alkylalcohols such as methanol, ethanol, propanol and butanol; aromatic hydrocarbons such as benzole, toluole and xylole; esters such as methyl acetate, ethyl acetate and butyl acetate; chlorinated hydrocarbons such as chloroform and ethylene dichloride; ketones such as acetone and isobutyl methyl ketone; ethers such as tetrahydrofuran and dioxane; and cellosolves such as methylcellosolve and butylcellosolve. Also, the microcapsules prepared by the method described above is once separated from the solvent by means of centrifugal separation, filtration, or the like and stirred and re-dispersed in water and necessary solvent so as to an objective recording liquid which can be used for the present invention. The average particle diameter of the encapsulated pigment obtained by a method as described above is preferably 50 nm-180 nm.

Thus, the pigment adheres to an object to be printed due to such a resin coating so that the rubbing resistance of the object to be printed can be improved.

It is preferable to use a water-soluble organic solvent as well as a coloring material for the purposes of providing recording liquid used for an image forming apparatus according to the present invention with a desired physical property or preventing clogging in a nozzle of a recording head which is caused by the drying of the recording liquid. The water-soluble organic solvent may include a wetting agent or a penetrating agent. The wetting agent is added for the purpose of preventing clogging in a nozzle of a recording head which is caused by the drying of the recording liquid.

Also, the penetrating agent is added for the purpose of improving the wettability of a material to be recorded with recording liquid and adjusting the penetration speed thereof. As a penetrating agent, penetrating agents represented by the following formulas (I)-(IV) and (A) are preferable. That is, since a polyoxyethylene alkylphenyl ether-type surfactant of the following formula (I), a acetylene glycol-type surfactant of the following formula (II), a polyoxyethylene alkyl ether-type surfactant of the following formula (III) and polyoxyethylene polyoxypropylene alkyl ether-type surfactant of the following formula (IV) can lower the surface tension of liquid, the wettability can be improved and the penetration speed can be increased.

(I)

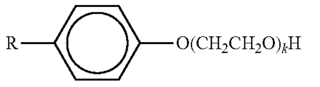

(R is a hydrocarbon chain with 6-14 carbon atoms which may be branched and k is 5-20.)

(II)

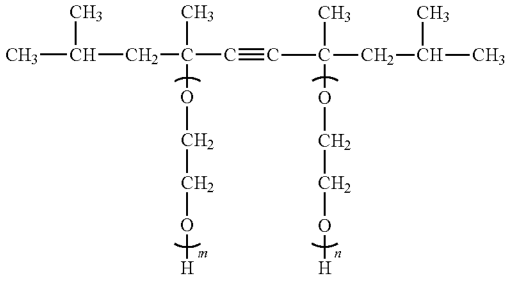

(Each of M and N is 0-40.)

$$R{-}(OCH_2CH_2)_nH \quad (III)$$

(R is a hydrocarbon chain with 6-14 carbon atoms which may be branched and k is 5-20.)

(IV)

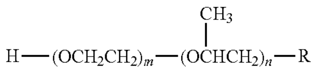

(R is a hydrocarbon chain with 6-14 carbon atoms and each of m and n is a number equal to or less than 20.)

$$CF_3CF_2(CF_2CF_2)_m{-}CH_2CH_2O(CH_2CH_2O)nH \quad (A)$$

In chemical formula (A), m is an integer of 0-10, and n is an integer of 1-40.

In addition to the compounds of the formulas (I)-(IV) and (A), there can be used, for example, polyhydric alcohol alkyl or aryl ethers such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; nonionic surfactants such as a polyoxyethylene polyoxypropylene block copolymer, fluorine-containing surfactants, and lower alcohols such as ethanol and 2-propanol, and diethylene glycol monobutyl ether is particularly preferable.

As a fluorinated surfactant, there can be provided, for example, perfluoroalkyl sulfonic acid compounds, perfluoroalkyl carboxylic acid compounds, perfluoroalkyl phosphate compounds, perfluoroalkyl ethyleneoxide compounds, and polyoxyalkylene ether polymers having a perfluoroalkyl ether group as a side chain. Among these, a polyoxyalkylene ether polymers having a perfluoroalkyl ether group as a side chain has a low foamability and a low fluorine compound bioaccumulation potential, which is recently considered problematic, and is therefore safety, which is particularly preferable.

As a commercial product thereof, there can be provided, for example, Surflon S-111, S-112, S-113, S-121, S-131, S-132, S-141, and S-145 (available from Asahi Glass Co., Ltd.); Fluorad FC-93, FC-95, FC-98, FC-129, FC-135, FC-170C, FC-430, and FC-431 (available from Sumitomo 3M Limited); Megafac F-470, F1405, and F-474(available from Dainippon Ink and Chemicals, Incorporated); Zonyl TBS, FSP, ESA, FSN-100, FSN, FSO-100, FSO, FS-300, UR (available from DuPont); FT-110, FT-250, FT-251, FT-400S, FT-150, FT-400SW (available from NEOS Co. Ltd.); and PF-151N (available from Omnova Solutions, Inc.). Among these, Zonyl FSN, FSO-100, and FSO (available from DuPont) are particularly preferable in terms of high reliability and good color development.

The surface tension of a recording liquid used in an image forming apparatus according to the present invention is more preferably equal to or less than 35 mN/m.

Similarly, the viscosity of a recording liquid is preferably in a range of 1.0-20.0 mPa·s, and more preferably in a range of 3.0-10.0 mPa·s from the viewpoint of the ejection stability.

Also, the pH of the recording liquid is preferably in a range of 3-11, and more preferably in a range of 6-10 from the viewpoint of the corrosion prevention for a metal part which contacts the liquid.

Also, an antiseptic or a fungicide can be contained in the recording liquid, whereby the growth of bacteria can be suppressed and the preservation stability and image quality stability thereof can be improved. As an antiseptic and fungicide, there can be used, for example, benzotriazole, sodium dehydroacetate, sodium sorbate, 2-pyridinethiol-1-oxide, isothiazolin-based compounds, sodium benzoate, and sodium pentachlorophenolate.

Also, a rust inhibitor can be contained in the recording liquid, whereby a coating can be formed on a metal surface of the head, etc., which contacts the liquid, so as to prevent the corrosion thereof. As a rust inhibitor, there can be used, for example, acidic sulfites, sodium thiosulfate, thiodiglycolic acid ammonium, diisopropyl ammonium nitrite, pentaerythritol tetranitrate, and dicyclohexyl ammonium nitrite.

Also, an antioxidant can be contained in the recording liquid, whereby the antioxidant can quench radical species which can cause corrosion and prevent the corrosion even when the radical species are generated.

As an antioxidant, phenolic compounds and amine compounds are representative. As a phenolic compound, there can be provided, for example, compounds such as hydroquinone and gallates; and hindered phenolic compounds such as 2,6-di-tert-butyl-p-cresol, stearyl β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-thiobis(3-methyl-6-tert-butylphenol), 1,1,3-tris(2-methyl-4-hydroxy-5-tert-butylphenyl)butane, 1,3,5-trimethyl-2,4,6-tris(3,5-di-tert-4-hydroxybenzyl)benzene, tris(3,5-dit-tert-butyl-4-hydroxybenzyl)isocyanurate, and tetrakis [methylene-3-(3',5'-di-tert-butyl-4-hydroxyphenyl) propionate]methane. As an amine compound, there can be provided, for example, N,N'-diphenyl-p-phenylenediamine, phenyl-β-naphthylamine, phenyl-α-naphthylamine, N,N'-β-naphthyl-p-phenylenediamine, N,N'-diphenylethylenediamine, phenothiazine, N,N'-di-sec-butyl-p-phenylenediamine, and 4,4'-tetramethyl-diaminodiphenylmethane. Also, for the latter, sulfur-containing compounds and phosphorus-containing compounds are representative. As a sulfur-containing compound, there can be provided, for example, dilauryl thiodipropionate, distearyl thiodipropionate, lauryl stearyl thiodipropionate, dimyristyl thiodipropionate, distearyl β,β'-thiodibutyrate, 2-mercaptobenzoimidazole, and dilauryl sulfide. As a phosphorus-containing compound, there can be provided, for example, triphenyl phosphite, trioctadecyl phosphite, tridecyl phosphite, trilauryl trithiophosphite, diphenyl isodecyl phosphite, trinonyl phenyl phosphiter and distearyl pentaerythritol phosphite.

As a pH adjuster contained in the recording liquid, there can be used, for example, hydroxides of alkali metals such as lithium hydroxide, sodium hydroxide, and potassium hydroxide; ammonium hydroxide; quaternary ammonium hydroxides; quaternary phosphonium hydroxides; carbonates of alkali metals such as lithium carbonate, sodium carbonate, and potassium carbonate; amines such as diethanolamine and triethanolamine; boric acid; hydrochloric acid; nitric acid; sulfuric acid; and acetic acid.

Specific examples of ink are described below but they are not limited to those described.

<Black Ink>

A CABOT produced carbon black dispersion (sulfone group addition type and self-dispersion type) was used and after mixing and stirring the following formulation, filtration with a 0.8 μm polypropylene filter was made so as to produce an ink.

Black dispersion; 40 parts by weight

CAB-O-JET 200 (sulfone group addition type, produced by CABOT Corporation)

Acrylsilicone-type resin emulsion; 8 parts by weight

Nanocryl SBCX-281 (produced by TOYO INK MFG. Co. Ltd.)

1,3-butanediol; 18 parts by weight

Glycerin; 9 parts by weight 2-pyrolidone; 2 parts by weight

Ethylhexanediol; 2 parts by weight

Fluorine-containing surfactant FS-300 (produced by Du Pont); 2 parts by weight

The above-mentioned general formula (A), m=6-8, n=26 or greater

Proxel LV (produced by Avecia KK); 0.2 parts by weight

Ion-exchanged water; 20.8 parts by weight

<Color Inks>

A polymer fine particle dispersion liquid containing a copper phthalocyanine pigment was replicated and prepared with reference to preparation example 3 in Japanese Patent Application Publication No. 2001-139849.

First, for preparation of a polymer solution, after the content of a 1 L flask with a mechanical stirrer, a thermometer, a nitrogen gas inlet tuber a reflux tube, and a dropping funnel was sufficiently replaced by nitrogen gas, it was charged with 11.2 g of styrene, 2.8 g of acrylic acid, 12.0 g of lauryl methacrylate, 4.0 g of polyethylene glycol methacrylate, 4.0 g of styrene macromer (Toagosei Co., Ltd., commercial name: AS-6), and 0.4 g of mercaptoethanol and the temperature thereof was raised to 65° C. Then, a mixed solution of 100.8 g styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (Toagosei Co., Ltd., commercial name: AS-6), 3.6 g of mercaptoethanol, 2.4 g of azobisdimethylvaleronitrile, and 18.0 g of methyl ethyl ketone was dripped into the flask for 2.5 hours. After the dropping was completed, a mixed solution of 0.8 g of azobisdimethylvaleronitrile and 18.0 g of methyl ethyl ketone was dropped into the flask for 0.5 hours. After aging for 1 hour at 65° C., 0.8 g of azobisdimethylvaleronitrile was added, and further aging was made for 1 hour. After the reaction was completed, 364 g of methyl ethyl ketone was added into the flask so as to obtain 800-g of a polymer solution with a concentration of 50%.

28 g of the polymer solution obtained as described above, 26 g of a copper phthalocyanine pigment, 13.6 g of 1 mol/L potassium hydroxide solution, 20 g of methyl ethyl ketone, and 30 g of ion-exchanged water were stirred sufficiently. Subsequently, 20 times kneading was made by using a triple roll mill (Noritake Co., Limited, commercial name: NR-84A). After the obtained paste was thrown into 200 g of ion-exchanged water and sufficient stirring was made, methyl ethyl ketone and water was distilled away by using an evaporator so as to obtain 160 g of a polymer fine particle dispersion with a solid content of 20.0 wt % and a cyan color.

While the dispersion liquid was used, the following formulation was mixed and stirred and then filtration with a 0.8 μm polypropylene filter was made so as to produce an ink.

Cyan polymer fine particle dispersion; 45 parts by weight 1,3-butanediol; 21 parts by weight Glycerin; 8 parts by weight Ethylhexanediol; 2 parts by weight Fluorine-containing surfactant FSN-100 (produced by Du Pont); 1 part by weight The above-mentioned general formula (A), m=1-9, n=0-25

Proxel LV (produced by Avecia KK); 0.5 parts by weight

Ion-exchanged water; 23.5 parts by weight

Thus, a penetrability at a practical level may be provided even to a coated paper for commercial and publication printing with a penetrability inferior to that of a so-called ink jet-dedicated paper or a normal paper, by addition of a fluorine-containing surfactant in addition to water-soluble solvents (1,3-butanediol and ethylhexanediol).

Next, it is preferable to apply a suitable surface treatment on the nozzle face of a liquid ejecting head in order to form an image with a high quality on a coated paper for commercial and publication printing.

When an ink having a comparatively low surface tension such as the inks described above is used, it is preferable that the surface of a nozzle forming member of a liquid ejecting head be excellent in the water-repellency (ink-repellency). This is because an ink meniscus is allowed to be normally formed even for an ink with a low surface tension, by using a nozzle forming member excellent in the water-repellency and ink-repellency, and as a result, an ink drop (or particle) is allowed to be formed well. As a meniscus is normally formed, no ink is drawn to one side at the time of ink jetting, and as a result, the jetting curve of ink is reduced so that an image with a high precision of a dot position may be obtained.

Also, when printing is made on a medium with a low absorbency such as the media (paper sheets) described above, the degree of the precision of a dot position is significantly reflected on an image quality. That is, since ink does not easily spread on a medium with a low absorbency, a part of a medium which is not sufficiently filled with ink, that is, a blank portion, is produced even if the precision of a dot position is lowered slightly. The part which is not sufficiently filled leads to irregularity in an image density or reduction of an image density, which provides appearance of image quality degradation.

Herein, as a head whose surface is formed with a water-repellent layer (a water-repellent film, a ink-repellent layer, and a ink-repellent film are used in the same meaning) is used for a liquid ejecting head, a high precision of a dot position may be obtained even if an ink with a low surface tension is used, and a medium may be filled with an ink even if a medium with a low absorbency is used, whereby image density irregularity or image density reduction may not be caused and a print with a high image quality may be obtained.

Figure 39:
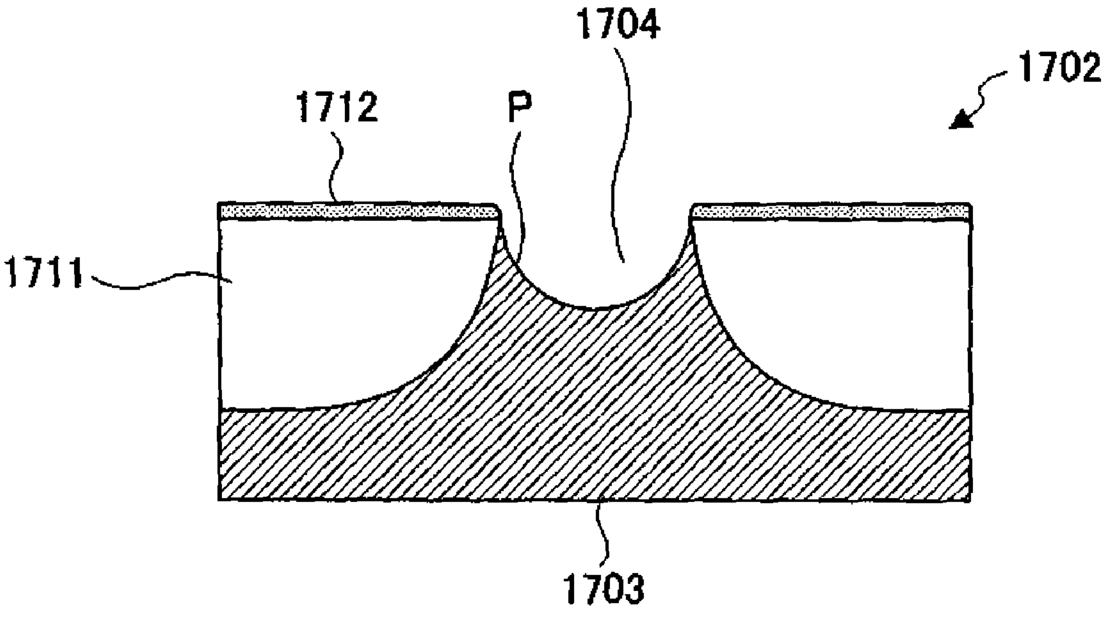
FIG. 39 is a cross-sectional diagram illustrating a nozzle plate which shows one example of a liquid ejecting head.
Figure 40:
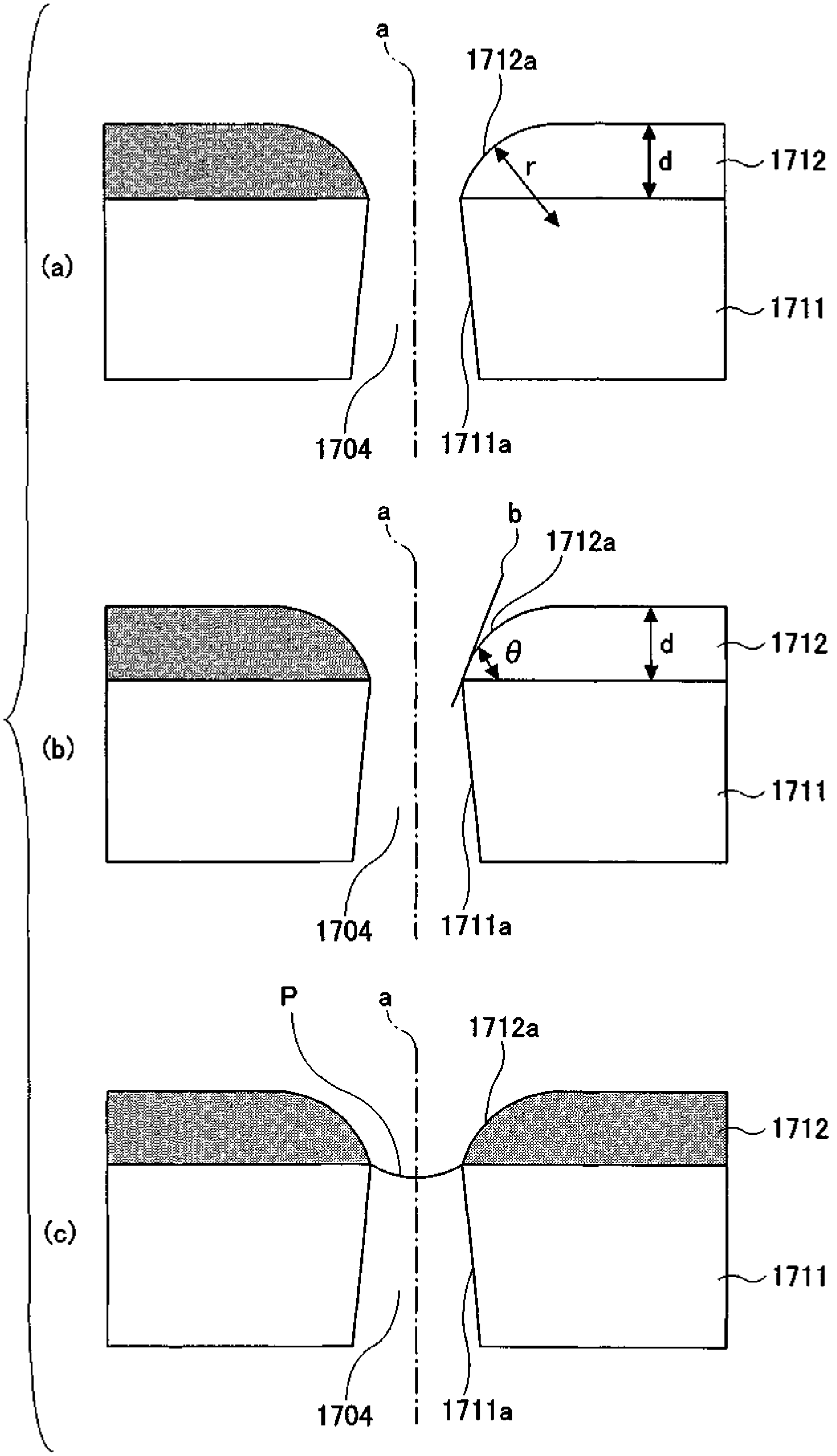
FIG. 40 is an enlarged cross-sectional diagram illustrating the essential part thereof.

First, one example of a nozzle plate of a liquid ejecting head for using an ink (recording liquid) and recording medium as described above is described with reference to FIG. 39 and FIG. 40. Additionally, FIG. 39 is an enlarged cross-sectional diagram illustrating a nozzle plate of the head and FIG. 40 is am enlarged cross-sectional diagram illustrating the essential part of FIG. 39. In a nozzle plate 1702 of the liquid ejecting head, a water-repellent layer 712 is formed on the surface of a nozzle substrate 1711 for forming a nozzle 1704. For example, the nozzle substrate 1711 is a Ni coating formed by means of Ni electroforming and a silicone resin coating (water-repellent layer) 1712 is formed on the surface of the nozzle substrate 1711.

Herein, it is preferable that the surface roughness Ra of the water-repellent layer 1712 be equal to or less than 0.2 μm. As the surface roughness Ra is equal to or less than 0.2 μm, the residual after wiping may be reduced. The film thickness of the water-repellent layer 1712 is equal to greater than 0.1 μm and preferably equal to greater than 0.05 μm. When a liquid chamber that is not shown in the figures is filled with an ink 1703 in the nozzle plate 1702, a meniscus (liquid surface) P is formed at an interface portion between the silicone resin coating (water-repellent layer) 1712 and the nozzle substrate 1711, as shown in FIG. 40(*c*).

Herein, a configuration is preferable such that the cross-sectional area of an opening for liquid drop ejection of a water-repellent layer in a plane perpendicular to the center line thereof near the opening of the water-repellent layer, which is formed on the surface of the nozzle substrate on which an opening for liquid drop ejection is formed, continuously increases with the increase of the distance from the surface of the nozzle substrate.

In this case, it is preferable that the form of the water-repellent layer near the opening be a form of curved surface. Also, it is preferable that the radius of curvature of a curved line of the water-repellent layer near the opening in a cross-sectional plane containing the center line of the opening of the water-repellent layer have a length equal to or greater than the film thickness of the water-repellent layer. Also, it is preferable that a curved line of the water-repellent layer near the opening from the edge of the opening of the water-repellent layer in a cross-sectional plane containing the center line of the opening of the water-repellent layer be approximately a circular curve and the radius of curvature of the circular arc be equal to or greater than the film thickness of the water-repellent layer.

Also, it is preferable that a tangential line passing through the edge of the opening of the water-repellent layer in a cross-sectional plane containing the center line of the opening of the water-repellent layer make an angle less than 90 degrees with the surface of the nozzle substrate which contains the edge.

These points are specifically described with reference to FIG. 40.

An opening 1711*a* for forming the nozzle 1704 of the nozzle substrate 1711 is formed such that a cross-sectional plane perpendicular to a center line “a” shown by a dashed line in FIG. 40 is approximately circle centered on the center line “a”. Also, an opening 1712*a* of the water-repellent layer 1712 which is formed at the side of a liquid ejecting face (liquid drop ejecting face) at the nozzle substrate 1711 is formed such that the cross-sectional area of the opening in a plane perpendicular to the center line “a” continuously increases with the increase of the distance from the nozzle substrate 1711. That is, the opening 1712*a* of the water-repellent layer 1712 is formed such that the cross-sectional area of the opening continuously increases toward the direction of liquid ejection.

In more detail, a curved line from the edge of the opening 1711*a* of the nozzle substrate 1711 to the surface of the water-repellent layer 1712 on a part for forming the opening 1712*a* of the water-repellent layer 1712 is in a round shape with a radius of curvature r, as shown in FIG. 40(*a*). It is preferable that the radius of curvature r be equal to or greater than the thickness (film thickness) d of the water-repellent layer 1712 except near the opening 1712*a*.

The thickness d is a thickness of a part except the round part of the water-repellent layer 1712 which round part forms the opening 1712*a*, and preferably, may be the maximum thickness of the water-repellent layer 1712.

Thus, the opening 1712*a* of the water-repellent layer 1712 which is continuously formed with the opening 1711*a* of the nozzle substrate 1711 has a shape with no approximately sharp edge (a smooth curved line with no sharp portion) and is a curved line with no engaging portion, whereby even if wiping is conducted by a wiper blade formed of a material such as rubbers (wiper blade 58 of FIG. 2), peeling of the water-repellent layer 1712 from the nozzle 1711 due to engagement of a sharp portion with the wiper blade may be reduced or suppressed.

Also, as shown in FIG. 40(*b*), it is preferable that the angle θ of a tangential line passing through a part forming the opening 1712*a* of the water-repellent layer 1712 in a cross-sectional plane containing the center line “a” of the opening 1711*a* of the nozzle substrate 1711, with the surface of the nozzle substrate 1711 which contains the edge of the opening 1711*a* of the nozzle substrate 1711 be less than 90 degrees.

Thus, since the angle θ of a tangential line at a part forming the opening 1712*a* of the water-repellent layer 1712 with the nozzle substrate 1711 is less than 90 degrees, a meniscus (liquid surface) P at an interface portion between the water-repellent layer 1712 and the nozzle substrate 1711 is stably formed, as shown in FIG. 40(*c*), and the possibility of forming a meniscus P at other portions may be greatly reduced.

Thus, since the formed surface of a meniscus may be stabilized, the jetting stability of liquid drops may be good one when image formation is conducted by an image forming apparatus using a liquid ejecting head including such a nozzle plate 1702.

Next, a silicone resin for forming the water-repellent layer 1712 is described. For the silicone resin, a room-temperature-curable liquid silicone resin is preferable, and particularly, one capable of being subjected to hydrolysis reaction is preferable. In the following example, SR2411 produced by Dow Corning Toray Co. Ltd. was used.

Herein, the results of evaluation in regard to the angle θ of a tangential line at a part forming the opening 1712*a* of the water-repellent layer 1712 with the nozzle substrate 1711, the radius r of curvature of a part forming the opening 1712*a* of the water-repellent layer 1712, ink pool around a nozzle, edge peeling, and jetting stability are shown in Table 1.

TABLE 1

| Edge shape | | Ink pool | Edge peeling | Jetting stability |
|---|---|---|---|---|
| Presence of Sharp end | | Partially generated | Generated | Good |
| Absence of | $\theta \leqq 90°$ | None | None | Good |
| Sharp end | $\theta > 90°$ | None | None | No good |
| (round | $R \geqq d$ | None | None | Good |
| shape) | $R < d$ | None | Partially generated | No good |

Thus, ink pool around a nozzle was observed and edge peeling due to wiping was caused in regard to one having a shape containing an approximately sharp edge on the edge part (near the edge of the opening portion) of the water-repellent layer 1712. On the other hand, no ink pool was caused in regard to any of ones having a round shape but edge peeling was partially caused in regard to one with r<d as illustrated in FIG. 41(*a*) and the result of unstable jetting of ink drops was observed in regard to one with θ>90 degrees as illustrated in FIG. 41(*b*).

Figure 41:
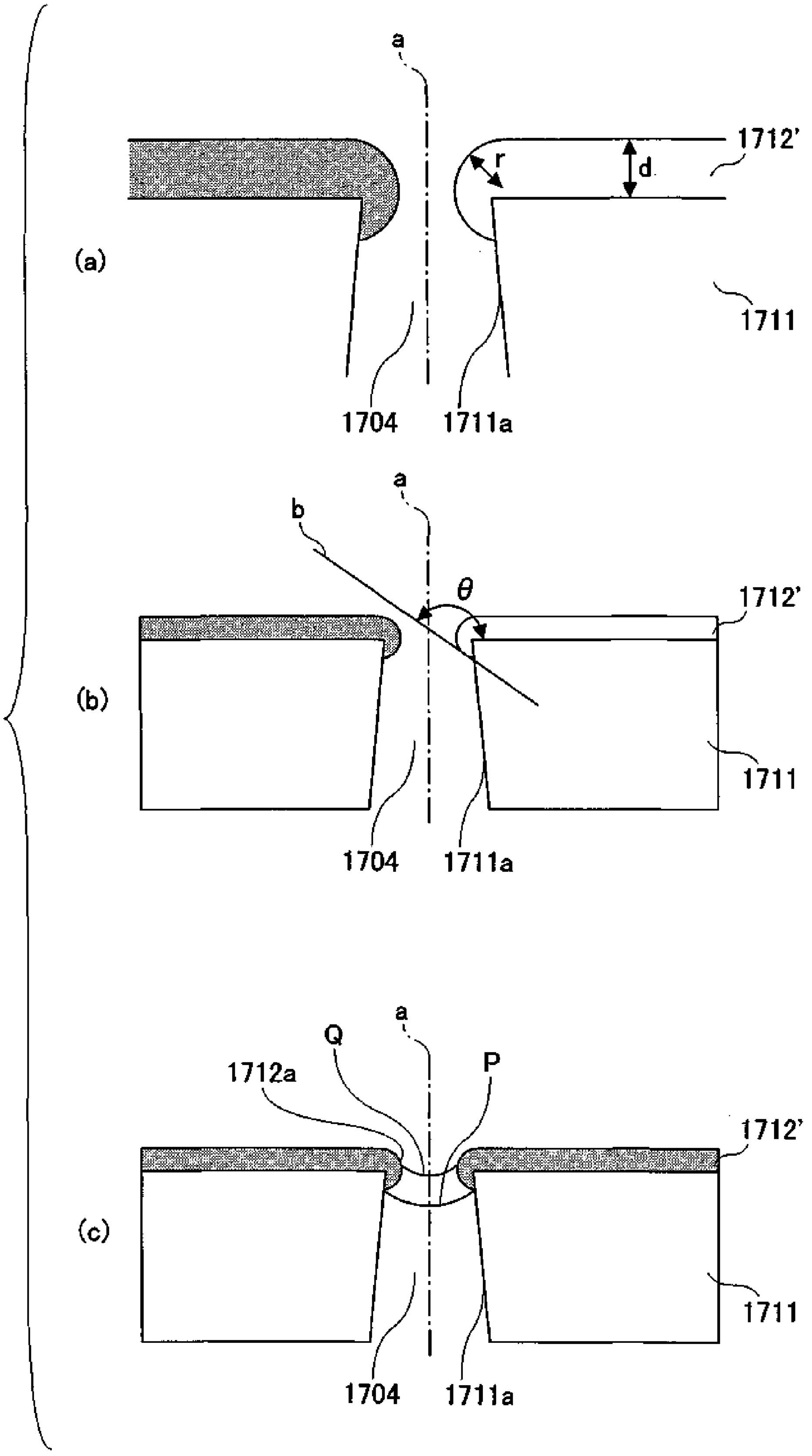
FIG. 41 is an enlarged cross-sectional diagram illustrating the essential part of a liquid ejecting head according to a comparison example.

That is, the case where a meniscus (liquid surface) P is formed at an interface portion of the water repellent layer 1712 and nozzle substrate 1711 and the case where a meniscus Q is formed at a convex portion of the water-repellent layer 1712 toward the center of the opening thereof (a part at which the cross-sectional area perpendicular to the center line of the opening is the minimum) are allowed at the time of filling with an ink 1703 in regard to one with r<d or θ>90 degrees as shown in FIG. 41(*c*). Accordingly, when image formation is conducted in an image forming apparatus using a liquid ejecting head including such a nozzle plate, it has been found that some dispersion in the jetting stability of liquid drops is caused.

Next, one example of a method for manufacturing a nozzle plate of the above-mentioned liquid ejecting head is described with reference to FIG. 42. This example is in an illustration diagram showing-one example of a manufacturing method for forming a water-repellent layer while a silicone resin is applied on the surface of a nozzle substrate by using a dispenser.

In this example, a dispenser 1721 for applying a silicone solution is arranged at the side of the liquid drop ejection face of the nozzle substrate 1711 provided by means of Ni electroforming, and the dispenser 1721 is moved for scanning such that a predetermined constant distance between the nozzle substrate 1711 and the tip of a needle 1722 is held while a silicone resin 1723 is ejected from the tip of the needle 1722, whereby a silicone coating film is selectively formed on the nozzle substrate 1711 at the side of the liquid drop ejection face thereof.

Herein, for the silicone resin, an ordinary-temperature-curable silicone resin SR2411 (Dow Corning Toray Co. Ltd.) with a viscosity of 10 mPa·s was used. However, slight spreading of silicone to the opening 1711*a* of the nozzle substrate 1711 and the back face of the nozzle substrate 1711 was observed. The thickness of such a selectively formed silicone resin coating (water-repellent layer 712) was 1.2 μm, and the surface roughness Ra thereof was 0.18 μm.

Figure 43:
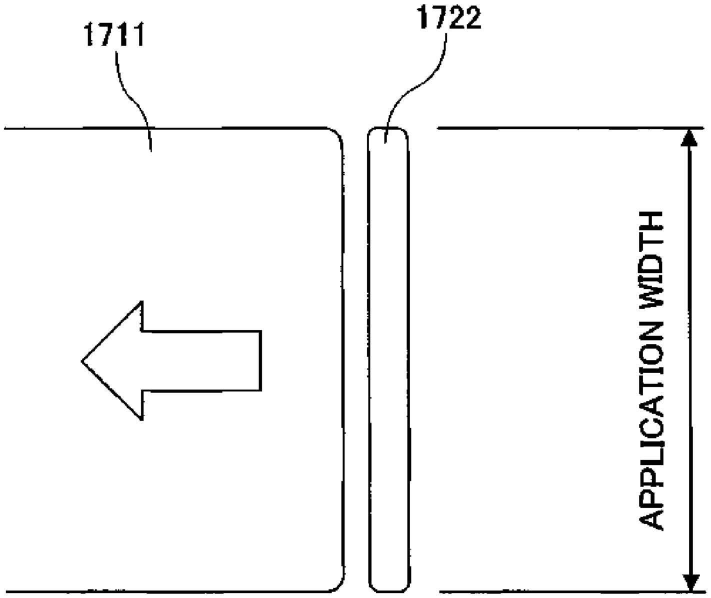
FIG. 43 is an illustration diagram contributing to an explanation of a dispenser needle, an application width and an application method.

As shown in FIG. 43, the application port of the tip of the needle 1722 of the dispenser 1721 has the same width as that of an application object. When such a dispenser 1721 is used, the application onto the entire of an application object may be completed by conducting only one scanning in the application direction (the direction of an arrow in the figure). That is, a scanning direction for an application operation may be one direction.

Figure 44:
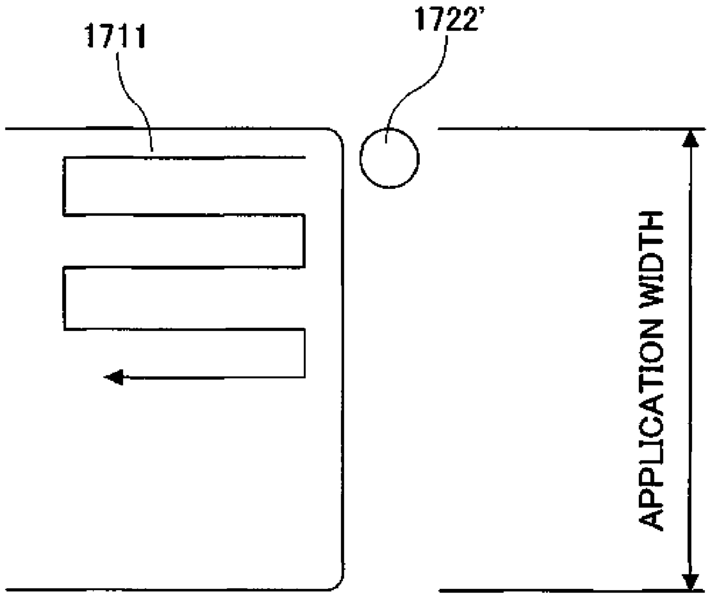
FIG. 44 is an illustration diagram contributing to an explanation of a dispenser needle application width and an application method of a comparison example.

On the contrary, when the application port of the tip of the needle 1722 of the dispenser 1721 is smaller than an application width for the nozzle substrate 1711 as shown in FIG. 44, the scanning direction of the dispenser 1721 may have to be changed or a further scanning to the opposite direction may have to be conducted.

Figure 42:
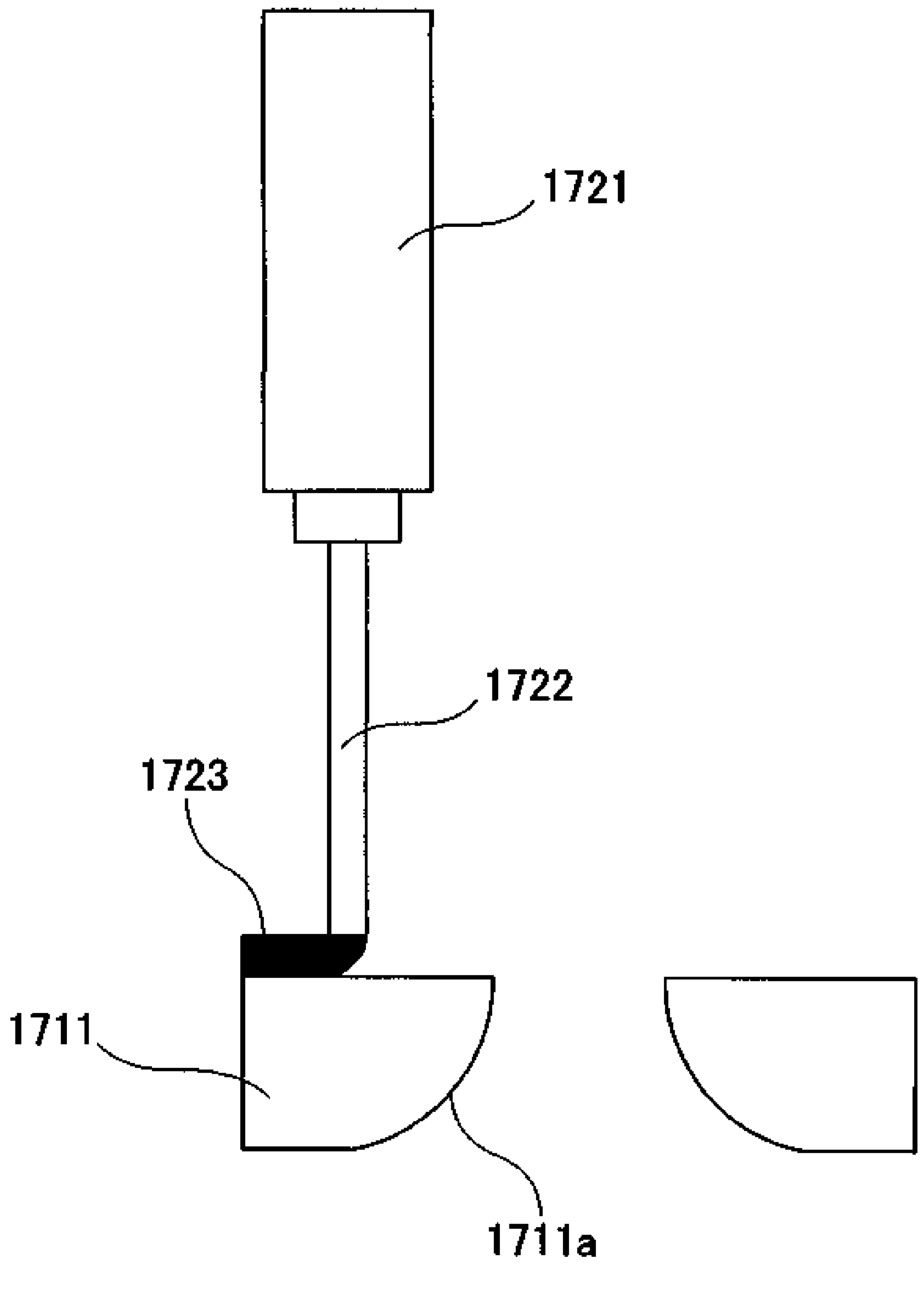
FIG. 42 is an illustration diagram contributing to an explanation of one example of a method for manufacturing the liquid drop ejecting head.

That is, the tip of a commonly used needle 1722' is greatly narrower than an application width for the nozzle substrate 1711 which is an application object, as shown in FIG. 42, it may be necessary to move so as to conduct the scanning in plural directions while the scanning direction for an application operation is change by 90 degrees or scanning is conducted toward the opposite direction, in order to complete the application to the entire of the application object, and therefore, application with a uniform thickness all over the application object may be difficult.

As described above, when the width of the application port of the tip of the needle 1722 is kept at an application width for the nozzle substrate 1711 which is an application object, the thickness for application all over the application object may be uniform and a finished surface may be provided with a high precision.

Figure 45:
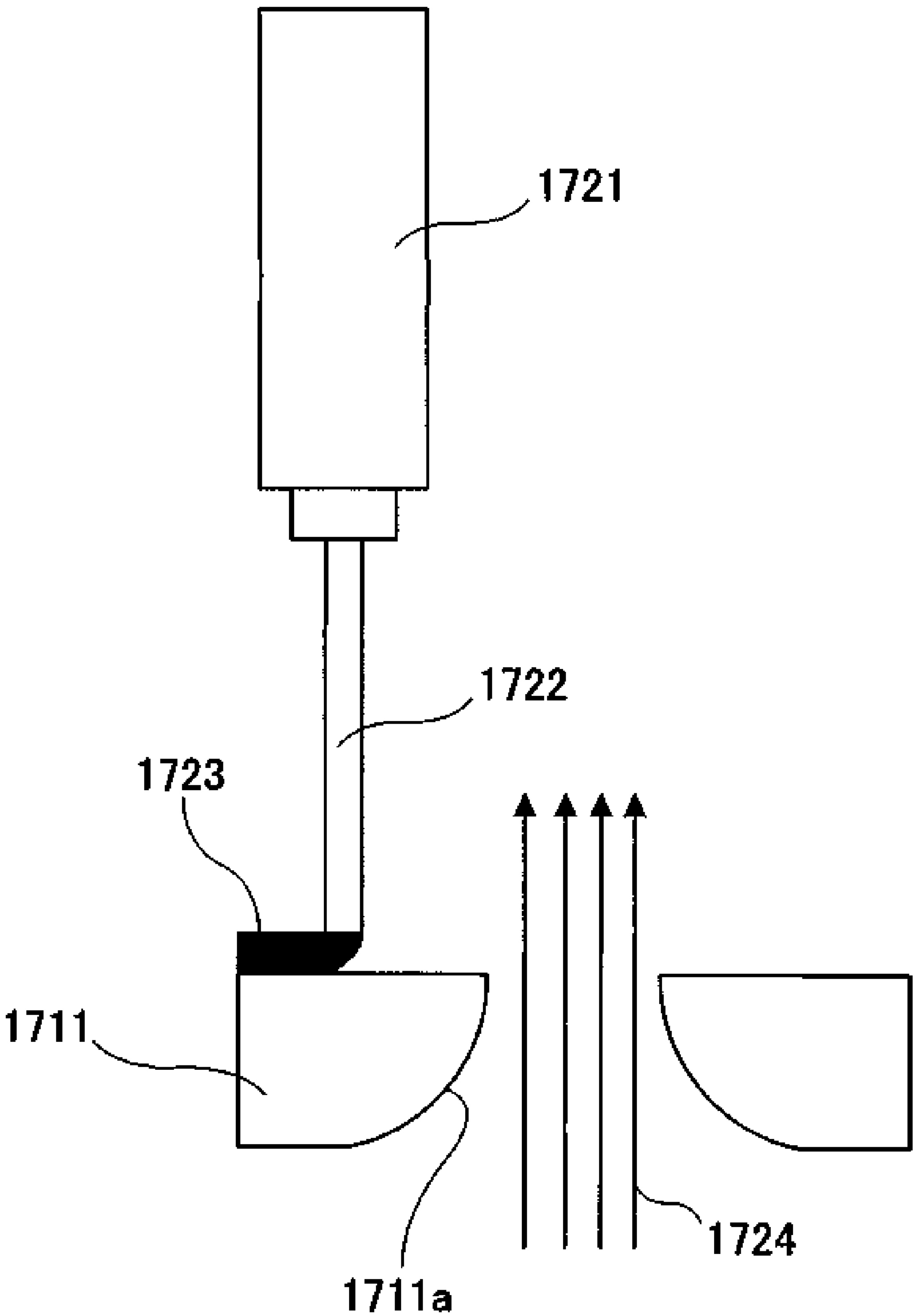
FIG. 45 is an illustration diagram contributing to an explanation of another example of a method for manufacturing the liquid drop ejecting head.

Next, another example of a method for manufacturing a nozzle plate of the above-mentioned liquid ejecting head is described with reference to FIG. 45. This example is in an illustration diagram shoeing another example of a manufacturing method for forming a water-repellent layer while a silicone resin is applied on the surface of a nozzle substrate by using a dispenser.

In this example, a silicone resin 1723 is applied to the opening 1711*a* of the nozzle substrate 1711 while a gas 1724 is jetted from a surface side opposite to the side of the surface on which a water-repellent layer is formed. For the gas 1724, each kind of gas may be used if it does not easily cause a chemical reaction with the silicone resin 1723 to be applied, and for example, may be air.

Thus, as application is conducted while the gas 1724 is jetted from the opening 1711*a*, a silicone resin coating 1712 may be formed on only the surface of the nozzle substrate 1711 except the opening 1711*a* of the nozzle substrate 1711.

Figure 46:
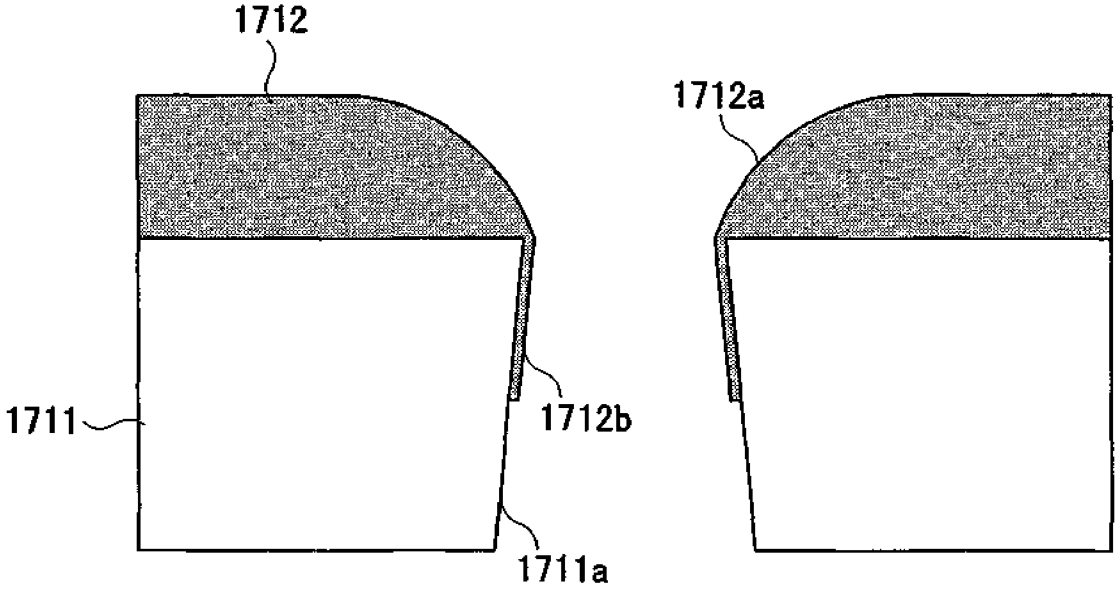
FIG. 46 is an enlarged illustration diagram showing another example of a nozzle part of the liquid ejecting head.

Also, after a similar silicone resin 1723 is used and applied without jetting a gas 1724 as described above and the silicone resin 1723 penetrates to a predetermined depth, a silicone resin coating 1712*b* may be formed to a desired depth (for example, approximately several μm) around a nozzle 1704 (on the wall around the opening 1711*a*), as shown in FIG. 46, by jetting the gas 1724 from the opening 1711*a*.

That is, a very thin water-repellent film 1712*b* (a water-repellent film on the wall around the opening 1711*a*) may be formed to a predetermined depth from the edge of the opening 1711*a* of the nozzle substrate 1711 in addition to the above-mentioned water-repellent layer 1712 at the liquid drop ejection face.

Wiping was applied to thus manufactured water-repellent layer 1712 of the nozzle plate 1702 by using EPDM rubber (with a rubber hardness of 50 degrees). As a result, the water-repellent layer 1712 of the nozzle plate 1702 could keep good water repellency even under 1,000 times wiping. Also, the nozzle member 1702 on which the water-repellent layer 1712 was formed was treated by dipping it in an ink at 70° C. for 14 days. Afterward, as a result, the water repellency could also be kept without a change from the initial state.

Figure 47:
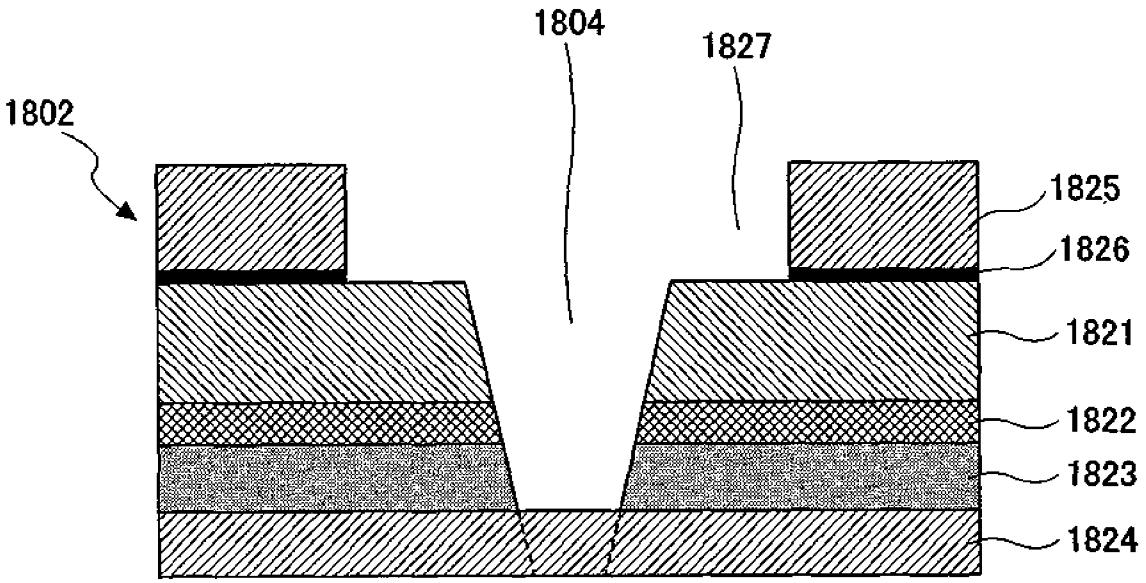
FIG. 47 is a cross-sectional diagram illustrating a nozzle plate showing another example of a liquid ejecting head.

Next, another preferable example of a liquid ejecting head is described with reference to FIG. 47. Additionally, FIG. 47 is an enlarged cross-sectional diagram illustrating a nozzle plate of the head.

The nozzle plate 1102 of the liquid ejecting head is formed by jointing a resin member 1821 which becomes a nozzle substrate and a highly rigid member 1825 with a thermoplastic adhesive material 1826 and sequentially laminating a $SiO_2$ thin film layer 1822 and a fluorine-containing water-repellent layer 1823 on the surface of the resin member 1821, wherein a nozzle hole (opening) 1804 with a required diameter is formed on the resin member 1821 and a nozzle communication port 1827 communicating with the nozzle hole 1804 is formed on the highly rigid member 1825.

For the formation of the $SiO_2$ thin film layer 1822, it is formed by a film formable method at a temperature at which relatively less heat is applied, that is, in a range in which no influence of heat on a resin member is caused. Specifically, it is considered that sputtering, ion beam deposition, ion plating, CVD (chemical vapor deposition method), P-CVD (plasma chemical vapor deposition method), and the like are suitable.

It is advantageous that the film thickness of the $SiO_2$ thin film layer 1822 is the minimum thickness required for retaining the adhesion, from the viewpoints of the process time and the cost of materials. If the film thickness is too large, difficulty in processing of a nozzle hole by means of excimer laser may be caused. That is, even if the resin member 1821 is precisely processed into a shape of nozzle hole, a part of the $SiO_2$ thin film layer 1822 is not sufficiently processed to provide a residual of the processing.

Therefore, specifically, a film thickness range of 1 angstrom-300 angstroms is preferable, and is more preferably 10 angstroms-100 angstroms, for a range such that the adhesion may be ensured and no residual of the $SiO_2$ thin film layer 1822 may be provided at the time of excimer laser processing. According to an experiment, even if the film thickness of the $SiO_2$ thin film layer 1822 was 30 angstroms, the adhesion was sufficient and there was no problem in regard to the processability by means of excimer laser. Also, a slight residual of processing was observed at 300 angstroms but was in a usable range. Over 300 angstroms, considerably large residual of processing was caused and an abnormal shape of nozzle so as to be unusable was observed.

For the material of the water-repellent layer 1823, any of materials that are repellent to inks is allowed to be used, and specifically, fluorine-containing water-repellent materials and silicone-based water-repellent materials described above may be provided.

As a fluorine-containing water-repellent material, various materials are known, and herein, a necessary water repellency is obtained by vapor-depositing a mixture of a perfluoropolyoxetane and a modified perfluoropolyoxetane (produced by Daikin industries, Ltd., commercial name: Optool DSX) to have a thickness of 1 angstrom-30 angstroms. From the experimental results, even if the thickness of Optool DSX was any of 10 angstroms, 20 angstroms and 30 angstroms, no difference was found in the water repellency and the wiping resistance. Therefore, 1 angstrom-20 angstroms are preferable by taking the cost and the like into consideration. Also, an adhesive tape 1824 for which an adhesive material is applied on a film made of resin is applied on the surface of the fluorine-containing water-repellent layer 1823 so as to effect an auxiliary function at the time of excimer laser processing.

Also, for the silicone-based water-repellent material, room-temperature-curable liquid silicone resins or elastomers as described above are provided, and it is preferable that an ink-repellent coating is formed while application on the surface of a substrate and leaving in the air at room temperature for polymerization and curing are made.

Also, the silicone-based water-repellent material may be a thermosetting-type silicone resin or elastomer, and may be applied on the surface of a substrate and be subjected to heating treatment so as to be cured and form an ink-repellent coating.

Also, the silicone-based water-repellent material may be an ultraviolet-rays-curable-type liquid silicone resin or elastomer, and may be applied on the surface of a substrate and may be cured by means of irradiation with ultraviolet rays so as to form an ink-repellent coating.

Also, it is preferable that the viscosity of the silicone-based water-repellent material be equal to or less than 1,000 cp.

Figure 48:
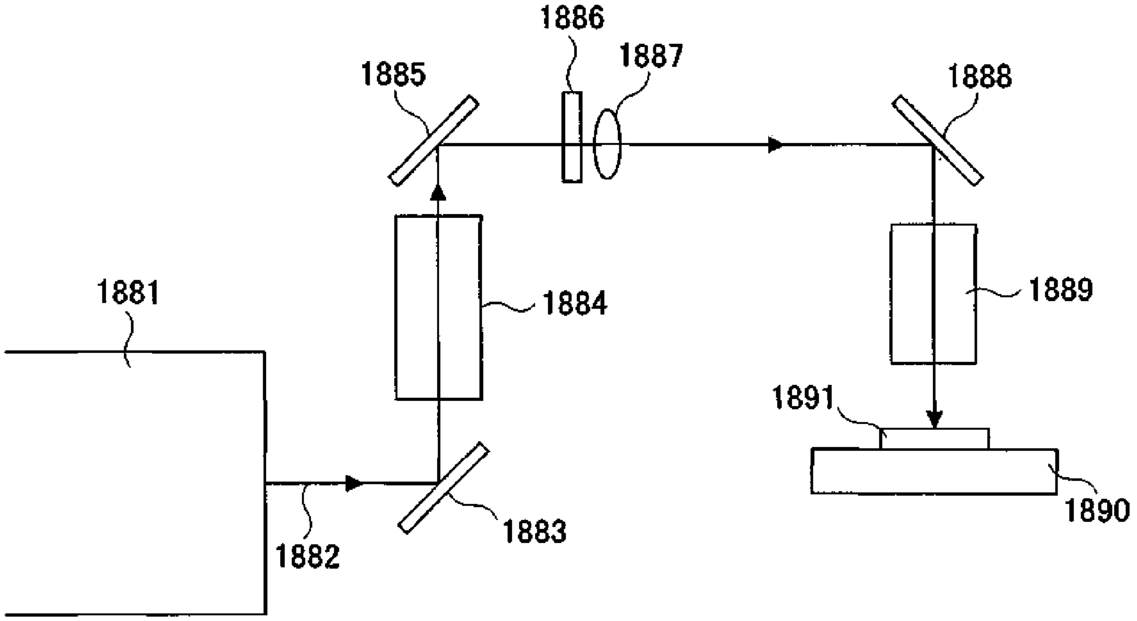
FIG. 48 is an illustration diagram contributing to an explanation of excimer laser processing equipment.

Herein, an excimer laser processing machine for processing a nozzle hole is simply described with reference to FIG. 48.

An excimer laser beam 1882 emitted from a laser oscillator 1881 is reflected from mirrors 1883, 1885 and 1888 and is led to a processing table 1890. In the optical path on which the laser beam 1882 is led to the processing table 1890, a beam expander 1884, a mask 1886, a field lens 1887 and an imaging optical system 1889 are provided at predetermined positions thereof such that an optimum beam leads to a processing object (work) 1891.

The processing object 1891 is mounted on the processing table 1890 and receives the laser beam 1882. The processing table 1890 is composed of a well-known XYZ table and the like and allowed to move the processing object 1891 and to provide irradiation with the laser beam 1882 at a desired position, according to need. Herein, although examiner laser used for the laser has been described, various lasers are available if they are short-wavelength ultraviolet lasers capable of ablation processing.

Next, a process of manufacturing the nozzle plate 1802 is described with reference to FIG. 49.

Figure 49:
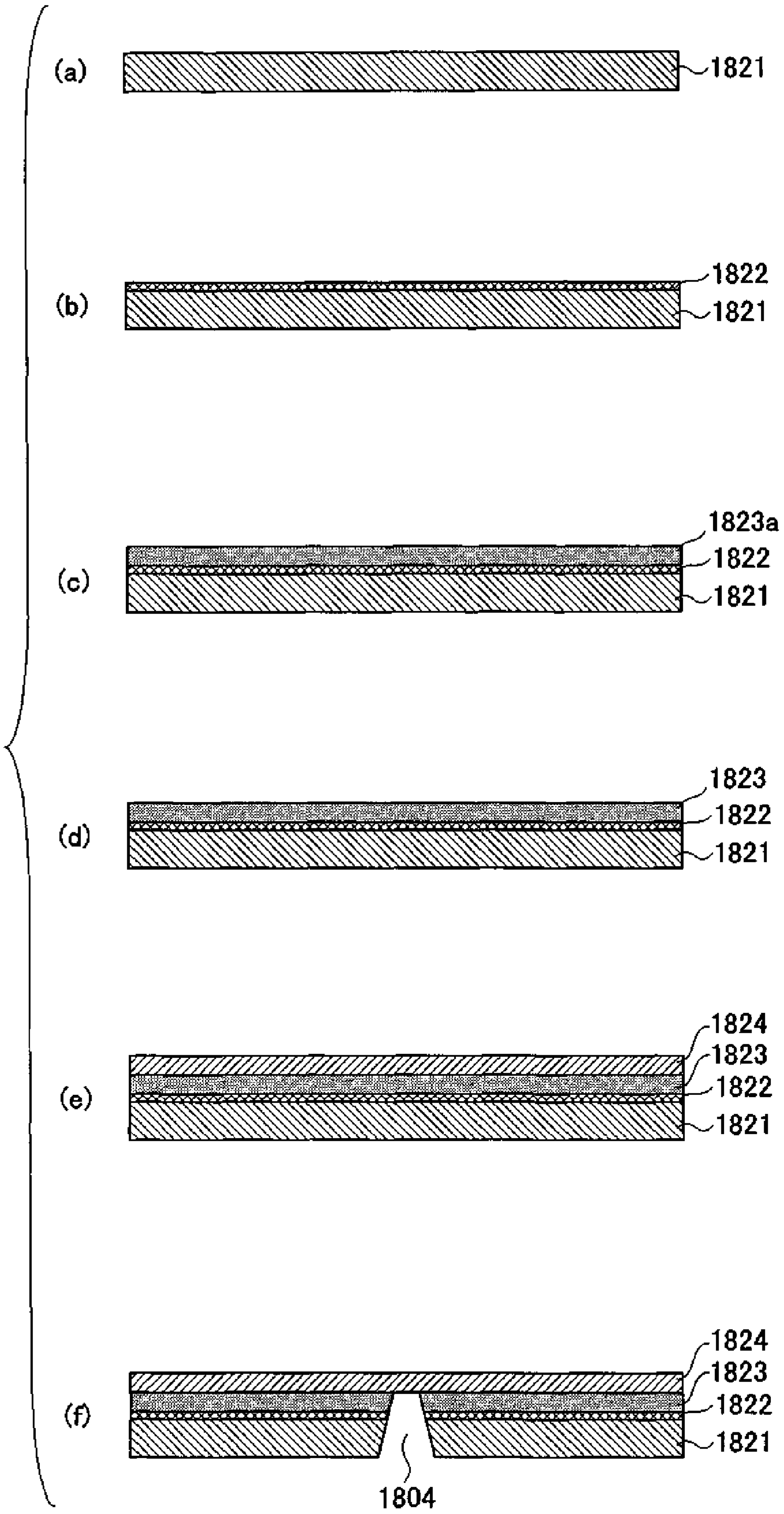
FIG. 49 is a cross-sectional illustration diagram contributing to an explanation of a process of manufacturing a nozzle plate of the liquid ejecting head.

As shown in FIG. 49(*a*), a resin film 1821 which becomes a nozzle substrate is prepared. For example, a film with no particle referred to as Kapton (commercial name) may be used which is a polyimide film produced by DuPont. For a commonly used polyimide film, particles such as $SiO_2$ (silica) are added into a film material from the viewpoint of the handling (slipperiness) thereof in a roll-film handling machine. However, when nozzle hole processing is conducted by means of excimer laser, particles of $SiO_2$ (silica) are not good for processibility by means of excimer laser and an abnormal nozzle shape may be caused. Therefore, a film in which no particle of $SiO_2$ (silica) is added is used.

Then, as shown in FIG. 49(*b*), the $SiO_2$ thin film layer 1822 is formed on the surface of the resin film 1821. It is preferable that the formation of the $SiO_2$ thin film layer 1822 be conducted by a sputtering technique in a vacuum chamber. It is preferable that the film thickness of the $SiO_2$ thin film layer 1822 be several angstroms—approximately 200 angstroms, and herein, it is formed to have a thickness of 10-50 angstroms.

Herein, in regard to a sputtering method, it is more effective to use a method for forming a $SiO_2$ film by sputtering Si and subsequently hitting the surface of the Si with an $O_2$ ion, for improving the adhesion of the $SiO_2$ film 1822 to the resin film 1821, obtaining a uniform and dense film, and improving the wiping resistance of a water-repellent film.

Then, as shown in FIG. 49(*c*), a fluorine-containing water repellent agent 1823*a* is applied on the surface of the $SiO_2$ film 1822. For an application method, a method such as a spin coater, a roll coater, screen printing and a spray coater is usable and a vapor deposition method for film formation leads to improve the adhesion of a water-repellent film.

Also, a better effect may be obtained by forming the $SiO_2$ thin film layer 1822 of FIG. 49(*b*) and subsequently and directly conducting the vapor deposition in a vacuum chamber. That is, after the $SiO_2$ thin film layer 1822 is formed, the work is once taken out from the vacuum chamber, wherein the adhesion is spoiled due to adhering of impurities and the like to the surface.

Additionally, perfluoropolyoxetane, a modified perfluoropolyoxetane or a mixture thereof as a fluorine-containing amorphous compound may be used for the fluorine-containing water-repellent material, so that a water repellency required for an ink may be obtained. The above-mentioned "Optool DSX" produced by Daikin industries Ltd. may be referred to as an "alkoxysilane-terminated modified perfluoropolyether".

Subsequently, leaving in the air is conducted, whereby the fluorine-containing water-repellent agent 1823*a* and the $SiO_2$ thin film layer 1822 are chemically bonded to each other by the intermediary of water content in the air so as to provide a fluorine-containing water-repellent layer 1823, as shown in FIG. 49(*d*).

Then, the adhesive tape 1824 is applied on the surface on which the fluorine-containing water-repellent layer 1823 is applied, as shown in FIG. 49(*e*). When the adhesive tape 1824 is applied, it is necessary to apply it such that no air bubble is generated. If there is an air bubble, a nozzle hole opened at a position at which there is an air bubble may not have a good quality due to a substance adhering at the time of processing.

Subsequently, the nozzle hole 1804 is formed by means of irradiation with excimer laser from the side of the polyimide film 1821, as shown in FIG. 49(*f*). After processing of the nozzle hole 1804, the adhesive tape 1824 is peeled for use. Additionally, the descriptions for the highly rigid member 1825 used for increasing the rigidity of the nozzle plate 1802, as described with reference to FIG. 47, is omitted, but if it is applied to these processes, it is appropriate to apply it between the process shown in FIG. 49(*d*) and the process shown in FIG. 49(*d*).

Figure 50:
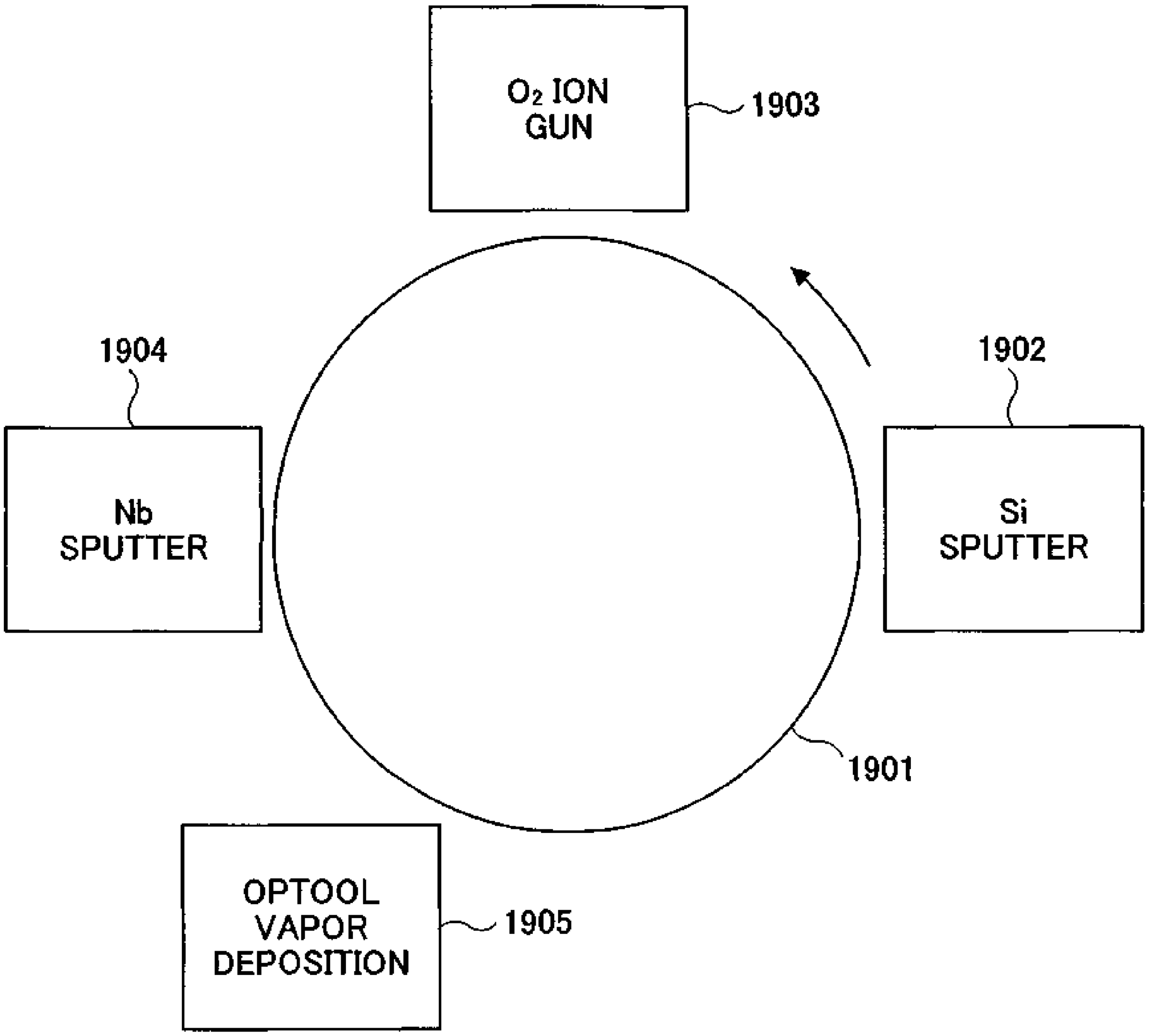
FIG. 50 is an illustration diagram contributing to an explanation of one example of thin-film fabricating equipment used for manufacturing a nozzle plate of the liquid ejecting head.

Next, the essence of an apparatus used for manufacturing a liquid ejecting head is described with reference to FIG. 50.

This apparatus is a device for a method called "MetaMode process" developed by OCLI (Optical Coating Laboratory Inc.) in the U.S.A. and is used for manufacturing an antireflection or contamination resisting film for a display device and the like.

In this apparatus, an Si sputtering station 1902, an $O_2$ ion gun station 1903, an Nb sputtering station 1904, and an Optool vapor deposition station 1905 are arranged at four positions around a drum 1901 rotating to the direction of an arrow, respectively, and all of them are in a chamber capable of being vacuumed.

First, Si is sputtered at the Si sputtering station 1902, and then, the Si is hit with $O_2$ ions at the $O_2$ ion gun station 1903 to provide $SiO_2$. Subsequently, Optool DSX is appropriately vapor-deposited at the Optool vapor deposition station 1905. Additionally, since the function of an antireflection film is not required for a liquid ejecting head, the Nb sputtering station 1904 is not used and one layer of each of $SiO_2$ and Optool DSX is formed. When this apparatus is used, vapor deposition of Optool DSX may be allowed in a vacuum chamber directly after the $SiO_2$ thin layer 1822 is formed, as described above.

Next, the critical surface tension of a water-repellent layer of a liquid ejecting head is described.

The critical surface tension of a water-repellent layer is preferably 5-40 mN/m, and particularly, 5-30 mN/m is more preferable. If it is greater than 30 mN/m, a phenomenon may be caused such that ink excessively wets a nozzle plate in long term use, and the curve of ink ejection or abnormal particle formation may be caused in repeated printing. Also, if it is greater than 40 mN/m, a phenomenon to wet a nozzle plate excessively from the initial state may be caused, and therefore, the curve of ink ejection or abnormal particle formation may be caused from the initial state.

Herein, a nozzle plate on which a water-repellent layer is formed was manufactured by applying a water-repellent layer material described in Table 2 on an aluminum substrate and heating and drying them and the critical surface tension of the water-repellent layer is measured, thereby obtaining the result shown in Table 2.

TABLE 2

| Maker | Product Name | Critical surface tension (mN/m) | Ejection stability |
|---|---|---|---|
| Dow Corning Toray Co. Ltd. | SR2411 | 21.6 | Good |
| Shin-Etsu Chemical Co. Ltd. | KBM7803 | 16.9 | Good |
| Shin-Etsu Chemical Co. Ltd. | KP801M | 6.6 | Good |

Additionally, a critical surface tension may be obtained by means of a Zisman method. Specifically, a liquid with a known surface tension is dropped onto a water-repellent layer and the contact angle θ is measured. When the surface tension of the liquid is plotted on the x-axis and cos θ is plotted on the y-axis, a downward-sloping straight line may be obtained (Zisman Plot). The critical surface tension γc is calculated as a surface tension where the straight line satisfies Y=1 (θ=0). In regard to another method, the critical surface tension may also be obtained by using a Fowkes method, Owens and Wendt method, or Van Oss method.

When a liquid ejecting head for which a water-repellent layer of each example as described above was manufactured and a cyan ink as described in the above-mentioned specific example of color ink was ejected, the traveling process of a liquid drop was observed by means of video imaging. As a result, normal particle formation was confirmed in the case of using any of the nozzle plates and good ejection stability was also confirmed.

Additionally, although illustration is provided by using an image forming apparatus with a printer configuration in the above embodiment, the same similarly applies to a so-called multi-functional image forming apparatus with an image reading device such as a scanner.

APPENDIX

Typical embodiments (1) to (26) of the present invention are described below.

Embodiment (1) is an image processing method configured to produce image data output from an image forming apparatus configured to form an image by using a recording head composed of a liquid ejecting head having plural arranged nozzles configured to eject a liquid drop and an energy generating device configured to generate ejection energy corresponding to each nozzle while conducting a halftone processing configured to convert input image data to an N value which is less than a tone (M value) thereof (N value: $M>N\geqq2$), characterized in that a halftone processing configured to substantially reduce a driving frequency of a driving wave pattern applied to the energy generating device is conducted when a liquid drop with a drop size causing ejection irregularity or a liquid drop from a nozzle causing ejection irregularity is ejected.

Embodiment (2) is the image processing method according to embodiment (1) above, characterized in that a processing configured not to continuously eject a liquid drop with a drop size causing ejection irregularity or a liquid drop from a nozzle causing ejection irregularity is conducted in the halftone processing configured to substantially reduce a driving frequency.

Embodiment (3) is the image processing method according to embodiment (1) or (2) above, characterized in that the halftone processing is an error diffusion processing.

Embodiment (4) is the image processing method according to embodiment (3) above, characterized in that when a picture element is formed by a liquid drop with a drop size causing ejection irregularity or a liquid drop from a nozzle causing ejection irregularity and when a liquid drop with the same drop size or from the same nozzle is ejected for a just previous picture element, a processing configured not to eject a liquid drop for the picture element is conducted.

Embodiment (5) is the image processing method according to embodiment (1) or (2) above, characterized in that the halftone processing is a dither processing.

Embodiment (6) is the image processing method according to embodiment (5) above, characterized in that a dither matrix on which discontinuous threshold values are arranged is used for an image formed by a liquid drop with a drop size causing ejection irregularity or a liquid drop from a nozzle causing ejection irregularity.

Embodiment (7) is the image processing method according to embodiment (5) or (6) above, characterized in that a dither matrix composed of plural sub-matrices with a smaller size is used in which the arrangement order of dots in the sub-matrix is in a pattern which is a concentrating type when an output tone value is less than a predetermined threshold value (T value: N>T>1) or a dispersing type when it is equal to or greater than the threshold value (T value), wherein a part or all of a sub-matrix is embedded with a maximum tone value (T−1) of a concentrating type under a condition of a corresponding driving frequency just before the arrangement of dots in a sub-matrix switches from a concentrating type to a dispersing type.

Embodiment (8) is the image processing method according to embodiment (7) above, characterized in that plural sub-matrices composing the dither matrix are in a dispersively-selected arrangement.

Embodiment (9) is the image processing method according to embodiment (7) or (8) above, characterized in that plural sub-matrices composing the dither matrix are in arrangement such that adjacent sub-matrices are not continuously selected.

Embodiment (10) is the image processing method according to any of embodiments (7) to (9) above, characterized in that plural sub-matrices composing the dither matrix are in arrangement such that arranged dots are selected to have a high-pass filter characteristic.

Embodiment (11) is the image processing method according to any of embodiments (6) to (10) above, characterized in that when an input image is a color image composed of plural color planes, a dither matrix for which the dither matrix has been converted by at least one or combination of rotation, linearly symmetric inversion and parallel displacement thereof is used for any color plane.

Embodiment (12) is the image processing method according to embodiment (11) above, characterized in that when an input image is a color image composed of plural color planes, a dither matrix for which the order of arrangement of dots in the dither matrix is reversed by an output tone unit is used for any color plane.

Embodiment (13) is the image processing method according to embodiment (12) above, characterized in that the sub-matrix is in a form such that two kinds of rectangles that are large and small rectangles are adjacent so as to contact sides and corners thereof with each other, and a dither matrix for which color planes are displaced from each other by parallel displacement thereof in vertical directions by one or more lines is used for a CMYK color input image.

Embodiment (14) is the image processing method according to any of embodiments (6) to (13) above, characterized in that when an input image is a color image composed of plural color planes, a line-shaped dither matrix having a constant screen angle is used in combination with the dither matrix.

Embodiment (15) is the image processing method according to any of embodiments (6) to (14) above, characterized in that when an input image is a color image composed of plural color planes, a bayer-type dither matrix is used in combination with the dither matrix.

Embodiment (16) is the image processing method according to embodiment (1) or (2) above, characterized in that the halftone processing configured to substantially reduce a driving frequency is a processing configured to modify a resolution of an output image.

Embodiment (17) is the image processing method according to embodiment (1) or (2) above, characterized in that the halftone processing configured to substantially reduce a driving frequency is a processing configured to modify a number of path(s) configured to form an output image.

Embodiment (18) is the image processing method according to any of embodiments (1) to (17) above, characterized in that the halftone processing configured to substantially reduce a driving frequency is conducted based on an ejection condition of sequential liquid drops in a main scanning direction while a carriage mounting the recording head once scans a recording medium.

Embodiment (19) is the image processing method according to any of embodiments (1) to (17) above, characterized in that the halftone processing configured to substantially reduce a driving frequency is conducted based on an ejection condition of sequential liquid drops in a sub-scanning direction while a carriage mounting the recording head once scans a recording medium.

Embodiment (20) is the image processing method according to any of embodiments (1) to (18) above, characterized in that the halftone processing configured to substantially reduce a driving frequency is conducted with respect to a desired printing mode that is predetermined or externally specified among printing modes of the image forming apparatus.

Embodiment (21) is a program configured to make a computer execute a processing configured to produce image data sent to an image forming apparatus, characterized by making a computer execute the image processing method according to any of embodiments (1) to (20) above.

Embodiment (22) is a recording medium characterized in that the program according to embodiment (21) above is stored therein.

Embodiment (23) is an image processing device configured to produce image data output from an image forming apparatus configured to form an image by using a recording head composed of a liquid ejecting head having plural arranged nozzles configured to eject a liquid drop and an energy generating device configured to generate ejection energy corresponding to each nozzle while conducting a halftone processing configured to convert input image data to an N value which is less than a tone (M value) thereof (N value: M>N≧2), characterized by comprising a device configured to execute the image processing method according to any of embodiments (1) to (20) above.

Embodiment (24) is an image forming apparatus configured to produce image data by conducting a halftone processing configured to convert input image data to an N value which is less than a tone (M value) thereof (N value: M>N≧2) when an image is formed by using a recording head composed of a liquid ejecting head having plural arranged nozzles configured to eject a liquid drop and an energy generating device configured to generate ejection energy corresponding to each nozzle, characterized by comprising a device configured to execute the image processing method according to any of embodiments (1) to (20) above.

Embodiment (25) is the image forming apparatus according to embodiment (23) above, characterized in that a predetermined sample image which can determine ejection irregularity of the recording head is output and the halftone processing is applied based on an output result of the sample image.

Embodiment (26) is the image forming apparatus according to embodiment (23) above, characterized in that a predetermined sample image which can determine ejection irregularity of the recording head is output and the halftone processing is applied based on an output result of the sample image and in response to an externally input command.

At lease one of typical embodiments (1) to (26) above may aim to provide at least one of, an image processing method for improving an image quality with a simple configuration while the degradation of an image quality is suppressed which is caused by ejection irregularity of a liquid drop, a program which makes a computer execute the image processing method, a recording medium in which the program is stored, an image processing device for executing the image processing method, and an image forming apparatus for executing the image processing method.

According to at least one of the image processing method, program, recording medium, image processing device, and image forming apparatus according to at least one of typical embodiments (1) to (26) above, an image quality may be improved with a simple configuration by suppressing the degradation of an image quality which is caused by ejection irregularity of a liquid drop, since a halftone processing is conducted which substantially reduces the driving frequency of a driving wave pattern applied to an energy generating device when a liquid drop with a drop size causing ejection irregularity or a liquid drop from a nozzle causing ejection irregularity is ejected.

Although the embodiment(s) and specific example(s) of the present invention have been specifically described above, the present invention is not limited to the embodiment(s) or specific example(s) and the embodiment(s) and specific example(s) of the present invention can be altered or modified without departing from the spirit and scope of the present invention.

The present application is based on Japanese priority application No. 2006-312147 filed on Nov. 17, 2006, the entire contents of which priority application are hereby incorporated by reference.

What is claimed is:

1. An image processing method configured to produce image data output from an image forming apparatus configured to form an image by using a recording head composed of a liquid ejecting head having plural arranged nozzles configured to eject a liquid drop and an energy generating device configured to generate ejection energy corresponding to each nozzle while conducting a halftone processing configured to convert input image data to an N value which is less than a tone (M value) thereof (N value: $M>N\geqq 2$), wherein a halftone processing configured to substantially reduce a driving frequency of a driving wave pattern applied to the energy generating device is conducted when a liquid drop with a drop size causing ejection irregularity or a liquid drop from a nozzle causing ejection irregularity is ejected, wherein a processing configured not to continuously eject a liquid drop with a drop size causing ejection irregularity or a liquid drop from a nozzle causing ejection irregularity is conducted in the halftone processing configured to substantially reduce the driving frequency.

2. The image processing method according to claim 1, wherein the halftone processing is an error diffusion processing.

3. The image processing method according to claim 1, wherein the halftone processing is a dither processing.

4. The image processing method according to claim 3, wherein a dither matrix composed of plural sub-matrices with a smaller size is used in which the arrangement order of dots in the sub-matrix is in a pattern which is a concentrating type when an output tone value is less than a predetermined threshold value (T value: $N>T>1$) or a dispersing type when it is equal to or greater than the threshold value (T value), wherein a part or all of a sub-matrix is embedded with a maximum tone value ($T-1$) of a concentrating type under a condition of a corresponding driving frequency just before the arrangement of dots in a sub-matrix switches from a concentrating type to a dispersing type.

5. The image processing method according to claim 4, wherein plural sub-matrices composing the dither matrix are in a dispersively-selected arrangement.

6. The image processing method according to claim 4, wherein plural sub-matrices composing the dither matrix are in arrangement such that adjacent sub-matrices are not continuously selected.

7. The image processing method according to claim 4, wherein plural sub-matrices composing the dither matrix are in arrangement such that arranged dots are selected to have a high-pass filter characteristic.

8. The image processing method according to claim 1, wherein the halftone processing configured to substantially reduce a driving frequency is conducted based on an ejection condition of sequential liquid drops in a main scanning direction while a carriage mounting the recording head once scans a recording medium.

9. The image processing method according to claim 1, wherein the halftone processing configured to substantially reduce a driving frequency is conducted based on an ejection condition of sequential liquid drops in a sub-scanning direction while a carriage mounting the recording head once scans a recording medium.

10. The image processing method according to claim 1, wherein the halftone processing configured to substantially reduce a driving frequency is conducted with respect to a desired printing mode that is predetermined or externally specified among printing modes of the image forming apparatus.

11. A program product embodied in a non-transitory computer readable medium and including a program of instructions configured to make a computer execute a processing configured to produce image data sent to an image forming apparatus, characterized by making a computer execute the image processing method according to claim 1.

12. An image processing device configured to produce image data output from an image forming apparatus configured to form an image by using a recording head composed of a liquid ejecting head having plural arranged nozzles configured to eject a liquid drop and an energy generating device configured to generate ejection energy corresponding to each nozzle while conducting a halftone processing configured to convert input image data to an N value which is less than a tone (M value) thereof (N value: $M>N\geqq 2$), characterized by comprising a device configured to execute the image processing method according to claim 1.

13. An image processing method configured to produce image data output from an image forming apparatus configured to form an image by using a recording head composed of a liquid ejecting head having plural arranged nozzles configured to eject a liquid drop and an energy generating device configured to generate ejection energy corresponding to each nozzle while conducting a halftone processing configured to convert input image data to an N value which is less than a tone (M value) thereof (N value: M>N≧2), wherein a halftone processing configured to substantially reduce a driving frequency of a driving wave pattern applied to the energy generating device is conducted when a liquid drop with a drop size causing ejection irregularity or a liquid drop from a nozzle causing ejection irregularity is ejected, wherein when a picture element is formed by a liquid drop with a drop size causing ejection irregularity or a liquid drop from a nozzle causing ejection irregularity and when a liquid drop with the same drop size or from the same nozzle is ejected for a just previous picture element, a processing configured not to eject a liquid drop for the picture element is conducted.

14. An image processing method configured to produce image data output from an image forming apparatus configured to form an image by using a recording head composed of a liquid ejecting head having plural arranged nozzles configured to eject a liquid drop and an energy generating device configured to generate ejection energy corresponding to each nozzle while conducting a halftone processing configured to convert input image data to an N value which is less than a tone (M value) thereof (N value: M>N≧2), wherein a halftone processing configured to substantially reduce a driving frequency of a driving wave pattern applied to the energy generating device is conducted when a liquid drop with a drop size causing ejection irregularity or a liquid drop from a nozzle causing ejection irregularity is ejected, wherein the halftone processing is a dither processing, and wherein a dither matrix on which discontinuous threshold values are arranged is used for an image formed by a liquid drop with a drop size causing ejection irregularity or a liquid drop from a nozzle causing ejection irregularity.

15. The image processing method according to claim 14, wherein when an input image is a color image composed of plural color planes, a dither matrix for which the dither matrix has been converted by at least one or combination of rotation, linearly symmetric inversion and parallel displacement thereof is used for any color plane.

16. The image processing method according to claim 15, wherein when an input image is a color image composed of plural color planes, a dither matrix for which the order of arrangement of dots in the dither matrix is reversed by an output tone unit is used for any color plane.

17. The image processing method according to claim 16, wherein the sub-matrix is in a form such that two kinds of rectangles that are large and small rectangles are adjacent so as to contact sides and corners thereof with each other, and a dither matrix for which color planes are displaced from each other by parallel displacement thereof in vertical directions by one or more lines is used for a CMYK color input image.

18. The image processing method according to claim 14, wherein when an input image is a color image composed of plural color planes, a line-shaped dither matrix having a constant screen angle is used in combination with the dither matrix.

19. The image processing method according to claim 14, wherein when an input image is a color image composed of plural color planes, a bayer-type dither matrix is used in combination with the dither matrix.

20. A program product embodied in a non-transitory computer readable medium and including a program of instructions configured to make a computer execute a processing configured to produce image data sent to an image forming apparatus, characterized by making a computer execute the image processing method according to claim 14.

21. An image processing device configured to produce image data output from an image forming apparatus configured to form an image by using a recording head composed of a liquid ejecting head having plural arranged nozzles configured to eject a liquid drop and an energy generating device configured to generate ejection energy corresponding to each nozzle while conducting a halftone processing configured to convert input image data to an N value which is less than a tone (M value) thereof (N value: M>N≧2), characterized by comprising a device configured to execute the image processing method according to claim 14.

* * * * *